United States Patent
Dekel et al.

(10) Patent No.: US 11,701,935 B2
(45) Date of Patent: Jul. 18, 2023

(54) DUAL-WHEELS CORNER SYSTEM WITH TRANSVERSE SUSPENSION

(71) Applicant: REE AUTOMOTIVE LTD, Glil-Yam (IL)

(72) Inventors: Ran Dekel, Nofit (IL); Ahishay Sardes, Tel Aviv (IL); Gil Hacohen, Ramat Efal (IL); Zohar Goldenstein, Nes-Tziyona (IL); Amit Aknin, Karkom (IL); Gal Zohar, Ein-Shemer (IL); Ran Meir, Givataim (IL); Ido Gury, Tel-Aviv Jaffa (IL); Eylon Avigur, Ramat-Gan (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 17/981,834

(22) Filed: Nov. 7, 2022

(65) Prior Publication Data

US 2023/0075975 A1    Mar. 9, 2023

Related U.S. Application Data

(63) Continuation of application No. PCT/IL2022/050892, filed on Aug. 16, 2022.
(Continued)

(51) Int. Cl.
*B60G 5/04* (2006.01)
*B60G 21/045* (2006.01)

(52) U.S. Cl.
CPC ........... *B60G 5/043* (2013.01); *B60G 21/045* (2013.01)

(58) Field of Classification Search
CPC .... B60G 5/043; B60G 21/045; B60G 21/026; B60G 2200/144
See application file for complete search history.

(56) References Cited

U.S. PATENT DOCUMENTS

| 429,331 A | 6/1890 | Wise |
| 2,237,575 A | 4/1941 | Quartullo |
| (Continued) | | |

FOREIGN PATENT DOCUMENTS

| DE | 467309 | 10/1928 |
| DE | 2836028 | 9/1979 |
| (Continued) | | |

OTHER PUBLICATIONS

Gilbert Shanti, Chassis system for a motor vehicle, motor vehicle, Jul. 27, 2017, EPO, DE 10 2016 001 594 B3, Machine Translation of Description (Year: 2017).*
(Continued)

*Primary Examiner* — James A English
(74) *Attorney, Agent, or Firm* — Pearl Cohen Zedek Latzer Baratz LLP

(57) ABSTRACT

A vehicle corner system for a dual-axle wheels assembly may include: a sub-frame; a first wheel interface having a first spinning axis about which a first wheel spins when connected to the first wheel interface; a first suspension linkage connected to and being transverse to the first wheel interface and to the sub-frame; a second wheel interface having a second spinning axis about which a second wheel spins when connected to the second wheel interface; a second suspension linkage connected to and being transverse to the second wheel interface and to the sub-frame; and a motion restrainer comprising a spring interconnecting the first suspension linkage and the second suspension linkage.

19 Claims, 29 Drawing Sheets

Related U.S. Application Data

(60) Provisional application No. 63/233,483, filed on Aug. 16, 2021.

(56) References Cited

U.S. PATENT DOCUMENTS

| | | | |
|---|---|---|---|
| 2,336,485 A | 12/1943 | Knox | |
| 2,589,863 A | 3/1952 | Quartullo | |
| 2,702,194 A * | 2/1955 | Alden | B60G 5/04 |
| | | | 280/685 |
| 3,097,862 A | 7/1963 | Dye | |
| 3,174,771 A | 3/1965 | Miller | |
| 3,363,913 A * | 1/1968 | McFarland | B60G 21/023 |
| | | | 280/685 |
| 3,369,824 A | 2/1968 | Bunch | |
| 3,387,857 A * | 6/1968 | Roberts | B60G 5/04 |
| | | | 280/124.179 |
| 3,522,941 A | 8/1970 | Henry-Biabaud | |
| 3,572,745 A | 3/1971 | Willetts | |
| 3,687,478 A | 8/1972 | Willetts | |
| 3,740,069 A | 6/1973 | Fister et al. | |
| 3,752,498 A | 8/1973 | Shea et al. | |
| 3,761,110 A | 9/1973 | Grosseau | |
| 3,945,664 A | 3/1976 | Hiruma | |
| 4,199,166 A | 4/1980 | Bohmer | |
| 4,379,571 A | 4/1983 | Simmons | |
| 4,397,473 A | 8/1983 | Miles | |
| 4,460,196 A | 7/1984 | Perlini | |
| 4,595,069 A | 6/1986 | Oswald | |
| 4,623,162 A | 11/1986 | Weitzenhof et al. | |
| 5,839,741 A * | 11/1998 | Heyring | B60G 21/0553 |
| | | | 280/124.167 |
| 7,219,779 B2 | 5/2007 | Bauer et al. | |
| 7,296,642 B1 | 11/2007 | DeWald | |
| 8,317,208 B2 * | 11/2012 | Bird | B60G 21/045 |
| | | | 280/124.167 |
| 8,851,500 B2 | 10/2014 | Dobbelaar et al. | |
| 10,343,481 B2 | 7/2019 | Fredriksson | |
| 10,801,583 B2 | 10/2020 | Sardes et al. | |
| 11,364,764 B2 | 6/2022 | Dekel | |
| 11,376,956 B2 | 7/2022 | Fliearman | |
| 2003/0105563 A1* | 6/2003 | Oshima | B60L 15/2036 |
| | | | 701/41 |
| 2003/0184056 A1 | 10/2003 | Bowers | |
| 2004/0113377 A1 | 6/2004 | Klees | |
| 2005/0074296 A1 | 4/2005 | McCarty et al. | |
| 2006/0048978 A1 | 3/2006 | Nagaya | |
| 2006/0054439 A1 | 3/2006 | Honma | |
| 2006/0234567 A1* | 10/2006 | Longdill | B60G 3/24 |
| | | | 440/12.5 |
| 2008/0230289 A1* | 9/2008 | Schoon | B60K 1/02 |
| | | | 180/65.6 |
| 2009/0029821 A1* | 1/2009 | Martin, III | F16H 57/037 |
| | | | 280/124.156 |
| 2018/0072120 A1 | 3/2018 | Hunter et al. | |
| 2018/0079276 A1 | 3/2018 | Baumgartner | |
| 2019/0168558 A1 | 6/2019 | Dolan et al. | |
| 2019/0193620 A1* | 6/2019 | Matsuoka | B60K 7/0007 |
| 2022/0055438 A1 | 2/2022 | Dekel | |

FOREIGN PATENT DOCUMENTS

| | | | |
|---|---|---|---|
| DE | 10 2016 014004 | 5/2017 | |
| DE | 102016001594 B3 * | 7/2017 | |
| EP | 0082547 | 6/1983 | |
| EP | 0444981 | 9/1991 | |
| EP | 0931684 | 7/1999 | |
| EP | 931684 A1 * | 7/1999 | B60G 3/01 |
| EP | 1985474 | 4/2018 | |
| EP | 1167093 | 1/2023 | |
| FR | 2636570 | 3/1990 | |
| FR | 2698825 | 6/1994 | |
| GB | 1105508 | 3/1968 | |
| GB | 1374548 | 11/1974 | |
| GB | 1393187 | 5/1975 | |
| GB | 2 247 063 | 2/1992 | |
| IT | UB20 161 155 | 8/2017 | |
| JP | 58-110307 | 6/1983 | |
| JP | H0649445 Y2 | 4/1990 | |
| JP | U 2-59005 | 4/1990 | |
| JP | 2011520701 | 7/2011 | |
| KR | 100783877 | 12/2007 | |
| KR | 1020100059391 | 6/2010 | |
| WO | WO 1995006570 | 3/1995 | |
| WO | WO 2007/036234 | 4/2007 | |
| WO | WO 2021070186 | 4/2021 | |

OTHER PUBLICATIONS

Communication Relating to the Results of the Partial International Search for PCT Appl. No. PCT/IL2022/050892 dated Dec. 8, 2022.
Office Action for U.S. Appl. No. 17/972,864 dated Feb. 22, 2023.
International Search for PCT Appl. No. PCT/IL2022/050892 dated Jan. 5, 2023.
Notice of Allowance for Korean Patent Application No. 10-2021-7009765 dated Mar. 31, 2023.

* cited by examiner

DUAL-WHEELS CORNER SYSTEM WITH TRANSVERSE SUSPENSION

CROSS-REFERENCE TO RELATED APPLICATIONS

This application is a continuation of PCT International Application No. PCT/IL2022/050892, International Filing Date Aug. 16, 2022, claiming the benefit of U.S. Provisional Patent Application No. 63/233,483, filed Aug. 16, 2021, which are hereby incorporated by reference.

FIELD OF THE INVENTION

The present invention relates to the field of vehicle corner system, and more particularly, to vehicle corner system having a suspension assembly for dual-axle wheels assemblies.

BACKGROUND OF THE INVENTION

Some vehicles, such as trucks, may have two or more dual-axle wheels assemblies with wheels suspension. For example, tandem axles vehicles may have double-axles in a rear portion of a vehicle. Some of the double-axles in the vehicle may be drive axles.

Current suspension units for such vehicles are typically bulky (e.g., occupy significant vertical space below a chassis of a vehicle) and/or typically provide shared suspension for the dual-axle wheels assemblies on opposite lateral sides of the vehicle. Current drive dual-axle wheels assemblies typically require complex and/or bulky transmission units.

SUMMARY OF THE INVENTION

Some embodiments of the present invention may provide a vehicle corner system for a dual-axle wheels assembly, the vehicle corner system may include: a sub-frame; a first wheel interface having a first spinning axis about which a first wheel spins when connected to the first wheel interface; a first suspension linkage including a first arm connected to the sub-frame and to the first wheel interface, the first arm is rotatable with respect to the sub-frame about a first axis that is substantially perpendicular to the first spinning axis; a second wheel interface having a second spinning axis about which a second wheel spins when connected to the second wheel interface; a second suspension linkage including a second arm connected to the sub-frame and to the second wheel interface, the second arm is rotatable with respect to the sub-frame about a second axis that is substantially perpendicular to the second spinning axis; and a motion restrainer including a piston assembly interconnecting the first suspension linkage and the second suspension linkage.

In some embodiments, the first axis and the second axis are aligned along an axis that is substantially perpendicular to the first spinning axis and the second spinning axis.

In some embodiments, the piston assembly is aligned along an axis that is substantially parallel to the first axis and the second axis.

In some embodiments, the piston assembly is disposed between the first spinning axis and the second spinning axis.

In some embodiments, the motion restrainer is to controllably increase and decrease a length of the piston assembly.

In some embodiments, the motion restrainer is to controllably increase and decrease a length of the piston assembly to control a height of the sub-frame relative to a ground surface when the vehicle corner system is assembled to a vehicle platform.

In some embodiments, the motion restrainer is to control a relative motion of at least one of the first suspension linkage and the second suspension linkage with respect to the sub-frame.

In some embodiments, the motion restrainer is to control a relative motion of the first suspension linkage and the second suspension linkage with respect to each other.

In some embodiments, (i) the first wheel interface and the second wheel interface, and (ii) the piston assembly are at opposite sides of the sub-frame with respect to each other.

In some embodiments, the vehicle corner system further includes: a first shock absorber connected to the first suspension linkage and to the sub-frame; and a second shock absorber connected to the second suspension linkage and to the sub-frame.

In some embodiments, the first suspension linkage includes a third arm connected to the first wheel interface and the sub-frame, the third arm is rotatable with respect to the sub-frame about a third axis that is substantially perpendicular to the first spinning axis; and the second suspension linkage includes a fourth arm connected to the second wheel interface and the sub-frame, the fourth arm is rotatable with respect to the sub-frame about a fourth axis that is substantially perpendicular to the second spinning axis.

In some embodiments, the third axis and the fourth axis are aligned along an axis that is substantially perpendicular to the first spinning axis and the second spinning axis.

In some embodiments, the third arm includes a third arm aperture and the fourth arm includes a fourth arm aperture, and the first shock absorber extends through the third arm aperture and the second shock absorber extends through the fourth arm aperture.

Some embodiments of the present invention may provide a vehicle corner system which may include: a sub-frame; a first wheel interface having a first spinning axis about which a first wheel spins when connected to the first wheel interface; a first suspension linkage connected to and being transverse to the sub-frame and to the first wheel interface; a second wheel interface having a second spinning axis about which a second wheel spins when connected to the second wheel interface; a second suspension linkage connected to and being transverse to the sub-frame and to the second wheel interface; and wherein at least one of: the first wheel interface is rotatable about a first steering axis, and the second wheel interface is rotatable about a second steering axis.

In some embodiments, at least one of: the first steering axis extends through the first suspension linkage; and the second steering axis extends through the second suspension linkage.

In some embodiments, the first wheel interface and the second wheel interface are simultaneously rotatable about the first and second steering axes, respectively.

In some embodiments, the first wheel interface and the second wheel interface are simultaneously rotatable about the first and second steering axes, respectively, in the same direction.

In some embodiments, the first wheel interface and the second wheel interface are simultaneously rotatable about the first and second steering axes, respectively, in the same direction, and wherein the first wheel interface is rotatable to a first steering angle and the second wheel interface is rotatable to a second steering angle that is different from the first steering angle.

In some embodiments, the vehicle corner system further includes a first steering actuator connected to the sub-frame and having a first steering actuator rod that is substantially parallel to the first spinning axis, the first steering actuator rod is connected to the first wheel interface to rotate the first wheel interface about the first steering axis.

In some embodiments, the vehicle corner system further includes a second steering actuator connected to the sub-frame and having a second steering actuator rod that is substantially parallel to the second spinning axis, the second steering actuator rod is connected to the second wheel interface to rotate the second wheel interface about the second steering axis.

In some embodiments, the vehicle corner system further includes: a first steering actuator connected to the sub-frame and having a first steering actuator rod that is transverse to the first axis and to the first steering axis, and a first steering linkage connected to the first steering actuator rod and to the first wheel interface to rotate the first wheel interface about the first steering axis.

In some embodiments, the first steering linkage includes: a first link connected to the sub-frame or to the first suspension linkage, the first link is rotatable about an axis that is substantially parallel to the first steering axis, wherein the first steering actuator rod is connected to the first link, and a first steering rod that is transverse to the first steering actuator rod, the first steering rod is connected to the first link and to the first wheel interface.

In some embodiments, the vehicle corner system further includes: a second steering actuator connected to the sub-frame and having a second steering actuator rod that is transverse to the second spinning axis and to the second steering axis, and a second steering linkage connected to the second steering actuator rod and to the second wheel interface to rotate the second wheel interface about the second steering axis.

In some embodiments, the second steering linkage includes: a second link connected to the sub-frame or to the second suspension linkage, the second link is rotatable about an axis that is substantially parallel to the second steering axis, wherein the second steering actuator rod is connected to the second link, and a second steering rod that is transverse to the second steering actuator rod, the second steering rod is connected to the second link and to the second wheel interface.

In some embodiments, the vehicle corner system further includes: a steering actuator connected to the sub-frame and having a steering actuator rod, and a steering linkage connected to the steering actuator and to the first wheel interface to rotate the first wheel interface about the first steering axis.

In some embodiments, the steering actuator rod is substantially parallel to the first spinning axis and the second spinning axis, and the steering linkage includes: a first link connected to the sub-frame, the first link is rotatable about an axis that is substantially parallel to the first steering axis, and wherein the steering actuator rod is connected to the first link, a second link connected to the sub-frame or to the first suspension linkage, the second link is rotatable about an axis that is substantially parallel to the first steering axis, a first steering rod transverse to the first spinning axis and to the first steering axis and connected to the first link and to the second link, and a second steering rod that is transverse to the first steering rod and connected to the second link and to the first wheel interface.

In some embodiments, the first steering rod is substantially parallel to first axis and wherein the second steering rod is substantially parallel to the first steering rod.

In some embodiments, the steering linkage further includes: a third link connected to the sub-frame or to the second suspension linkage, the third link is rotatable about an axis that is substantially parallel to the second steering axis, a third steering rod that is transverse to the second spinning axis and to the second steering axis and connected to the first link and to the third link, and a fourth steering rod that is transverse to the third steering rod and connected to the third link and to the second wheel interface to rotate the second wheel interface about the second steering axis.

In some embodiments, the vehicle corner system further includes: a steering actuator connected to the sub-frame and having a first steering actuator rod that is transverse to the first axis and to the first steering axis, and a steering linkage connected to the steering actuator rod and to the first wheel interface to rotate the first wheel interface about the first steering axis.

In some embodiments, the steering linkage includes: a first link connected to the sub-frame or to the first suspension linkage, the first link is rotatable about an axis that is substantially parallel to the first steering axis, wherein the first steering actuator rod is connected to the first link; and a first steering rod that is transverse to the first steering actuator rod and connected to the first link and to the first wheel interface.

In some embodiments, the steering actuator further having a second steering actuator rod that is transverse to the second spinning axis and to the second steering axis; and the steering linkage includes: a second link connected to the sub-frame or to the second suspension linkage, the second link is rotatable about an axis that is substantially parallel to the second steering axis, wherein the second steering actuator rod is connected to the second link; and a second steering rod that is transverse to the second steering actuator rod and connected to the second link and to the second wheel interface to rotate the second wheel interface about the second steering axis.

In some embodiments, the vehicle corner system further includes: a steering actuator connected to the sub-frame and having a steering actuator rod that is transverse to the first and second spinning axes and to the first and second steering axes, and a steering linkage connected to the steering actuator rod and to the first wheel interface to rotate the first wheel interface about the first steering axis.

In some embodiments, the steering actuator rod is substantially parallel to the first axis and the second axis.

In some embodiments, the steering linkage includes: a first link connected to the sub-frame or to the first suspension linkage, the first link is rotatable about an axis that is substantially parallel to the first steering axis, and a first steering rod that is transverse to the steering actuator rod and connected to the first link and to the first wheel interface to rotate the first wheel interface about the first steering axis.

In some embodiments, the steering linkage includes a first coupler connecting the steering actuator rod and the first link.

In some embodiments, the steering linkage to connect the steering actuator rod and to the second wheel interface to rotate the second wheel interface about the second steering axis includes: a second link connected to the sub-frame or to the second suspension linkage, the second link is rotatable about an axis that is substantially parallel to the second steering axis, and a second steering rod that is transverse to the second steering actuator rod and connected to the second link and to the second wheel interface to rotate the second wheel interface about the second steering axis.

In some embodiments, the steering linkage includes a second coupler connecting the steering actuator rod and the second link.

In some embodiments, the vehicle corner system further includes a motion restrainer including a piston assembly interconnecting the first suspension linkage and the second suspension linkage.

In some embodiments, the vehicle corner system further includes a drivetrain unit including at least one motor to spin at least one of the first and second wheel interfaces about the first spinning axis and the second spinning axis, respectively.

Some embodiments of the present invention may provide vehicle corner system which may include: a sub-frame; a first wheel interface having a first spinning axis about which a first wheel spins when connected to the first wheel interface; a first suspension linkage connected to and being transverse to the sub-frame and to the first wheel interface; a second wheel interface having a second spinning axis about which a second wheel spins when connected to the second wheel interface; a second suspension linkage connected to and being transverse to the sub-frame and to the second wheel interface; and a drivetrain unit including at least one motor to spin at least one of the first wheel interface and the second wheel interface about the first spinning axis and the second spinning axis, respectively.

In some embodiments, the drivetrain unit includes: a first motor connected to the sub-frame, and a first driveshaft substantially parallel to the first spinning axis and connected to the first motor and to the first wheel interface to rotate the first wheel interface about the first spinning axis.

In some embodiments, the drivetrain unit includes: a second motor connected to the sub-frame, and a second driveshaft substantially parallel to the second spinning axis and connected to the second motor and to the second wheel interface to rotate the second wheel interface about the second spinning axis.

In some embodiments, the drivetrain unit includes: a motor connected to the sub-frame, a first driveshaft substantially parallel to the first and third axes and connected to the motor, a second driveshaft substantially parallel to the first spinning axis and connected to the first wheel interface, and a first transmission to transmit rotations of the first driveshaft to the second driveshaft to rotate the first wheel interface about the first spinning axis.

In some embodiments, the drivetrain unit further includes: a third driveshaft substantially parallel to the second spinning axis and connected to the second wheel interface, and a second transmission to transmit rotations of the first driveshaft to the third driveshaft to rotate the second wheel interface about the second spinning axis.

In some embodiments, the vehicle corner system includes a controller to control operation of the motor.

In some embodiments, the controller is further to alternately couple and decouple: the first transmission to/from the first driveshaft and the second driveshaft, and the second transmission to/from the second driveshaft and the third driveshaft.

In some embodiments, the drivetrain unit includes a first in-wheel motor connected to the first arm to rotate the first wheel interface about the first spinning axis.

In some embodiments, the drivetrain unit further includes: a second in-wheel motor connected to the second arm to rotate the second wheel interface about the second spinning axis.

In some embodiments, the vehicle corner system includes a motion restrainer including a piston assembly interconnecting the first suspension linkage and the second suspension linkage.

In some embodiments, at least one of: the first wheel interface is rotatable about a first steering axis, and the second wheel interface is rotatable about a second steering axis.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
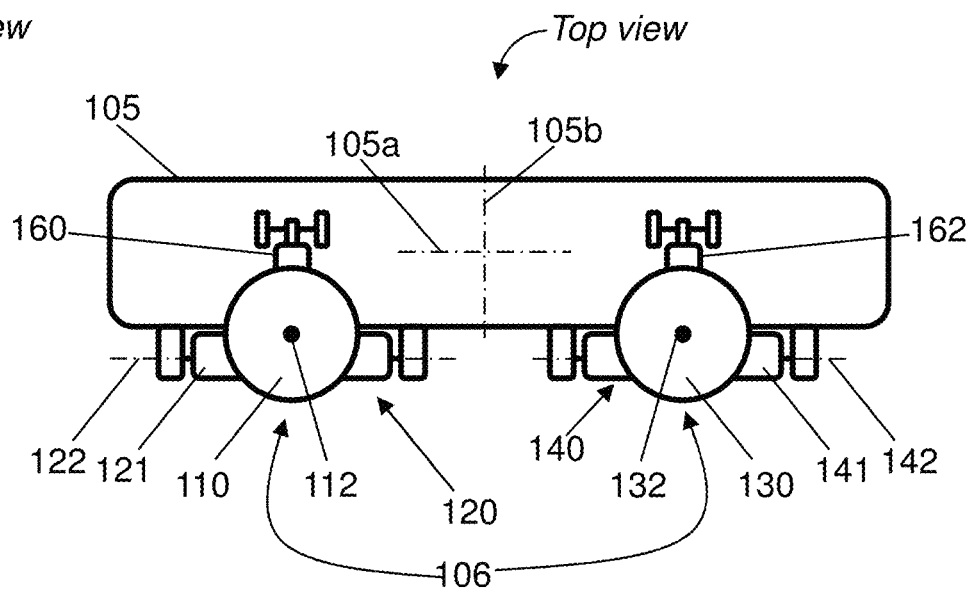
FIGS. 1A and 1B are schematic illustrations of a vehicle corner system for a dual-axle wheels assembly including a suspension unit, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

The following illustrations/description depict embodiments of suspension unit/vehicle corner systems for dual-axle wheels assemblies. Each of these embodiments may include features from other embodiments presented, and embodiments not specifically described may include various features described herein.

Figure 1B:
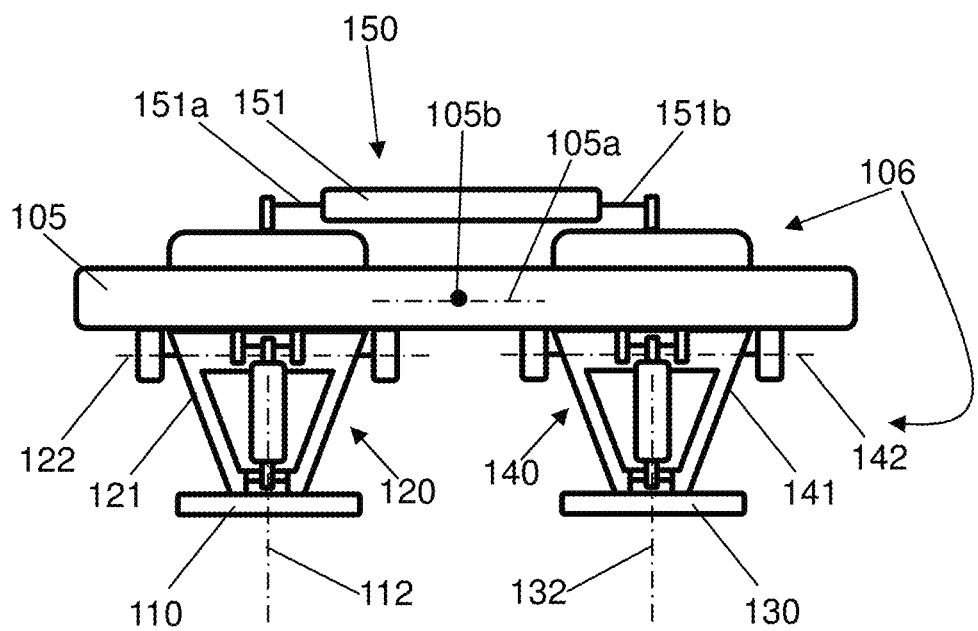

Reference is now made to FIGS. 1A and 1B, which are schematic illustrations of a vehicle corner system 100 for a dual-axle wheels assembly including a suspension unit 106, according to some embodiments of the invention. FIGS. 1A and 1B show schematic side and top views of vehicle corner system 100, respectively.

Figure 1C:
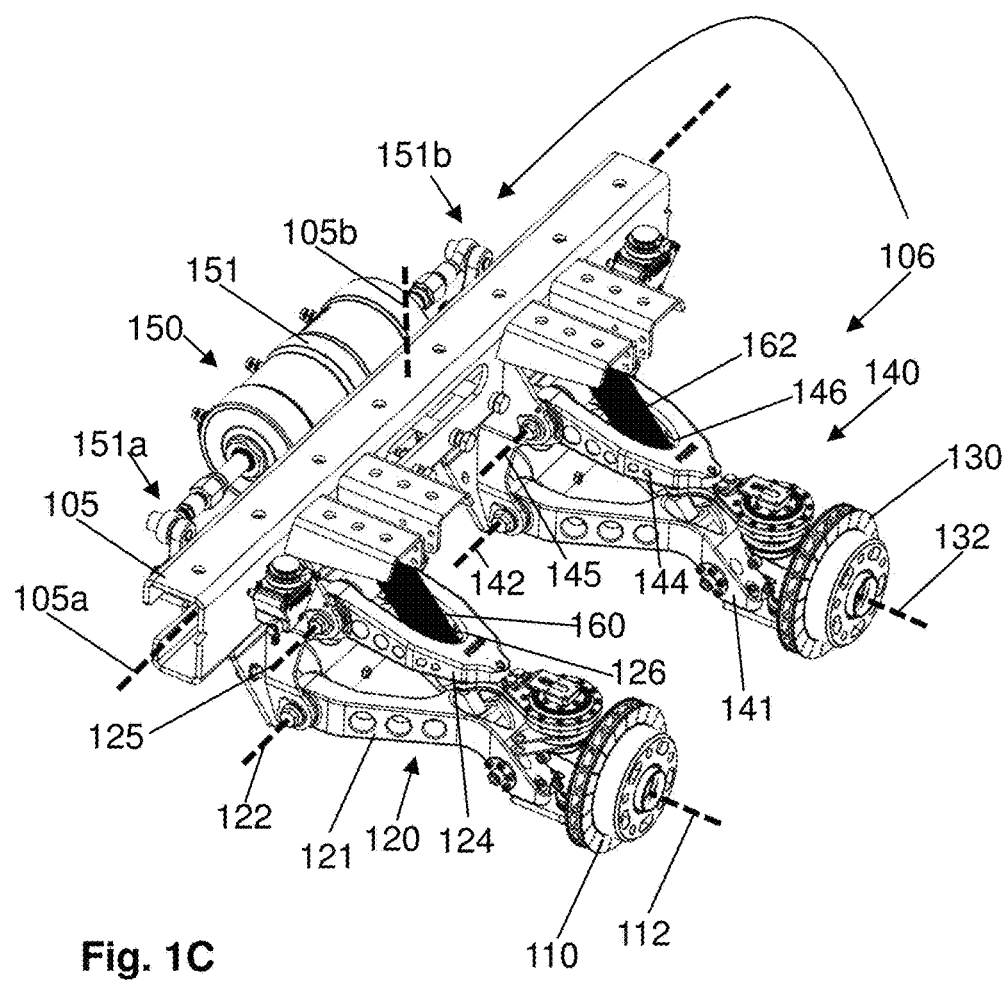
FIGS. 1C and 1D are 3D diagrams of an example of the vehicle corner system schematically shown in FIGS. 1A-1B, according to some embodiments of the invention.
Figure 1D:
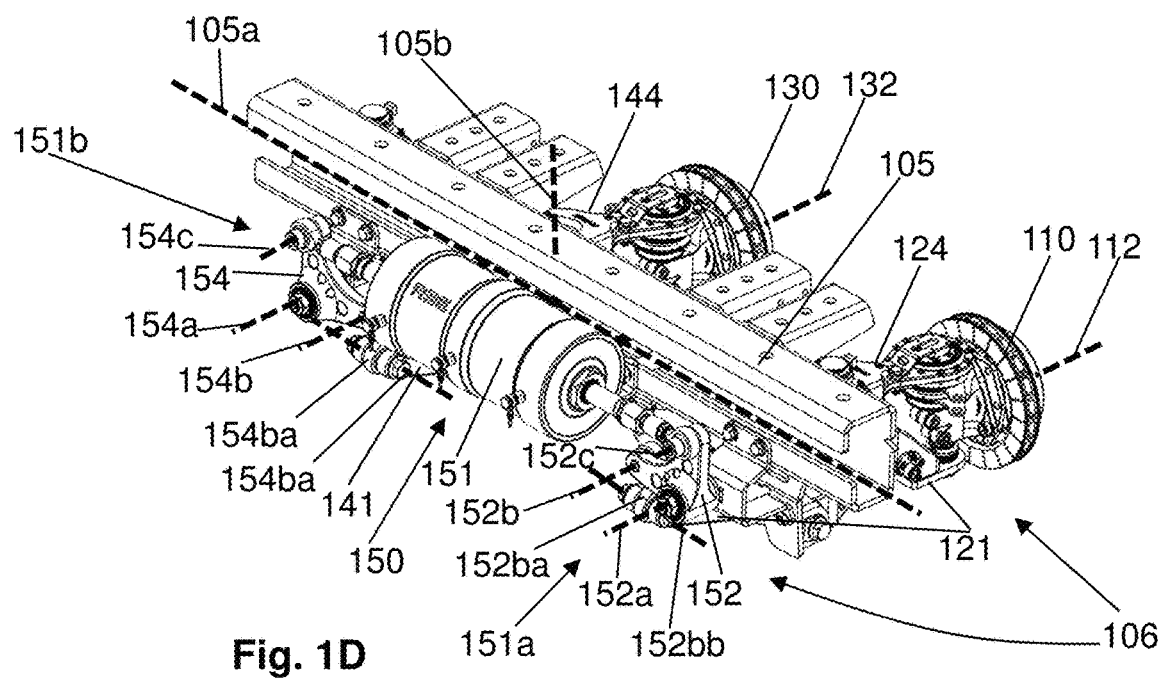

Reference is also made to FIGS. 1C and 1D, which are 3D diagrams of an example of vehicle corner system 100 schematically shown in FIGS. 1A-1B, according to some embodiments of the invention. FIGS. 1C and 1D show various perspective views of vehicle corner system 100.

Figure 1E:
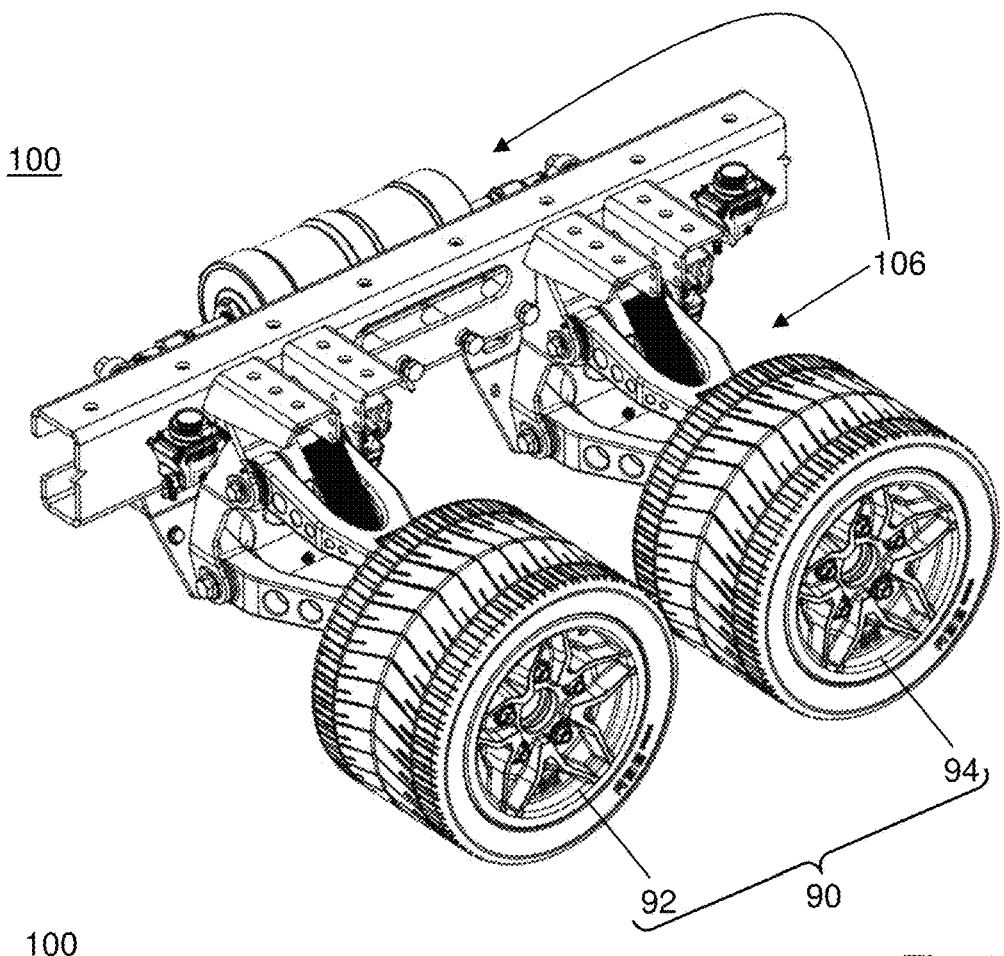
FIGS. 1E and 1F are 3D diagrams of the example of the vehicle corner system of FIGS. 1C-1D and of wheels assembled thereto, according to some embodiments of the invention.
Figure 1F:
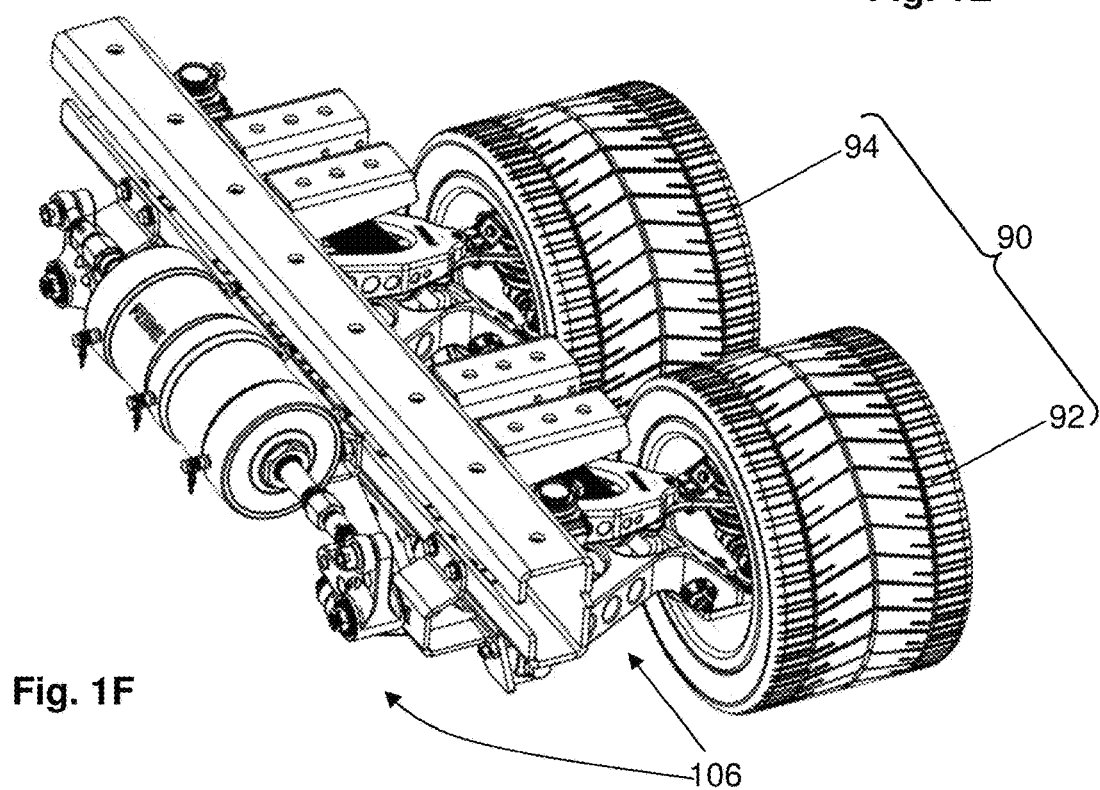

Reference is also made to FIGS. 1E and 1F, which are 3D diagrams of the example of vehicle corner system 100 of FIGS. 1C-1D and of wheels 92, 94 assembled thereto, according to some embodiments of the invention. FIGS. 1E and 1F show various perspective views of vehicle corner system 100 and wheels 92, 94 of dual-axle wheels assembly 90 assembled thereto.

According to some embodiments of the invention, vehicle corner system 100 includes a sub-frame 105, a suspension unit 106, a first wheel interface 110 and a second wheel interface 130. Suspension unit 106 may include a first suspension linkage 120 and a second suspension linkage 140. In some embodiments, first wheel interface 110 and second wheel interface 130 are part of suspension unit 106.

Sub-frame 105 may be connected to a reference frame (e.g., chassis platform or part of the body) of a vehicle. Sub-frame 105 may have a longitudinal sub-frame axis 105a and a vertical sub-frame axis 105b. Longitudinal sub-frame axis 105a may be parallel (or substantially parallel) to any longitudinal axis of the reference frame of the vehicle when suspension unit 106 is assembled therein. Vertical sub-frame axis 105b may be parallel (or substantially parallel) to any vertical axis of the reference frame of the vehicle when suspension unit 106 is assembled therein.

First wheel interface 110 may, for example, be or may include a wheel knuckle, a wheel upright, a wheel hub, a wheel bearing, and other wheel interface elements known in the art. First wheel interface 110 may have a first spinning axis 112 about which a first wheel may spin (e.g. rotate) when connected to first wheel interface 110.

First suspension linkage 120 may be connected to sub-frame 105 and to first wheel interface 110. First suspension linkage 120 may be transverse to first wheel interface 110 and/or to sub-frame 105. In some embodiments, first suspension linkage 120 includes one or more arms. In some embodiments, first suspension linkage 120 includes a first arm (e.g. first control arm) 121 (e.g., as shown in FIGS. 1A and 1B). First arm 121 may be connected to first wheel interface 110. First arm 121 may be connected to sub-frame 105. First arm 121 may be transverse to first wheel interface 110 and/or to sub-frame 105. First arm 121 may rotate with respect to sub-frame 105 about a first axis 122. First axis 122 may be perpendicular (or substantially perpendicular) to first spinning axis 112.

Second wheel interface 130 may, for example, be or may include a wheel knuckle, a wheel upright, a wheel hub, a wheel bearing, and other wheel interface elements known in the art. Second wheel interface 130 may have a second spinning axis 132 about which a second wheel may spin (e.g. rotate) when connected to second wheel interface 130.

Second suspension linkage 140 may be connected to sub-frame 105 and to second wheel interface 130. Second suspension linkage 140 may be transverse to second wheel interface 130 and/or to sub-frame 105. In some embodiments, second suspension linkage 140 includes one or more arms. In some embodiments, second suspension linkage 140 includes a second arm (e.g. second control arm) 141. Second arm 141 may be connected to second wheel interface 130. Second arm 141 may be connected to sub-frame 105. Second arm 141 may be transverse to second wheel interface 130 and/or to sub-frame 105. Second arm 141 may rotate with respect to sub-frame 105 about a second axis 142. Second axis 142 may be perpendicular (or substantially perpendicular) to second spinning axis 113.

In some embodiments, first axis 122 and second axis 142 are aligned along an axis that is perpendicular (or substantially perpendicular) to first spinning axis 112 and second spinning axis 132.

In some embodiments, first suspension linkage 120 includes a third arm (e.g. third control arm) 124 (e.g., as shown in FIGS. 1C and 1D). In some embodiments, second suspension linkage 140 includes a fourth arm (e.g. fourth control arm) 144 (e.g., as shown in FIGS. 1C and 1D). Third arm 124 may be connected to first wheel interface 110. Third arm 124 may be connected to sub-frame 105. Third arm 124 may be transverse to first wheel interface 130 and/or to sub-frame 105. In some embodiments, third arm 124 may rotate with respect to sub-frame 105 about a third axis 125 that is perpendicular (or substantially perpendicular) to first spinning axis 112. Fourth arm 144 may be connected to second wheel interface 130. Fourth arm 144 may be connected to sub-frame 105. Fourth arm 144 may be transverse to second wheel interface 130 and/or to sub-frame 105. In some embodiments, fourth arm 144 may rotate with respect to sub-frame 105 about a fourth axis 145 that is perpendicular (or substantially perpendicular) to second spinning axis 132. In some embodiments, third axis 125 and fourth axis 145 are aligned along an axis that is perpendicular (or substantially perpendicular) to first spinning axis 112 and second spinning axis 132.

In some embodiments, each of first suspension linkage 120 and second suspension linkage 140 is a multi-link suspension wherein each of first wheel interface 110 and second wheel interface 130 are coupled to sub-frame 105 using two or more arms to provide a suspension motion of wheel interfaces 110, 130 with respect to sub-frame 105. In some embodiments, each of the two or more arms of the respective suspension linkage is transverse to the respective wheel interface. For example, suspension unit 106 may include a double-wish-bone like suspension for each of first wheel interface 110 and second wheel interface 130 (e.g., as shown in FIGS. 1C and 1D).

In some embodiments, suspension unit 106 includes a motion restrainer 150. Motion restrainer 150 may include a piston assembly 151. Piston assembly 151 may interconnect first suspension linkage 120 and second suspension linkage 140. In some embodiments, piston assembly 151 interconnects first arm 121 and second arm 141 (e.g., as shown in FIGS. 1B, 1C and 1D). In some embodiments, piston assembly 151 is connected to sub-frame 105. Piston assembly 151 and first arm 121 may rotate with respect to each other. Piston assembly 151 and second arm 141 may rotate with respect to each other. Piston assembly 151 may be connected to sub-frame 105 and to first suspension linkage 120 using a first linkage 151a. Piston assembly 151 may be connected to sub-frame 105 and to second suspension linkage 140 using a second linkage 151b.

Various configurations of first and second linkages 151a, 151b may be used to connect piston assembly 151 to first and second suspension linkages 120, 140, respectively and/or to sub-frame 105. For example, first linkage 151a may include a first link 152 connected to sub-frame 105. First link 152 may rotate with respect to sub-frame 105 about an axis 152a that is parallel (or substantially parallel) to, for example, first spinning axis 112. First arm 121 may be connected to first link 152 and may rotate with respect to first link 152 about an axis 152b that is parallel to axis 152a. In some embodiments, first arm 121 is connected to first link 152 using a first connection rod 152ba (e.g., as shown in FIG. 1D). In some embodiments, first connection rod 152ba may rotate with respect to first arm 121 about an axis 152bb that is parallel to axis 152b. Piston assembly 151 may be connected to first link 152 and may rotate with respect to first link 152 about an axis 152c that is parallel to axis 152a. First link 152 may be a crank, a bellcrank, an oval crank, a circular crank, an "L" shaped crank, or polygonal crank.

In the same example, second linkage 151b may include a second link 154 connected to sub-frame 105. Second link 154 may rotate with respect to sub-frame 105 about an axis 154a that is parallel (or substantially parallel) to, for example, second spinning axis 132. Second arm 141 may be connected to second link 154 and may rotate with respect to second link 154 about an axis 154b that is parallel to axis 154a. In some embodiments, second arm 141 is connected to second link 154 using a second connection rod 154ba (e.g., as shown in FIG. 1D). In some embodiments, second connection rod 154ba may rotate with respect to second arm 141 about an axis 154bb that is parallel to axis 154b. Piston assembly 151 may be connected to second link 154 and may rotate with respect to second link 154 about an axis 154c that is parallel to axis 154a. Second link 154 may be a crank, a bellcrank, an oval crank, a circular crank, an "L" shaped crank, or polygonal crank.

Other configurations of first and second linkages 151a, 151b are also possible.

In some embodiments, piston assembly 151 is disposed between first suspension linkage 120 and second suspension linkage 140 (e.g. between first arm 121 and second arm 141). In some embodiments, piston assembly 151 is disposed between first spinning axis 112 and second spinning axis 132. In some embodiments, piston assembly 151 is aligned along an axis that is parallel (or substantially parallel) to first axis 122 and second axis 142 (e.g., as shown in FIGS. 1B, 1C and 1D). In some embodiments, (i) first wheel interface 110 and second wheel interface 130, and (ii) piston assembly 151 are at opposite sides of sub-frame 105 with respect to each other (e.g., as shown in FIGS. 1B, 1C and 1D). Such position and/or orientation of piston assembly 151 with respect to first suspension linkage 120 and second suspension linkage 140 may, for example, provide a compact suspension unit in one or more of longitudinal, lateral, and vertical dimensions. In some embodiments, piston assembly 151, first wheel interface 110 and second wheel interface 130 are positioned at the same side of sub-frame 105.

Motion restrainer 150 and/or piston assembly 151 may, for example, restrain, dampen, control and/or support a relative motion between first suspension linkage 120 and second suspension linkage 140 with respect to each other and/or with respect to sub-frame 105. Motion restrainer 150 and/or piston assembly 151 may, for example, restrain and/or control a relative distance and/or a relative motion of first spinning axis 112 of first wheel interface 110 and the second spinning axis 132 of second wheel interface 130 with respect to each other. Motion restrainer 150 and/or piston assembly 151 may, for example, transfer a load applied on first suspension linkage 120 to suspension linkage 140 and may transfer a load applied on second suspension linkage 140 to first suspension linkage 120. Motion restrainer 150 and/or piston assembly 151 may, for example, push each of the first wheel and the second wheel connected to first wheel interface 110 and second wheel interface 130, respectively, to a road surface by applying forces on first suspension linkage 120 and second suspension linkage 140. In this manner, the traction of the first wheel and the second wheel of the dual-axle wheels assembly with the road surface may be maintained when, for example, the first wheel or the second wheel is lowered with respect to the other and/or drops away of sub-frame 105 or the reference frame (e.g., due to a bump or a hole on the road surface).

Figure 1G:
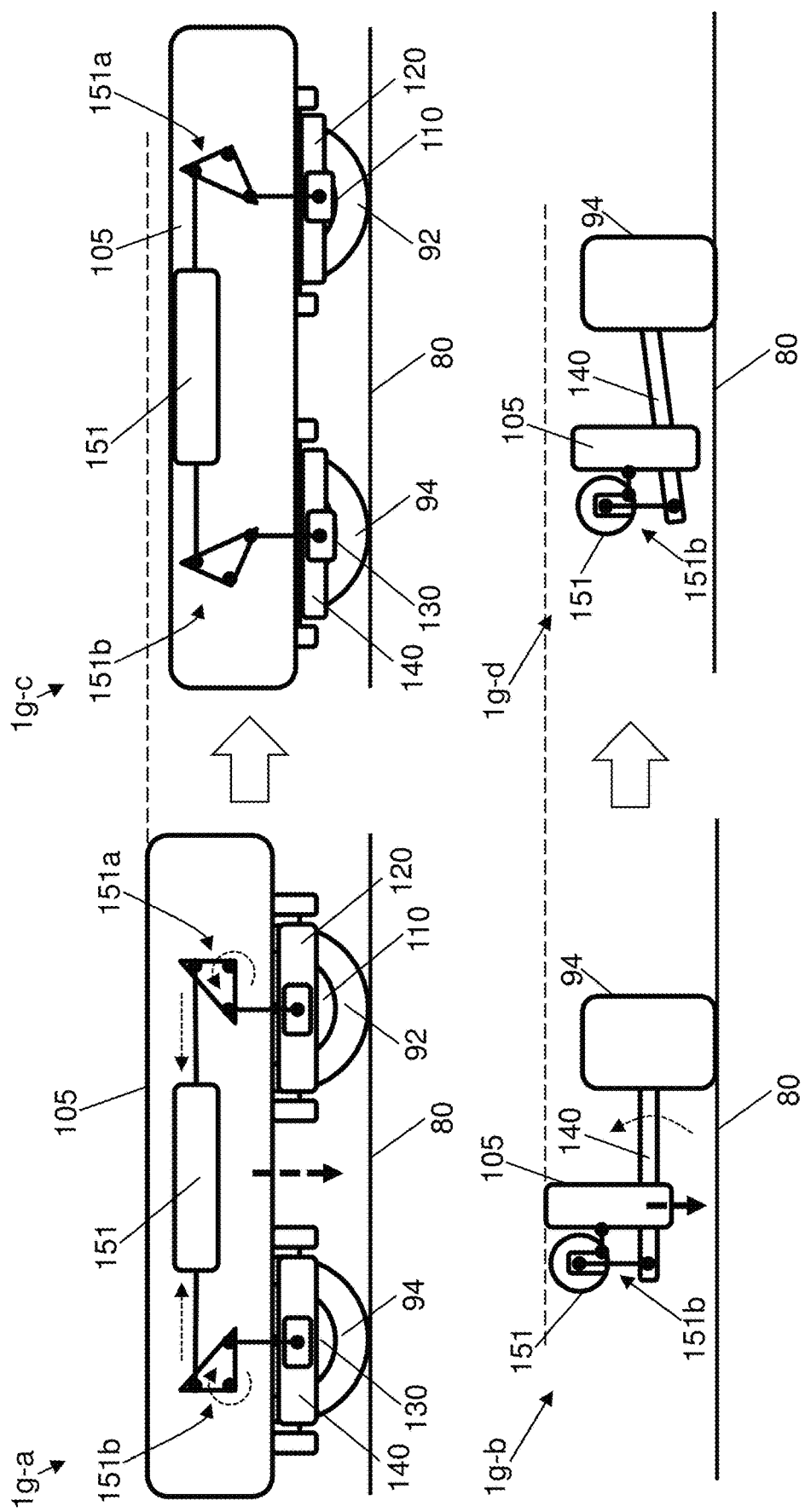
FIGS. 1G and 1H are schematic illustrations of a vehicle corner system showing the vehicle corner system at different heights relative to the ground, and of wheels of the dual-axle wheels assembly assembled to the vehicle corner system, according to some embodiments of the invention.

Motion restrainer 150 may control a length of piston assembly 151, e.g. by controlling a distance between connection points of piston assembly 151 to first and second suspension linkages 120, 140/first and second linkages 151a, 151b. When vehicle corner system 100 is assembled to the vehicle platform, the length of piston assembly 151 (e.g. the distance between connection points of piston assembly 151 to first and second suspension linkages 120, 140 and/or first and second linkages 151a, 151b) may define a height of sub-frame 105 and thus the height of the vehicle platform relative to the ground. By controlling the distance between connection points of piston assembly 151 to first and second suspension linkages 120, 140/first and second linkages 151a, 151b, motion restrainer 150 and/or piston assembly 151 may control the height of sub-frame 105 and thus the height of the vehicle platform relative to the ground. For example, the greater length of piston assembly 151 (e.g. the greater the distance between connection points of piston assembly 151 to first and second suspension linkages 120, 140/first and second linkages 151a, 151b), the higher sub-frame 105 and thus vehicle corner system 100 and the vehicle platform relative to the ground (e.g. lifting; as described below with respect to FIG. 1H). In the same example, for example as shown in FIG. 1G, the smaller length of piston assembly 151 (e.g. the smaller the distance between connection points of piston assembly 151 to first and second suspension linkages 120, 140/first and second linkages 151a, 151b), the lower sub-frame 105 and thus vehicle corner system 100 and the vehicle platform relative to the ground (e.g. kneeling; as described below with respect to FIG. 1G).

In some embodiments, motion restrainer 150 includes a piston. In some embodiments, motion restrainer 150 includes a damper. In various embodiments, motion restrainer 150 sets and/or controls a damping profile of the damper. In some embodiments, motion restrainer 150 includes a spring. In some embodiments, motion restrainer includes a spring-damper. In some embodiments, motion restrainer 150 includes a coil spring. In some embodiment, motion restrainer 150 includes a fluid shock absorber. In some embodiments, motion restrainer 150 includes a magnetic shock absorber. In some embodiments, motion restrainer 150 includes a pneumatic mechanism. In some embodiments, motion restrainer 150 includes a hydraulic mechanism. In some embodiments, motion restrainer 150 includes a hydro-pneumatic mechanism. In some embodiments, motion restrainer 150 includes a telescopic mechanism. In some embodiments, motion restrainer 150 includes a screw mechanism (e.g. a ball screw mechanism or a screw shaft mechanism). In some embodiments, motion restrainer 150 includes a shock absorber (e.g. an active shock absorber). Various embodiments of motion restrainer 150 for suspension unit 106 are described below.

In some embodiments, suspension unit 106 includes a first shock absorber 160 and a second shock absorber 162 (e.g., as shown in FIGS. 1A, 1B and 1C). First shock absorber 160 may be connected to first arm 121 and to sub-frame 105. In some embodiments, first shock absorber 160 may rotate with respect to sub-frame 105 and with respect to first arm 121 about axes that are parallel (or substantially parallel) to first axis 122. Second shock absorber 162 may be connected to second arm 141 and to sub-frame 105. In some embodiments, second shock absorber 162 may rotate with respect to sub-frame 105 and with respect to second arm 141 about axes that are parallel (or substantially parallel) to second axis 142. In various embodiments, first shock absorber 160 and/or second shock absorber 162 are substantially perpendicular to motion restrainer 150.

In various embodiments, first shock absorber 160, second shock absorber 162 or both is a telescopic shock absorber. In some embodiments, each of first shock absorber 160 and second shock absorber 162 includes a spring. In some embodiments, each of first shock absorber 160 and second shock absorber 162 includes a damper. In some embodiments, each of first shock absorber 160 and second shock absorber 162 includes a spring-damper.

In some embodiments, the motion of first wheel interface 110 and second wheel interface 130 with respect to sub-frame 105 is linear (or a substantial linear). In some embodiments, first wheel interface 110 and second wheel interface 130 move along a straight (or substantially straight) line. In some embodiments, the motion of first wheel interface 110 and second wheel interface 130 with respect to sub-frame 105 is arcuated (e.g., providing camber as in typical vehicle suspension units). In some embodiments, first wheel interface 110 and second wheel interface 130 move along an arc (e.g., a camber arc as in typical vehicle suspension units).

In some embodiments, third arm 124 includes a third arm aperture 126 and fourth arm 144 includes a fourth arm aperture 146, wherein first shock absorber 160 extends through third arm aperture 126 and second shock absorber 146 extends through fourth arm aperture 146.

First arm 121 and second arm 141 of first suspension linkage 120 may be transverse to first wheel interface 110. Third arm 124 and fourth arm 144 of second suspension linkage 140 may be transverse to second wheel interface 130. In various embodiments, (i) first arm 121 and second arm 141 of first suspension linkage 120 and/or (ii) third arm 124 and fourth arm 144 of second suspension linkage 140 are wishbone-shaped arms (e.g., as shown in FIGS. 1C and 1D). It is noted that other configurations of first suspension linkage 120 and/or second suspension linkage 140 are also possible. For example, first suspension linkage 120 and/or second suspension linkage 140 may each be based on multi-link, McPherson or sliding pillar suspension mechanisms.

Suspension unit 106 may be assembled to a reference frame (e.g. chassis) of the vehicle platform, and wheels 92, 94 of dual-axle wheels assembly 90 may be assembled to suspension unit 106 (e.g., as shown in FIGS. 1E and 1F). During motion of the vehicle platform on a road, motion restrainer 150 and/or piston assembly 151 of suspension unit 106 may control a relative motion and/or a relative distance of first suspension linkage 120 and/or second suspension linkage 140 with respect to sub-frame 105 and/or with respect to each other, while each of first shock absorber 160 and second shock absorber 162 may provide a separate damping of each of wheels 92, 94 of dual-axle wheels assembly 90 independent of another wheel thereof. Such suspension unit 106 may provide both (i) high-amplitude articulation of first and second suspension linkages 120, 140 during motion of wheels 92, 94 over relatively large obstacles at relatively low motion speed, and (ii) dampen relatively small oscillations of first and second suspension linkages 120, 140 during motion of wheels 92, 94 over relatively small obstacles at relatively high motion speed. Motion restrainer 150 and/or piston assembly 151 may be further set a desired height of the reference frame of the vehicle platform above the road surface.

Figure 1H:
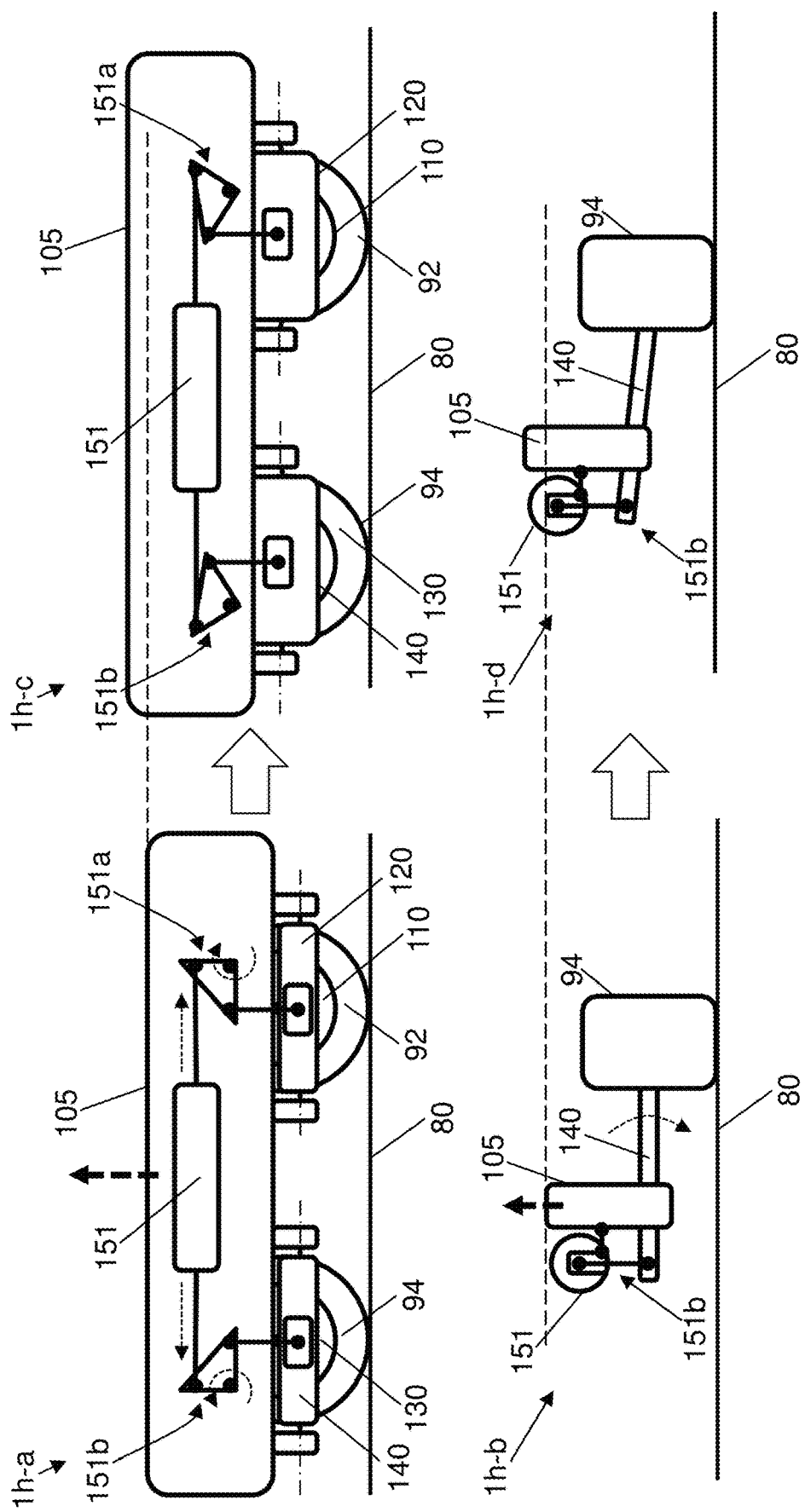

Reference is now made to FIGS. 1G and 1H, which are schematic illustrations of vehicle corner system 100 showing vehicle corner system 100 at different heights relative to ground 80, and of wheels 92, 94 of dual-axle wheels assembly 90 assembled to vehicle corner system 100, according to some embodiments of the invention.

Illustrations 1g-a, 1g-b in FIG. 1G show schematic rear and side views of vehicle corner system 100 in an initial position, and illustrations 1g-c, 1g-d in FIG. 1G show schematic rear and side views of vehicle corner system 100 in a lowered position. Illustrations 1h-a, 1h-b in FIG. 1H show schematic rear and side views of vehicle corner system 100 in the initial position, and illustrations 1h-c, 1h-d in FIG. 1H show schematic rear and side views of vehicle corner system 100 in an elevated position.

As described above with respect to FIGS. 1A-1F, motion restrainer 150 may control the height of sub-frame 105 and thus the height of the vehicle platform relative to ground 80 by controlling the distance between connection points of piston assembly 151 to first and second suspension linkages 120, 140/first and second linkages 151a, 151b.

For example, as shown in FIG. 1G, decreasing the distance between connection points of piston assembly 151 to first and second suspension linkages 120, 140/first and second linkages 151a, 151b (e.g. as indicated by dashed arrows in illustration 1g-a) may cause first and second suspension linkages 120, 140 to rotate with respect to sub-frame 105 and cause sub-frame 105 and vehicle corner system 100 to move towards ground 80 (e.g. as indicated by dashed arrows in illustration 1g-a) to lower sub-frame 105 towards ground 80 (e.g. as shown in illustrations 1g-c, 1g-d) as compared to the initial position (e.g. as shown in illustrations 1g-a, 1g-b).

In another example, as shown in FIG. 1H, increasing the distance between connection points of piston assembly 151 to first and second suspension linkages 120, 140/first and second linkages 151a, 151b (e.g. as indicated by dashed arrows in illustration 1h-a) may cause first and second suspension linkages 120, 140 to rotate with respect to sub-frame 105 and cause sub-frame 105 and vehicle corner system 100 to move away from ground 80 (e.g. as indicated by dashed arrows in illustration 1h-a) to elevate sub-frame 105 with respect to ground 80 (e.g. as shown in illustrations 1h-c, 1h-d) as compared to the initial position (e.g. as shown in illustrations 1h-a, 1h-b).

Some embodiments of the present invention may provide a vehicle corner system for a dual-axle wheels assembly including suspension unit 106 and a steering unit to rotate first wheel interface 110 and/or second wheel interface 130 about a first steering axis and a second steering axis, respectively.

In some embodiments, the first steering axis is perpendicular (or substantially perpendicular) to first spinning axis 112 and first axis 122. In some embodiments, the first steering axis is at a first caster angle with respect to first spinning axis 112. In some embodiments, the second steering axis is perpendicular (or substantially perpendicular) to second spinning axis 132 and second axis 142. In some embodiments, the second steering axis is at a second caster angle with respect to second spinning axis 132.

In some embodiments, the first steering axis extends through first arm 121 of suspension unit 106. In some embodiments, the second steering axis extends through second arm 141 of suspension unit 106. In some embodiments, the first steering axis extends through third arm 124 of suspension unit 106. In some embodiments, the second steering axis extends through fourth arm 144 of suspension unit 106.

In some embodiments, the steering unit may simultaneously (or substantially simultaneously) rotate first wheel interface 110 and second wheel interface 130 about the first steering axis and the second steering axis, respectively. In some embodiments, the steering unit may simultaneously rotate first wheel interface 110 and second wheel interface 130 about the first steering axis and the second steering axis, respectively, in the same direction. In some embodiments, the steering unit may simultaneously rotate first wheel interface 110 and second wheel interface 130 about the first steering axis and the second steering axis, respectively, in the same direction, and wherein first wheel interface 110 is being rotated to a first steering angle and the second wheel interface is being rotated to a second steering angle. The first steering angle and/or the second steering angle may be predetermined based on, for example, a geometry of a vehicle chassis platform assembled with the vehicle corner system. For example, the first steering angle and/or the second steering angle may be predetermined Ackermann angles. In another example, the first steering angle and/or the second steering angle may be dynamically dedicated by a dynamic turning center point of the vehicle chassis platform assembled with the vehicle corner system.

In some embodiments, the steering unit provides first wheel interface 110 and second wheel interface 130 with different steering characteristics. For example, in some embodiments, the steering unit may rotate first wheel interface 110 and second wheel interface 130 about the first steering axis and the second steering axis, respectively, at different steering rates, different steering angles and/or different steering directions. For example, the steering unit may rotate first wheel interface 110 and second wheel interface 130 in different steering directions to cause a vehicle chassis platform assembled with the vehicle corner system brake and/or stabilize the vehicle chassis platform on the road.

Various embodiments of steering units are described hereinbelow with respect to FIGS. 3, 4, 5A-5D, 6 and 7.

Figure 2:
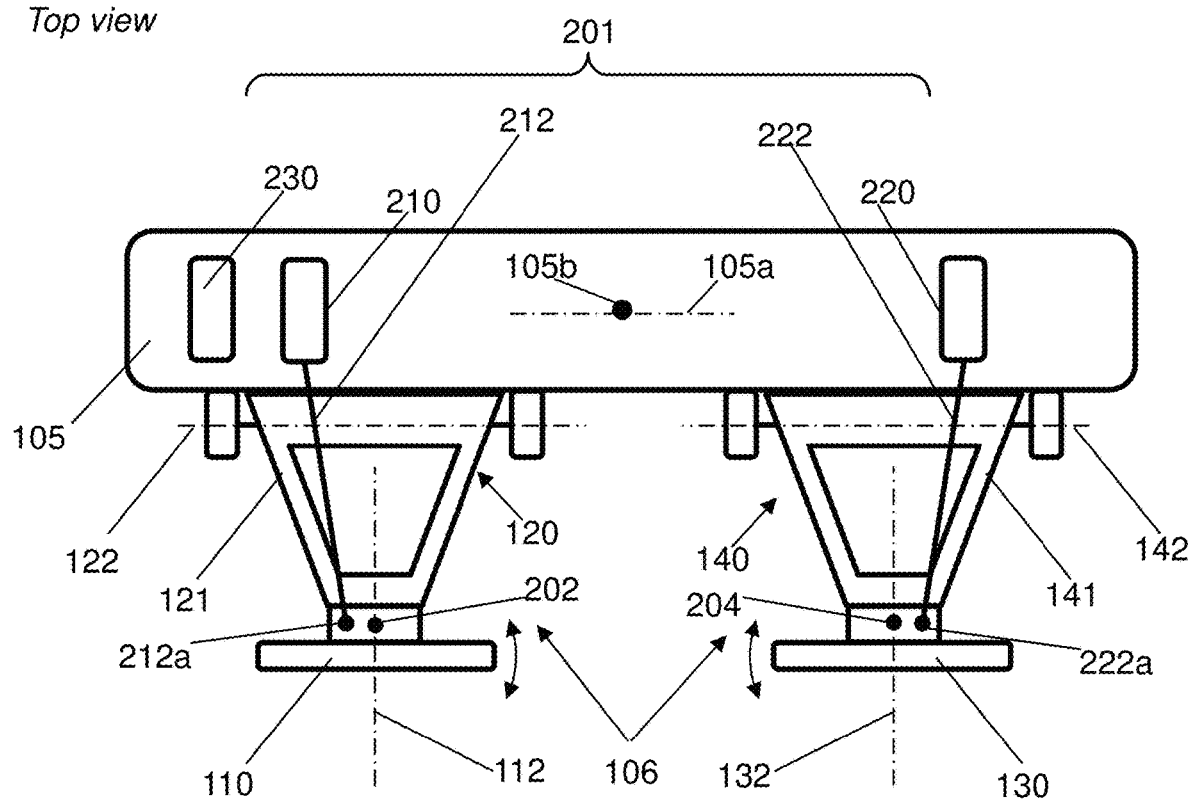
FIG. 2 is a schematic illustration of a vehicle corner system for a dual-axle wheels assembly including the suspension unit and a steering unit including two steering actuators, according to some embodiments of the invention.

Reference is now made to FIG. 2, which is a schematic illustration of a vehicle corner system 200 for a dual-axle wheels assembly including suspension unit 106 and a steering unit 201 including two steering actuators, according to some embodiments of the invention. FIG. 2 shows a schematic top view of vehicle corner system 200.

Steering unit 201 may rotate first wheel interface 110 and/or second wheel interface 130 about a first steering axis 202 and a second steering axis 204, respectively.

Steering unit 201 may include a first steering actuator 210 having a first steering actuator rod 212. First steering actuator 210 may move first steering actuator rod 212 to rotate first wheel interface 110 about first steering axis 202. First steering actuator 210 may be connected to sub-frame 105 of corner assembly 200. First steering actuator rod 212 may be connected to first wheel interface 110. When actuated, first steering actuator rod 212 may rotate with respect to first wheel interface 110 about an axis 212a that is parallel (or substantially parallel) to, for example, first steering axis 202. In some embodiments, first steering actuator rod 212 is in acute angle with respect to first spinning axis 112. In some embodiments, first steering actuator rod 212 is parallel (or substantially parallel) to first spinning axis 112 of first wheel interface 110.

In some embodiments, steering unit 201 includes a second steering actuator 220 having a second steering actuator rod 222. Second steering actuator 220 may move second steering actuator rod 222 to rotate second wheel interface 130 about second steering axis 204. Second steering actuator 220 may be connected to sub-frame 105. Second steering actuator rod 222 may be connected to second wheel interface 130. When actuated, second steering actuator rod 222 may rotate with respect to second wheel interface 130 about an axis 222a that parallel (or substantially parallel) to, for example, second steering axis 204. In some embodiments, second steering actuator rod 222 is in acute angle with respect to first spinning axis 132. In some embodiments, second steering actuator rod 222 is parallel (or substantially parallel) to second spinning axis 132 of second wheel interface 130.

In some embodiments, vehicle corner system 200 includes a controller 230. Controller 230 may control operation of at least one of first steering actuator 212 and second steering actuator 214. In some embodiments, controller 230 synchronizes operation of first steering actuator 212 and second steering actuator 214.

Figure 3:
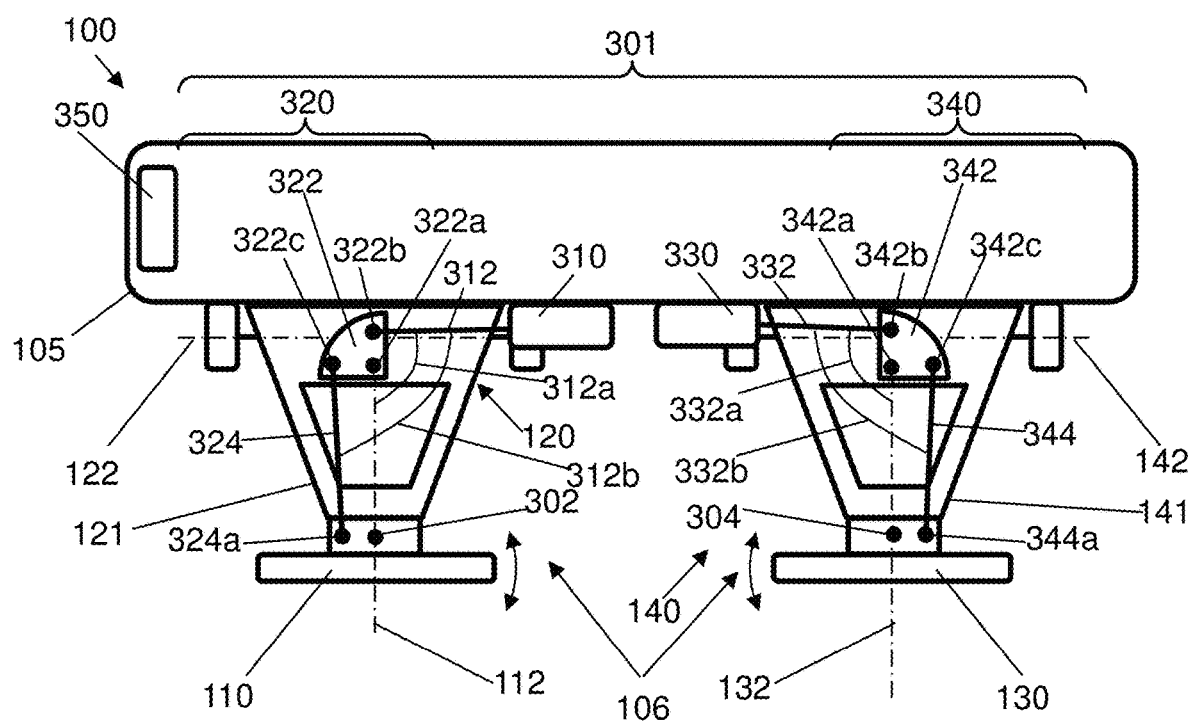
FIG. 3 is a schematic illustration of a vehicle corner system for a dual-axle wheels assembly including the suspension unit and a steering unit including two steering actuators and two steering linkages, according to some embodiments of the invention.

Reference is now made to FIG. 3, which is a schematic illustration of a vehicle corner system 300 for a dual-axle wheels assembly including suspension unit 106 and a steering unit 301 including two steering actuators and two steering linkages, according to some embodiments of the invention. FIG. 3 shows a schematic top view of vehicle corner system 300.

Steering unit 301 may rotate first wheel interface 110 and/or second wheel interface 130 about a first steering axis 302 and a second steering axis 304, respectively.

Steering unit 301 may include a first steering actuator 310 having a first steering actuator rod 312. First steering actuator 310 may be connected to sub-frame 105. In some embodiments, first steering actuator rod 312 is transverse to first spinning axis 112. In some embodiments, first steering actuator rod 312 is transverse to first steering axis 302. In some embodiments, first steering actuator rod 312 is perpendicular (or substantially perpendicular) to first spinning axis 112. In some embodiments, first steering actuator rod 312 is at an acute angle with respect to an axis that is parallel to first spinning axis 112. In some embodiments, first steering actuator rod 312 is at an obtuse angle with respect to an axis that is parallel to first spinning axis 112 (e.g., an angle 312a schematically shown in FIG. 3). In some embodiments, first steering actuator rod 312 is at an acute angle with respect to first axis 122. In some embodiments, first steering actuator rod 312 is parallel (or substantially parallel) to first axis 122.

Steering unit 301 may include a first steering linkage 320 to connect first steering actuator rod 312 to first wheel interface 110. In some embodiments, first steering linkage 320 includes a first link 322 and a first steering rod 324. First link 322 may be connected to, for example, first arm 121 and may rotate with respect to first arm 121 about an axis 322a that is parallel (or substantially parallel) to, for example, first steering axis 302. In some embodiments, first link 322 is not connected to first arm 121. In some embodiments, first link 322 is connected (e.g. directly or indirectly) to sub-frame 105 (not shown). First steering actuator rod 312 may be connected to first link 322 and may rotate with respect to first link 322 about an axis 322b that is parallel to axis 322a. First steering rod 324 may be connected to first link 322 and to first wheel interface 310. First steering rod 324 may rotate with respect to first link 322 about an axis 322c that is parallel to axis 322c. First link 322 may include, for example, a crank, a bellcrank, an oval crank, a circular crank, an "L" shaped crank, or polygonal crank. First steering rod 324 may rotate with respect to first wheel interface 110 about an axis 324a that is parallel (or substantially parallel) to, for example, first steering axis 302. First steering actuator rod 312 may be connected to first steering rod 324 via first link (e.g. crank) 322.

In some embodiments, first steering rod 324 is transverse to first steering actuator rod 312. In some embodiments, first steering rod 324 is perpendicular (or substantially perpendicular) to first steering actuator rod 312. In some embodiments, first steering rod 324 is at an acute angle with respect to an axis that is parallel to first steering actuator rod 312 (e.g., an angle 312b schematically shown in FIG. 3). In some embodiments, first steering rod 324 is at an obtuse angle with respect to an axis that is parallel to first steering actuator rod 312. In some embodiments, first steering rod 324 is parallel (or substantially parallel) to first spinning axis 112.

Angles between (i) first steering actuator rod 312 and the axis that is parallel to first spinning axis 112 (e.g., angle 312a schematically shown in FIG. 4), and (ii) first steering rod 324 and the axis that is parallel to first steering actuator rod 312 (e.g., an angle 312b schematically shown in FIG. 3) may vary during steering of first wheel interface 110 in a first steering direction and in a second steering direction. For example, during steering of first wheel interface 110, an obtuse angle may become acute and an acute angle may become obtuse.

In some embodiments, steering unit 301 may include a second steering actuator 330 having a second steering actuator rod 332. Second steering actuator 330 may be connected to sub-frame 105.

In some embodiments, second steering actuator rod 332 is transverse to second spinning axis 132. In some embodiments, second steering actuator rod 332 is transverse to second steering axis 304. In some embodiments, second steering actuator rod 332 is perpendicular (or substantially perpendicular) to second spinning axis 132. In some embodiments, second steering actuator rod 332 is at an acute angle with respect to an axis that is parallel to second spinning axis 132. In some embodiments, second steering actuator rod 332 is at an obtuse angle with respect to an axis that is parallel to second spinning axis 132 (e.g., an angle 332a schematically shown in FIG. 3). In some embodiments, second steering actuator rod 332 is at an acute angle with respect to second axis 142. In some embodiments, second steering actuator rod 332 is parallel (or substantially parallel) to second axis 142.

Steering unit 301 may include a second steering linkage 340 to connect second steering actuator rod 342 to second wheel interface 130. In some embodiments, second steering linkage 340 includes a second link 342 and a second steering rod 344. Second link 342 may be connected to, for example, second arm 141 and may rotate with respect to second arm 141 about an axis 342a that is parallel (or substantially parallel) to, for example, second steering axis 304. In some embodiments, second link 342 is not connected to second arm 141. In some embodiments, second link 342 is connected (e.g. directly or indirectly) to sub-frame 105 (not shown). Second steering actuator rod 332 may be connected to second link 342 and may rotate with respect to second link 342 about an axis 342b that is parallel to axis 342a. Second steering rod 344 may be connected to second link 342 and to second wheel interface 130. Second steering rod 344 may rotate with respect to second link 342 about an axis 342c that is parallel to axis 342c. Second link 342 may be a crank, a bellcrank, an oval crank, a circular crank, an "L" shaped crank, or polygonal crank. Second steering rod 344 may rotate with respect to second wheel interface 130 about an axis 344a that is parallel (or substantially parallel) to, for example, second steering axis 304. Second steering actuator rod 322 may be connected to second steering rod 344 via second link (e.g. crank) 342.

In some embodiments, second steering rod 344 is transverse to second steering actuator rod 332. In some embodiments, second steering rod 344 is perpendicular (or substantially perpendicular) to second steering actuator rod 332. In some embodiments, second steering rod 344 is at an acute angle with respect to an axis that is parallel to second steering actuator rod 332 (e.g., angle 332b schematically shown in FIG. 3). In some embodiments, second steering rod 344 is at an obtuse angle with respect to an axis that is parallel to second steering actuator rod 332. In some embodiments, second steering rod 344 is parallel (or substantially parallel) third first spinning axis 132.

Angles between (i) second steering actuator rod 332 and the axis that is parallel to second spinning axis 132 (e.g., an angle 332a schematically shown in FIG. 3), and (ii), second steering rod 344 and the axis that is parallel to second steering actuator rod 332 (e.g., angle 332b schematically shown in FIG. 3) may vary during steering of second wheel interface 130 in a first steering direction and in a second steering direction. For example, during steering of second wheel interface 130, an obtuse angle may become acute and an acute angle may become obtuse.

In some embodiments, vehicle corner system 300 includes a controller 350. Controller 350 may control operation of at least one of first steering actuator 310 and second steering actuator 330. In some embodiments, controller 350 synchronizes operation of first steering actuator 310 and second steering actuator 330.

Figure 4A:
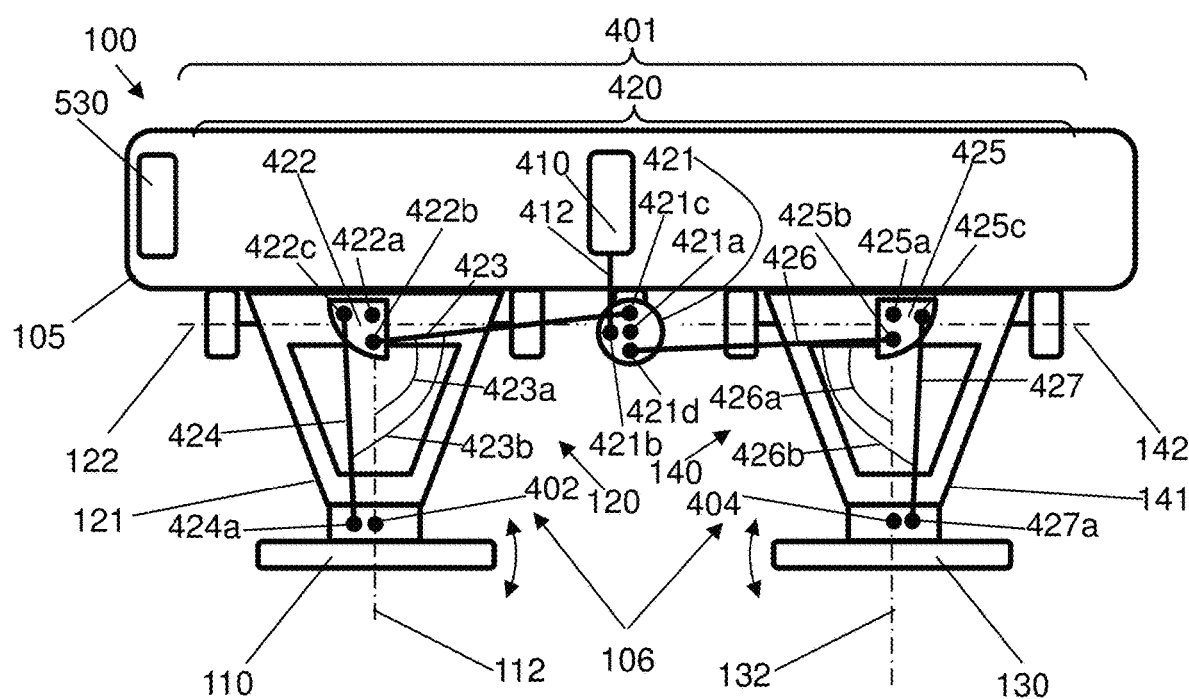
FIG. 4A is a schematic illustration of a vehicle corner system for a dual-axle wheels assembly including the suspension unit and a steering unit including a steering actuator and a steering linkage, according to some embodiments of the invention.

Reference is now made to FIG. 4A, which is a schematic illustration of a vehicle corner system 400 for a dual-axle wheels assembly including a suspension unit 106 and a steering unit 401 including a steering actuator and a steering linkage, according to some embodiments of the invention. FIG. 4A shows a schematic top view of vehicle corner system 400.

Steering unit 401 may rotate first wheel interface 110 and/or second wheel interface 130 about a first steering axis 402 and a second steering axis 404, respectively.

Steering unit 401 may include a steering actuator 410 having a steering actuator rod 412. Steering actuator 410 may be connected to sub-frame 105. In some embodiments, steering actuator rod 412 is parallel (or substantially parallel) to first spinning axis 112 and to second spinning axis 132.

Steering unit 401 may include a steering linkage 420 to connect steering actuator rod 412 to first wheel interface 110 and/or second wheel interface 130.

Steering linkage 420 may include a first link 421, a second link 422, a first steering rod 423 and a second steering rod 424. First link 421 may be connected to sub-frame 105. First link 421 may rotate with respect to sub-frame 105 about an axis 421a that may be parallel (or substantially parallel) to, for example, first steering axis 402 and second steering axis 404. Steering actuator rod 412 may be connected to first link 421. Steering actuator rod 412 may rotate with respect to first link 421 about an axis 421b that may be parallel to axis 421a.

Second link 422 may be connected to, for example, first arm 121 and may rotate with respect to first arm 121 about an axis 422a that may be parallel (or substantially parallel) to first steering axis 402. In some embodiments, second link 422 is not connected to first arm 121. In some embodiments, second link 422 is connected (e.g. directly or indirectly) to sub-frame 105.

First steering rod 423 may be connected to first link 421 and to second link 422. First steering rod 423 may rotate with respect to first link 421 about an axis 421c that may be parallel to axis 421*a*. First steering rod 423 may rotate with respect to second link 422 about an axis 422*b* that may be parallel to axis 422*a*.

In some embodiments, first steering rod 423 is transverse to first spinning axis 112. In some embodiments, first steering rod is transverse to first steering axis 401. In some embodiments, first steering rod 423 is perpendicular (or substantially perpendicular) to first spinning axis 112. In some embodiments, first steering rod 423 is at acute angle with respect to an axis that is parallel to first spinning axis 112. In some embodiments, first steering rod 423 is at obtuse angle with respect to an axis that is parallel to first spinning axis 112 (e.g., an angle 423*a* schematically shown in FIG. 5A). In some embodiments, first steering rod 423 is parallel (or substantially parallel) to first axis 122.

In some embodiments, first link 421 is a crank, a bellcrank, an oval crank, a circular crank, an "L" shaped crank, or polygonal crank.

Second steering rod 424 may be connected to second link 422 and to first wheel interface 110. Second steering rod 424 may rotate with respect to second link 422 about an axis 422*c* that may be parallel to axis 422*a*. Second steering rod 424 may rotate with respect to first wheel interface 110 about an axis 424*a* that may be parallel to first steering axis 402.

In some embodiments, second steering rod 424 is transverse to first steering rod 423. In some embodiments, second steering rod 424 is perpendicular (or substantially perpendicular) to first steering rod 424. In some embodiments, second steering rod 424 is at an acute angle with respect to an axis that is parallel to first steering rod 423. In some embodiments, second steering rod 424 is at an obtuse angle with respect to an axis that is parallel to first steering rod 423 (e.g., an angle 423*b* schematically shown in FIG. 4A). In some embodiments, second steering rod 424 is parallel (or substantially parallel) to first spinning axis 112.

Angles between (i) first steering rod 423 and the axis that is parallel to first spinning axis 112 (e.g., an angle 423*a* schematically shown in FIGS. 5A) and (ii) second steering rod 424 and the axis that is parallel to first steering rod 423 (e.g., an angle 423*b* schematically shown in FIG. 4A) may vary during steering of first wheel interface 110 in a first steering direction and in a second steering direction. For example, during steering of first wheel interface 110, an obtuse angle may become acute.

In some embodiments, second link 422 is a crank, a bellcrank, an oval crank, a circular crank, an "L" shaped crank, or polygonal crank.

In some embodiments, steering linkage 420 includes a third link 425, a third steering rod 426 and a fourth steering rod 427.

Third link 425 may be connected to, for example, second arm 141 and may rotate with respect to second arm 141 about an axis 425*a* that may be parallel (or substantially parallel) to second steering axis 404. In some embodiments, third link 425 is not connected to second arm 141. In some embodiments, third link is connected (e.g. directly or indirectly) to sub-frame 105 (not shown).

Third steering rod 426 may be connected to first link 421 and to third link 425. Third steering rod 426 may rotate with respect to first link 421 about an axis 421*d* that may be parallel to axis 421*a*. Third steering rod 426 may rotate with respect to third link 425 about an axis 425*b* that may be parallel to axis 425*a*.

In some embodiments, third steering rod 426 is transverse to second spinning axis 132. In some embodiments, third steering rod 426 is transverse to second steering axis 404. In some embodiments, third steering rod 426 is perpendicular (or substantially perpendicular) to second spinning axis 132. In some embodiments, third steering rod 426 is at an acute angle with respect to an axis that is parallel to second spinning axis 132 (e.g., an angle 426*a* schematically shown in FIG. 4A). In some embodiments, third steering rod 426 is at an obtuse angle with respect to an axis that is parallel to second spinning axis 132. In some embodiments, third steering rod 426 is parallel (or substantially parallel) to second axis 142.

In some embodiments, axes 421*c* and 421*d* are opposite to each other with respect to axis 421*a*. In some embodiments, axes 421*c* and 421*d* are aligned along an axis that is parallel (or substantially parallel) to first spinning axis 112 and second spinning axis 132. In some embodiments, axes 421*b* and 421*a* are aligned along an axis that is perpendicular (or substantially perpendicular) to first spinning axis 112 and second spinning axis 132. In some embodiments, first link 421 includes a crank, e.g. a bellcrank (e.g., 90° bellcrank). Additional examples of first link 421 may include a circular crank, an oval crank, an "L" shaped crank, or a polygonal crank. Steering actuator rod 412 may be connected to first steering rod 423 via first link (e.g. crank) 421. Steering actuator rod 412 may be connected to third steering rod 426 via first link (e.g. crank) 421. Second steering rod 424 maybe connected to first steering rod 423 via second link (e.g. crank) 422. Fourth steering rod 427 may be connected to third steering rod 426 via third link (e.g. crank 425).

Fourth steering rod 427 may be connected to third link 425 and to second wheel interface 130. Fourth steering rod 427 may rotate with respect to third link 425 about an axis 425*c* that may be parallel to axis 425*a*. Fourth steering rod 427 may rotate with respect to second wheel interface 130 about an axis 427*a* that may be parallel to second steering axis 404.

In some embodiments, fourth steering rod 427 is transverse to third steering rod 426. In some embodiments, fourth steering rod 427 is perpendicular (or substantially perpendicular) to third steering rod 426. In some embodiments, fourth steering rod 427 is at an acute angle with respect to an axis that is parallel to third steering rod 426 (e.g., an angle 426*b* schematically shown in FIG. 4A). In some embodiments, fourth steering rod 427 is at an obtuse angle with respect to an axis that is parallel to third steering rod 426. In some embodiments, fourth steering rod 427 is parallel (or substantially parallel) to second spinning axis 132.

Angles between (i) third steering rod 426 and the axis that is parallel to second spinning axis 132 (e.g., an angle 426*a* schematically shown in FIG. 4A) and (ii) fourth steering rod 427 and the axis that is parallel to third steering rod 426 (e.g., an angle 426*b* schematically shown in FIG. 4A) may vary during steering of second wheel interface 130 in a first steering direction and in a second steering direction. For example, during steering of second wheel interface 130, an acute angle may become obtuse.

In some embodiments, the angle between first steering rod 423 and the axis that is parallel to first spinning axis 112 is obtuse (e.g., an angle 423*a* schematically shown in FIGS. 5A) and the angle between third steering rod 426 and the axis that is parallel to second spinning axis 132 is acute (e.g., an angle 426*a* schematically shown in FIG. 4A). In some embodiments, the angle between second steering rod 424 and the axis that is parallel to first steering rod 423 is obtuse (e.g., an angle 423*b* schematically shown in FIG. 4A) and the angle between fourth steering rod 427 and the axis that is parallel to third steering rod 426 is acute (e.g., an angle 426*b* schematically shown in FIG. 4A).

In some embodiments, when the angle between first steering rod 423 and the axis that is parallel to first spinning axis 112 is obtuse (e.g., an angle 423a schematically shown in FIGS. 5A), the angle between third steering rod 426 and the axis that is parallel to second spinning axis 132 is acute (e.g., an angle 426a schematically shown in FIG. 4A). In some embodiments, when the angle between second steering rod 424 and the axis that is parallel to first steering rod 423 is obtuse (e.g., an angle 423b schematically shown in FIG. 4A), the angle between fourth steering rod 427 and the axis that is parallel to third steering rod 426 is acute (e.g., an angle 426b schematically shown in FIG. 4A).

In some embodiments, third link 425 is a crank. For example, third link 425 may be a bellcrank (e.g., 90° bellcrank). Additional examples of third link 425 may include a circular crank, an oval crank, an "L" shaped crank, or a polygonal crank.

In some embodiments, first steering rod 423 and second steering rod 424 are parallel (or substantially parallel) with respect to each other.

In some embodiments, suspension linkage 420 includes an Ackermann compensation mechanism to provide different first steering angle and second steering angle for first wheel interface 110 and second wheel interface 130, respectively.

In some embodiments, suspension linkage 420 provides different steering characteristics for each of first wheel interface 110 and second wheel interface 130 (e.g., different steering angles, different steering rates and/or different steering directions).

In some embodiments, vehicle corner system 400 includes a controller 530. Controller 530 may control operation of steering actuator 410.

Figure 4B:
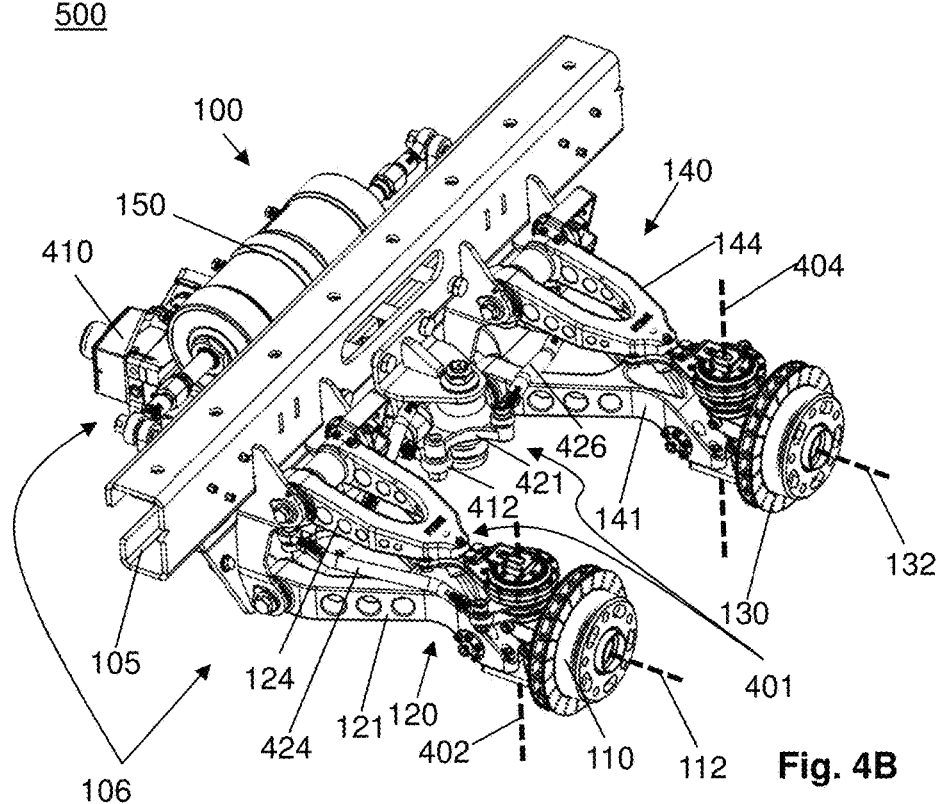
FIGS. 4B and 4C are 3D diagrams of an example of the example of the vehicle corner system schematically shown in FIG. 4A, according to some embodiments of the invention.
Figure 4C:
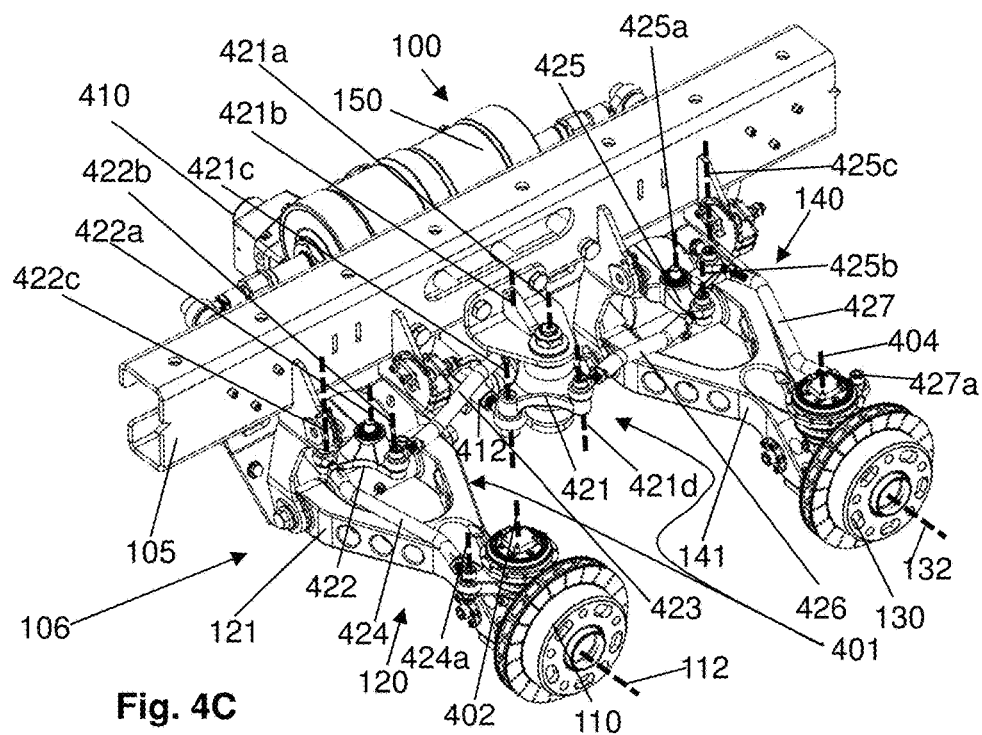
Figure 4D:
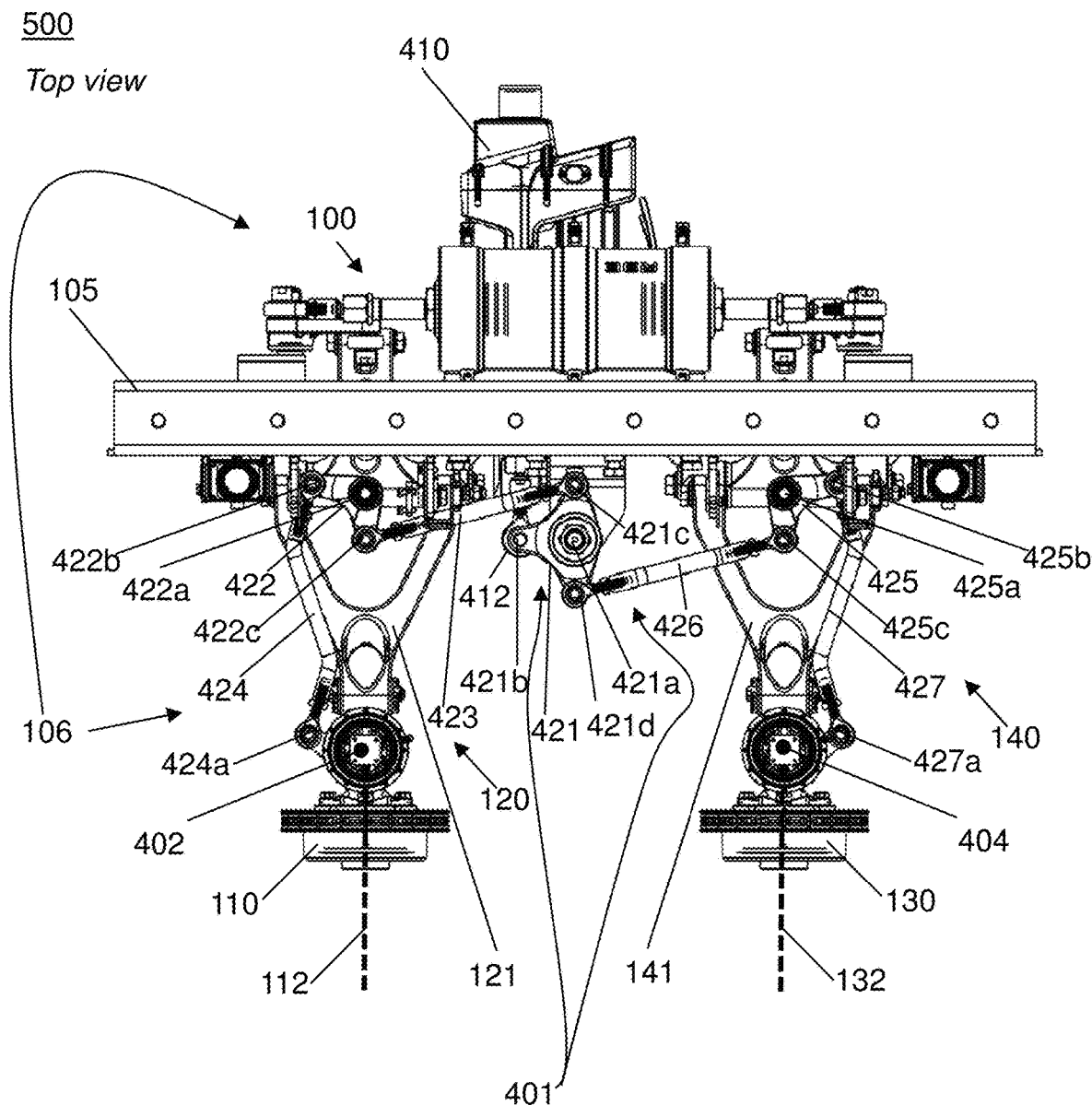
FIG. 4D is a schematic top view of the example of the vehicle corner system of FIGS. 4B-4C, according to some embodiments of the invention.

Reference is now made to FIGS. 4B and 4C, which are 3D diagrams of an example of vehicle corner system 400 schematically shown in FIG. 4A, according to some embodiments of the invention. FIGS. 4B and 4C show perspective views of vehicle corner system 400. FIG. 4D shows a top view of vehicle corner system 400.

Reference is also made to FIG. 4D, which is a schematic top view of the example of vehicle corner system 400 of FIGS. 4B-4C, according to some embodiments of the invention.

In some embodiments, first steering rod 423 and second steering rod 424 are at least partly extend through a volume between first arm 121 and third arm 124 (e.g., as shown in FIG. 4B). In some embodiments, third steering rod 426 and fourth steering rod 427 are at least partly extend through a volume between second arm 141 and fourth arm 144 (e.g., as shown in FIG. 4B).

In various embodiments, at least one of first steering rod 423, second steering rod 424, third steering rod 426 and fourth steering rod 427 is curved along its respective longitudinal direction (e.g., as shown in FIGS. 4B, 4C and 4D).

Figure 5:
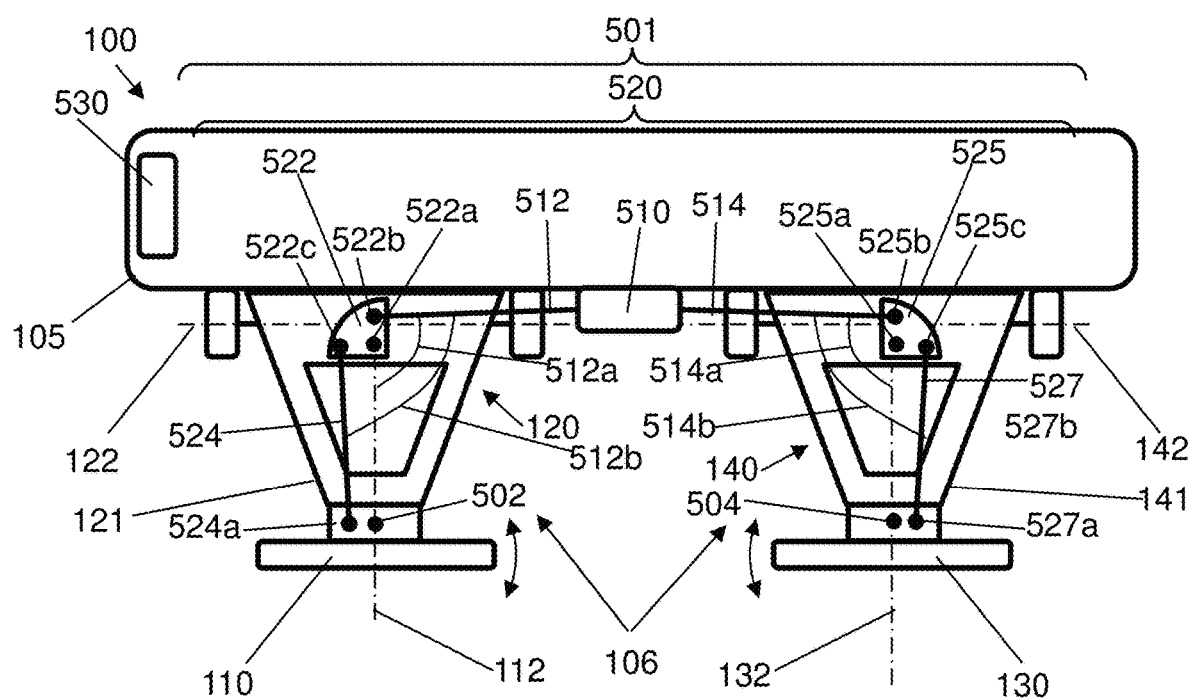
FIG. 5 is a schematic illustration of a vehicle corner system for a dual-axle wheels assembly including the suspension unit and a steering unit including a steering actuator having two steering actuator rods and a steering linkage, according to some embodiments of the invention.

Reference is now made to FIG. 5, which is a schematic illustration of a vehicle corner system 500 for a dual-axle wheels assembly including suspension unit 106 and a steering unit 501 including a steering actuator having two steering actuator rods and a steering linkage, according to some embodiments of the invention. FIG. 5 shows a schematic top view of vehicle corner system 500.

Steering unit 501 may rotate first wheel interface 110 and/or second wheel interface 130 about a first steering axis 502 and a second steering axis 504, respectively.

Steering unit 501 may include a steering actuator 510 having a first steering actuator rod 512. Steering actuator 510 may be connected to sub-frame 105.

In some embodiments, first steering actuator rod 512 is transverse to first spinning axis 112. In some embodiments, first steering actuator rod 512 is transverse to first steering axis 502. In some embodiments, first steering actuator rod 512 is perpendicular (or substantially perpendicular) to first spinning axis 112. In some embodiments, first steering actuator rod 512 is at an acute angle with respect to an axis that is parallel to first spinning axis 112. In some embodiments, first steering actuator rod 512 is at an obtuse angle with respect to an axis that is parallel to first spinning axis 112 (e.g., an angle 512a schematically shown in FIG. 5). In some embodiments, first steering actuator rod 512 is parallel (or substantially parallel) to first axis 122.

Steering unit 501 may include a steering linkage 520 to connect first steering actuator rod 512 to first wheel interface 110.

Steering linkage 520 may include a first link 522 and a first steering rod 524. First link 522 may be connected to, for example, first arm 121 and may rotate with respect to first arm 121 about an axis 522a that may be parallel (or substantially parallel) to first steering axis 502. In some embodiments, first link 522 is not connected to first arm 121. In some embodiments, first link 522 is connected to sub-frame 105. First link 522 may rotate with respect to sub-frame 105 about an axis 522a that may be parallel (or substantially parallel) to, for example, first steering axis 502. First steering actuator rod 512 may be connected to first link 522. First steering actuator rod 512 may rotate with respect to first link 522 about an axis 522b that may be parallel to axis 522a.

First steering rod 524 may be connected to first link 512 and to first wheel interface 110. First steering rod 524 may rotate with respect to first link 512 about an axis 522c that may be parallel to axis 522a. First steering rod 524 may rotate with respect to first wheel interface 110 about an axis 524a that may be parallel to first steering axis 502.

In some embodiments, first steering rod 524 is transverse to first steering actuator rod 512. In some embodiments, first steering rod 524 is perpendicular (or substantially perpendicular) to first steering actuator rod 512. In some embodiments, first steering rod 524 is at an acute angle with respect to an axis that is parallel to first steering actuator rod 512 (e.g., an angle 512b schematically shown in FIG. 5). In some embodiments, first steering rod 524 is at an obtuse angle with respect to an axis that is parallel to first steering actuator rod 512. In some embodiments, first steering rod 524 is parallel (or substantially parallel) to first spinning axis 112.

Angles between (i) first steering actuator rod 512 and the axis that is parallel to first spinning axis 112 (e.g., an angle 512a schematically shown in FIG. 5) and (ii) first steering rod 524 and the axis that is parallel to first steering actuator rod 512 (e.g., an angle 512b schematically shown in FIG. 5) may vary during steering of first wheel interface 110. For example, during steering of first wheel interface 110, an obtuse angle may become acute and an acute angle may become obtuse.

In some embodiments, first link 522 is a crank. For example, first link 522 may be a bellcrank (e.g., 90° bellcrank). Additional examples of first link 522 may include a circular crank, an oval crank, an "L" shaped crank, or a polygonal crank. First steering actuator rod 512 may be connected to first steering rod 524 via first link (e.g. crank) 522.

In some embodiments, steering actuator 510 having a second steering actuator rod 514. In some embodiments, second steering actuator rod 514 is transverse to second spinning axis 132. In some embodiments, second steering actuator rod 514 is transverse to second steering axis 504. In some embodiments, second steering actuator rod 514 is perpendicular (or substantially perpendicular) to second spinning axis 132. In some embodiments, second steering actuator rod 514 is at an acute angle with respect to an axis that is parallel to second spinning axis 132. In some embodiments, second steering actuator rod 514 is at an obtuse angle with respect to an axis that is parallel to second spinning axis 132 (e.g., an angle 514a schematically shown in FIG. 5). In some embodiments, second steering actuator rod 514 is parallel (or substantially parallel) to second axis 142.

In some embodiments, steering linkage 520 includes a second link 525 and a second steering rod 527. Second link 525 may be connected to, for example, second arm 141 and may rotate with respect to second arm 141 about an axis 525a that may be parallel (or substantially parallel) to second steering axis 504. In some embodiments, second link 525 is not connected to second arm 141. In some embodiments, second link 525 is connected to sub-frame 105. Second steering actuator rod 514 may be connected to second link 525. Second steering actuator rod 514 may rotate with respect to second link 525 about an axis 525b that may be parallel to axis 522a.

Second steering rod 527 may be connected to second link 525 and to second wheel interface 130. Second steering rod 527 may rotate with respect to second link 525 about an axis 525c that may be parallel to axis 525a. Second steering rod 527 may rotate with respect to second wheel interface 130 about an axis 527a that may be parallel to second steering axis 504. In some embodiments, second steering rod 527 is parallel to second spinning axis 132.

In some embodiments, second steering rod 527 is transverse to second steering actuator rod 514. In some embodiments, second steering rod 527 is perpendicular (or substantially perpendicular) to second steering actuator rod 514. In some embodiments, second steering rod 527 is at an acute angle with respect to an axis that is parallel to second steering actuator rod 514 (e.g., an angle 514b schematically shown in FIG. 5). In some embodiments, second steering rod 527 is at an obtuse angle with respect to an axis that is parallel to second steering actuator rod 514. In some embodiments, second steering rod 527 parallel (or substantially parallel) to second spinning axis 132.

Angles between (i) second steering actuator rod 514 and the axis that is parallel to second spinning axis 132 (e.g., an angle 514a schematically shown in FIG. 5) and (ii) second steering rod 527 and the axis that is parallel to second steering actuator rod 514 (e.g., an angle 514b schematically shown in FIG. 5) may vary during steering of second wheel interface 130. For example, during steering of second wheel interface 130, an obtuse angle may become acute and an acute angle may become obtuse.

In some embodiments, second link 525 is a crank. For example, second link 525 may be a bellcrank (e.g., 90° bellcrank). Additional examples of second link 525 may include a circular crank, an oval crank, an "L" shaped crank, or a polygonal crank. Second steering actuator rod 514 may be connected to second steering rod 527 via second link (e.g. crank) 525.

In some embodiments, suspension linkage 520 includes an Ackermann compensation mechanism to provide different first steering angle and second steering angle for first wheel interface 110 and second wheel interface 130, respectively.

In some embodiments, suspension linkage 520 provides different steering characteristics for each of first wheel interface 110 and second wheel interface 130 (e.g., different steering angles, different steering rates and/or different steering directions).

In some embodiments, vehicle corner system 500 includes a controller 530 to control operation of steering actuator 510.

Figure 6A:
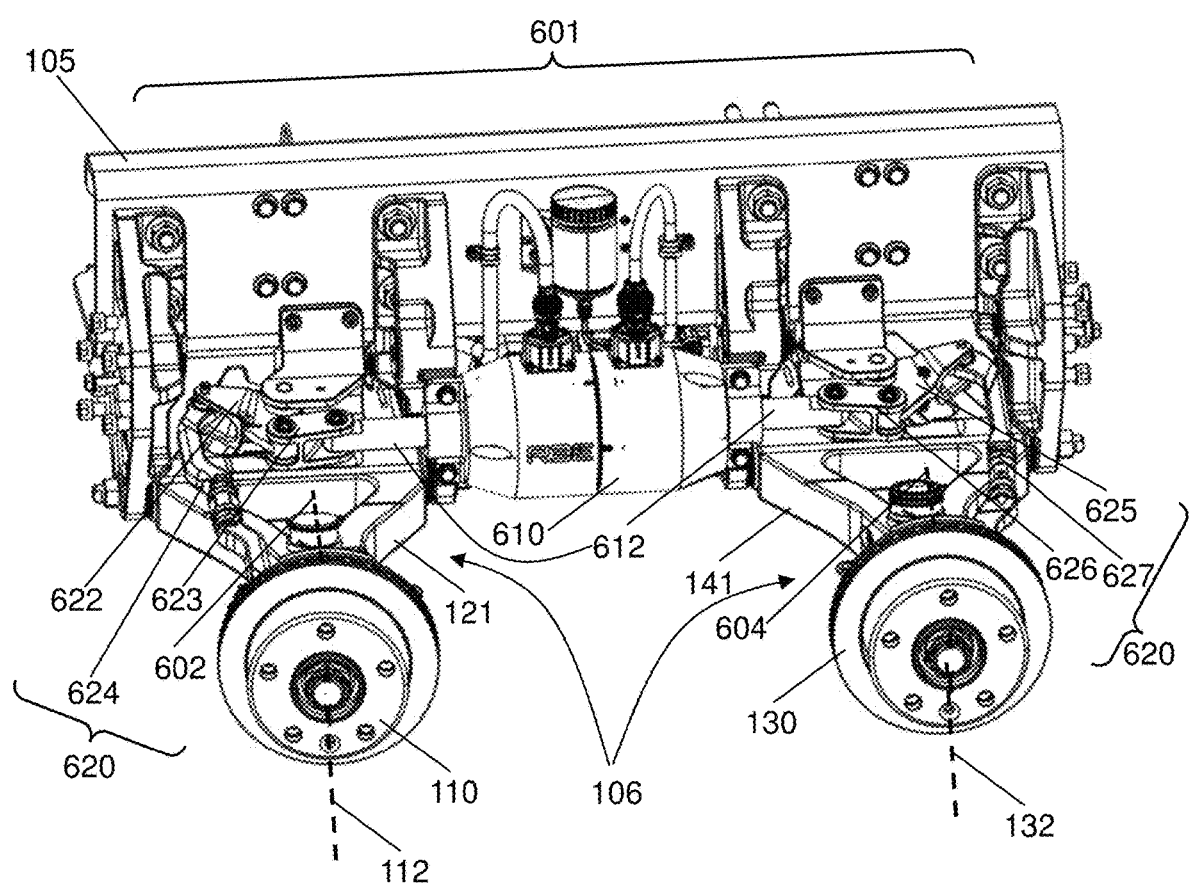
FIG. 6A is a 3D diagram of a vehicle corner system for a dual-axle wheels assembly including the suspension unit and a steering unit including a steering actuator with a single steering actuator rod and a steering linkage, according to some embodiments of the invention.

Reference is now made to FIG. 6A, which is a 3D diagram of a vehicle corner system 600 for a dual-axle wheels assembly including suspension unit 106 and a steering unit 601 including a steering actuator 610 with a single steering actuator rod 612 and a steering linkage 620, according to some embodiments of the invention. FIG. 6A shows a perspective view of vehicle corner system 600.

Figure 6B:
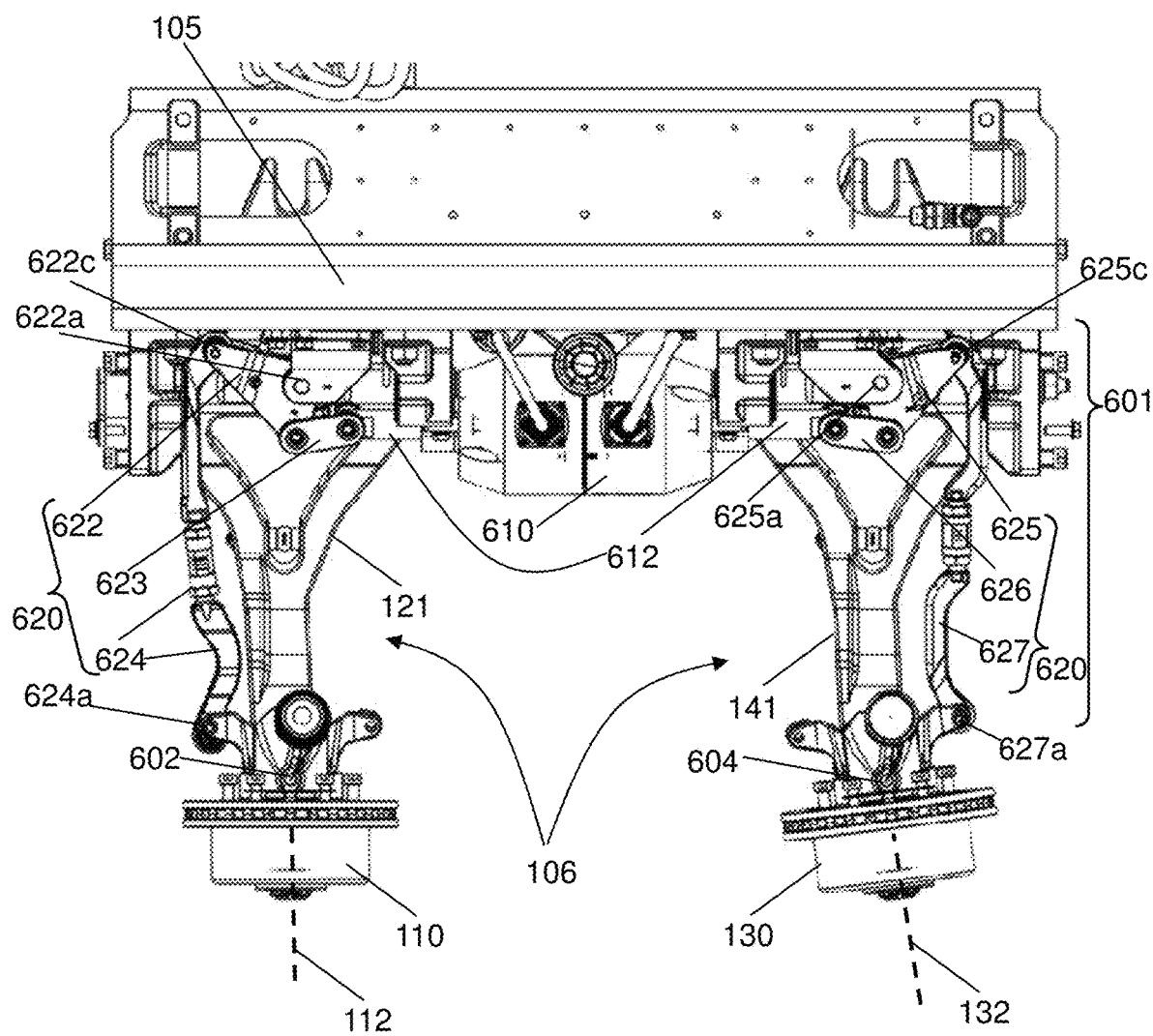
FIG. 6B is a schematic top view of the vehicle corner system of FIG. 6A, according to some embodiments of the invention.

Reference is also made to FIG. 6B, which is a schematic top view of vehicle corner system 600 of FIG. 6A, according to some embodiments of the invention.

Steering unit 601 may rotate first wheel interface 110 and/or second wheel interface 130 about a first steering axis 602 and a second steering axis 604, respectively.

Steering unit 601 may include a steering actuator 610 having a single steering actuator rod 612. Steering actuator 610 may be connected to sub-frame 105. In some embodiments, (i) steering actuator 610 and (ii) first and second wheel interfaces 110, 130 are disposed at the same side of sub-frame 105 (e.g. as shown in FIGS. 6A and 6B). In some embodiments, steering actuator 610 is disposed between first spinning axis 112 and second spinning axis 132.

Steering actuator rod 612 may extend through an interior of steering actuator 610. Steering actuator rod 612 may exit externally of the interior of steering actuator 610 through opposing ends of steering actuator 610. In some embodiments, steering actuator rod 612 is transverse to first spinning axis 112. In some embodiments, steering actuator rod 612 is transverse to second spinning axis 132. In some embodiments, steering actuator rod 612 is transverse to first steering axis 602. In some embodiments, steering actuator rod 612 is transverse to second steering axis 604. In some embodiments, steering actuator rod 612 is perpendicular (or substantially perpendicular) to first spinning axis 112. In some embodiments, steering actuator rod 612 is perpendicular (or substantially perpendicular) to second spinning axis 114. In some embodiments, steering actuator rod 612 is parallel (or substantially parallel) to first axis 122. In some embodiments, steering actuator rod 612 is parallel (or substantially parallel) to second axis 142.

Steering unit 601 may include a steering linkage 620 to connect steering actuator rod 612 to first wheel interface 110 and to second wheel interface 130.

Steering linkage 620 may include a first link 622, a first coupler 623 and a first steering rod 624. First link 622 may be connected to sub-frame 105. First link 622 may rotate with respect to sub-frame 105 about an axis 622a that may be parallel (or substantially parallel) to, for example, first steering axis 602. Steering actuator rod 612 may be connected to first link 622, for example via first coupler 623.

First steering rod 624 may be connected to first link 612 and to first wheel interface 110. First steering rod 624 may rotate with respect to first link 612 about an axis 622c that may be parallel (or substantially parallel) to axis 622a. First steering rod 624 may rotate with respect to first wheel interface 110 about an axis 624a that may be parallel (or substantially parallel) to first steering axis 602.

In some embodiments, first steering rod 624 is transverse to steering actuator rod 612. In some embodiments, first steering rod 624 is perpendicular (or substantially perpendicular) to steering actuator rod 612. In some embodiments, first steering rod 624 is parallel (or substantially parallel) to first spinning axis 112.

In some embodiments, first link 622 is a crank. For example, first link 622 may be a bellcrank (e.g., 90° bellcrank). Additional examples of first link 622 may include a circular crank, an oval crank, an "L" shaped crank, or a polygonal crank.

Steering linkage 620 may include a second link 625, a second coupler 626 and a second steering rod 627. Second link 625 may be connected to, for example, sub-frame 105 and may rotate with respect to sub-frame 105 about an axis 625a that may be parallel (or substantially parallel) to second steering axis 604. Steering actuator rod 612 may be connected to second link 625, for example via second coupler 627.

Second steering rod 627 may be connected to second link 625 and to second wheel interface 130. Second steering rod 627 may rotate with respect to second link 625 about an axis 625c that may be parallel (or substantially parallel) to axis 625a. Second steering rod 627 may rotate with respect to second wheel interface 130 about an axis 627a that may be parallel (or substantially parallel) to second steering axis 604. In some embodiments, second steering rod 627 is parallel to second spinning axis 132.

In some embodiments, second steering rod 627 is transverse to steering actuator rod 612. In some embodiments, second steering rod 627 is perpendicular (or substantially perpendicular) to steering actuator rod 612.

In some embodiments, second link 625 is a crank. For example, second link 625 may be a bellcrank (e.g., 90° bellcrank). Additional examples of second link 625 may include a circular crank, an oval crank, an "L" shaped crank, or a polygonal crank.

In some embodiments, suspension linkage 620 includes an Ackermann compensation mechanism to provide different first steering angle and second steering angle for first wheel interface 110 and second wheel interface 130, respectively.

In some embodiments, suspension linkage 620 provides different steering characteristics for each of first wheel interface 110 and second wheel interface 130 (e.g., different steering angles, different steering rates and/or different steering directions).

In some embodiments, vehicle corner system 600 includes a controller (e.g. such as controller 530 described above with respect to FIG. 5) to control operation of steering actuator 610.

Figure 6C:
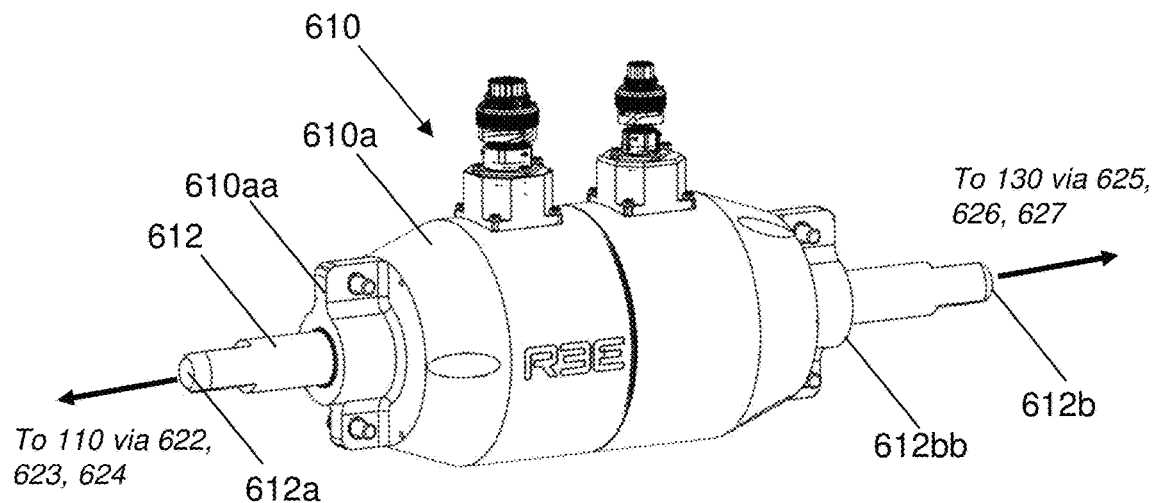
FIGS. 6C and 6D are 3D diagrams of a steering actuator and a steering actuator rod shown in FIGS. 6A-6B, according to some embodiments of the invention.
Figure 6D:
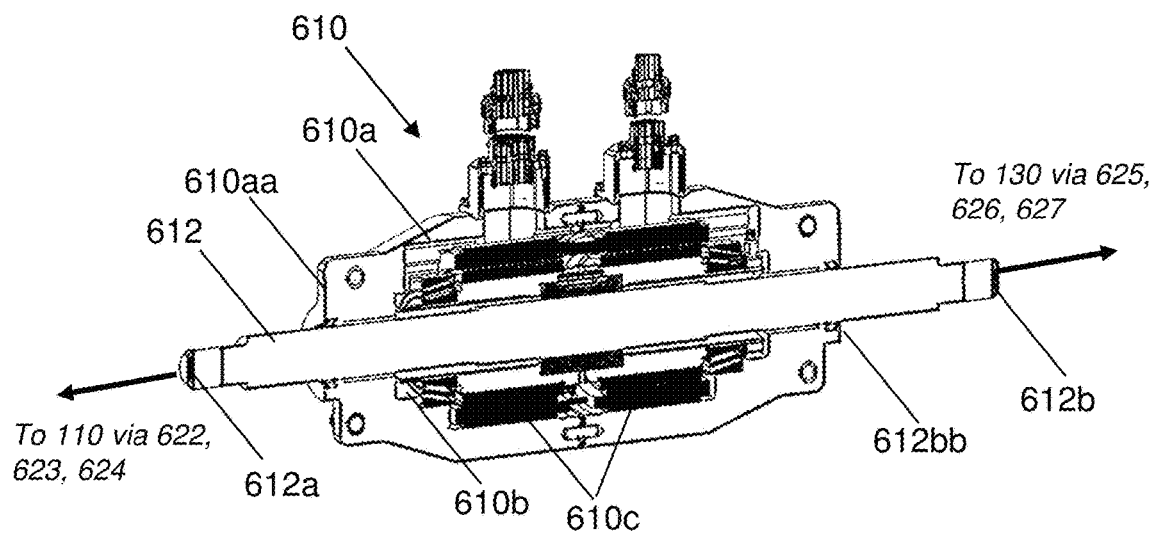

Reference is now made to FIGS. 6C and 6D, which are 3D diagrams of steering actuator 610 and steering actuator rod 612 shown in FIGS. 6A-6B, according to some embodiments of the invention. FIG. 6C shows a perspective view of steering actuator 610 and steering actuator rod 612. FIG. 6D shows a partial sectional view of steering actuator 610 and steering actuator rod 612.

Steering actuator 610 may include a housing 610a having an interior 610b. Steering actuator rod 612 may extend through interior 610b of housing 610a and may exit externally of interior 610b through opposing ends 610aa, 610ab of housing 610a. Steering actuator rod 612 may be connected at its first end 612a to first wheel interface 610 via first link 622, first coupler 623 and first steering rod 624. Steering actuator rod 612 may be connected at its second end 612b to second wheel interface 630 via second link 625, second coupler 626 and second steering rod 627.

Steering actuator 610 may include one or more motors 610c. Motor(s) 610c may be disposed within interior 610a of housing 610b of steering actuator 610. Motor(s) 610c may be disposed between ends 612a, 612b of steering actuator rod 612. For example, steering actuator rod 612 may extend through motor(s) 610c. Motor(s) 610c may control movement of steering actuator rod 612. Motor(s) 610c may move steering actuator rod 612 in opposing directions of housing 610a of steering actuator 610. In operation, when motor(s) 610c move steering actuator rod 612 one end of steering actuator rod 612 extends with respect to one end of housing 610a and the other end of steering actuator rod 612 retracts with respect to the other end of housing 610a of steering actuator 610. Steering actuator 610 may include a screw like mechanism (e.g. disposed between steering actuator rod 612 and motor(s) 610c) to move steering actuator rod 612 with respect to housing 610a of steering actuator 610. Steering actuator 610 may include a magnetic mechanism (e.g. disposed between steering actuator rod 612 and motor(s) 610c) to move steering actuator rod 612 with respect to housing 610a of steering actuator 610.

Having two or more motors 610c may provide steering actuator 610 with a redundancy feature, for example to increase safety and/or to provide steering actuator with additional power (e.g. if required by steering actuator 610).

Steering actuator 610 as shown in FIGS. 6A-6D is an example of a steering actuator having and/or operating a single steering rod. Steering actuators having and/or operating a single steering rod other than steering actuator 610 may be used.

Some embodiments of the present invention may provide a vehicle corner system including suspension unit 106 for a dual-axle wheels assembly and a drivetrain unit to rotate first wheel interface 110 and/or second wheel interface 130 about first spinning axis 112 and second spinning axis 132, respectively. Various embodiments of drivetrain units are described hereinbelow with respect to FIGS. 7, 8 and 9.

Figure 7:
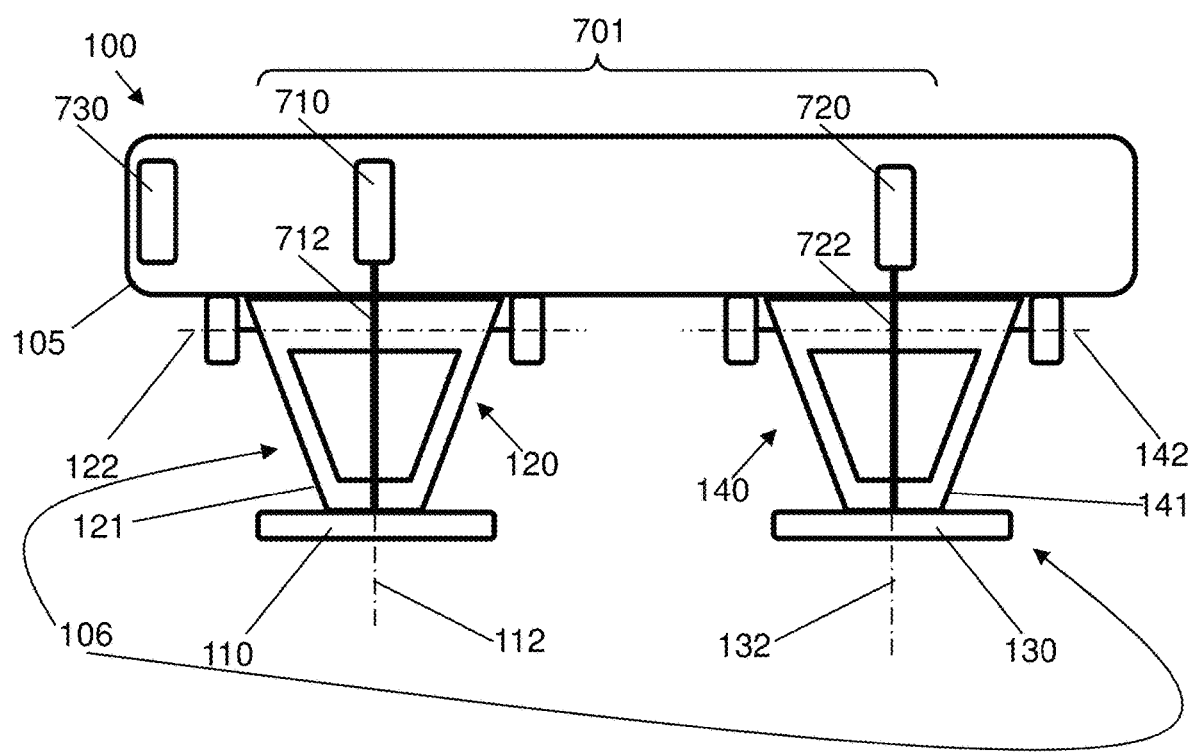
FIG. 7 is a schematic illustration of a vehicle corner system for a dual-axle wheels assembly including the suspension unit and a drivetrain unit including two motors, according to some embodiments of the invention.

Reference is now made to FIG. 7, which is a schematic illustration of a vehicle corner system 700 for a dual-axle wheels assembly including suspension unit 106 and a drivetrain unit 701 including two motors, according to some embodiments of the invention. FIG. 7 shows a schematic top view of vehicle corner system 700.

Drivetrain unit 701 may rotate first wheel interface 110 about first spinning axis 112 and/or rotate second wheel interface 130 about second spinning axis 132.

In some embodiments, drivetrain unit 701 includes a first motor 710 and a first driveshaft 712. First motor 710 may be connected to sub-frame 105. First driveshaft 712 may be connected to first motor 710 and to first wheel interface 110 to rotate first wheel interface 110 about first spinning axis 112. First driveshaft 712 may be parallel (or substantially parallel) to first spinning axis 112.

In some embodiments, drivetrain unit 701 includes a second motor 720 and a second driveshaft 722. Second motor 720 may be connected to sub-frame 105. Second driveshaft 722 may be connected to second motor 720 and to second wheel interface 130 to rotate second wheel interface 130 about second spinning axis 132. Second driveshaft 722 may be parallel (or substantially parallel) to second spinning axis 132.

In some embodiments, vehicle corner system 700 includes a controller 730. Controller 730 may control at least one of first motor 710 and second motor 720. For example, controller 730 may control rotational speed generated by first motor 710 and second motor 720. Motors 710/720 may be a sprung mass if connected to sub-frame 105 which is coupled to the vehicle platform chassis. In various embodiments, motors 710/720 may be suspended if not directly coupled to sub-frame 105.

Figure 8:
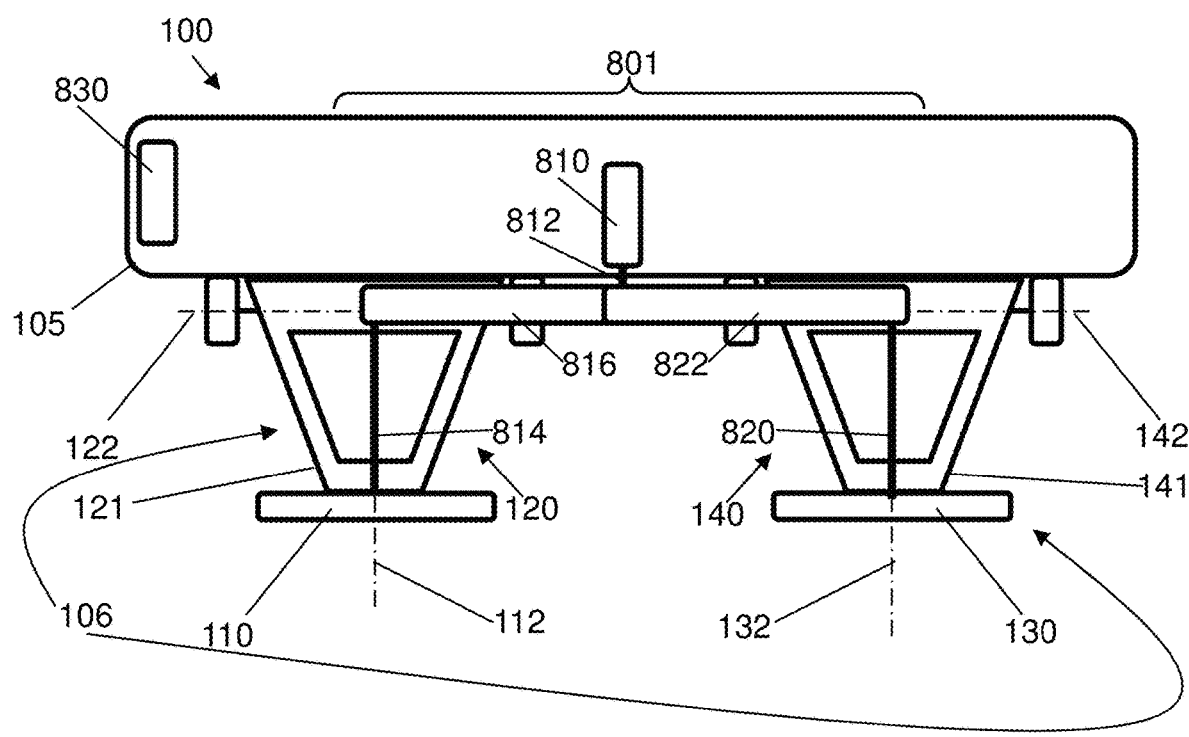
FIG. 8 is the schematic illustration of a vehicle corner system for a dual-axle wheels assembly including the suspension unit and a drivetrain unit including a motor and two transmission subunits, according to some embodiments of the invention.

Reference is now made to FIG. 8, which is a schematic illustration of a vehicle corner system 800 for a dual-axle wheels assembly including a suspension unit 106 and a drivetrain unit 801 including a motor and two transmission subunits, according to some embodiments of the invention. FIG. 8 shows a schematic top view of vehicle corner system 800.

Drivetrain unit 801 may rotate first wheel interface 110 about first spinning axis 112 and/or rotate second wheel interface 130 about second spinning axis 132.

In some embodiments, drivetrain unit 801 includes a motor 810, a first driveshaft 812, a second driveshaft 814 and a first transmission subunit 816. Motor 810 may be connected to sub-frame 105. Motor 810 may be a sprung mass if connected to sub-frame 105. In some alternative embodiments, motor 810 may be suspended if not directly coupled to sub-frame 105. First driveshaft 812 may be connected to motor 810. First driveshaft 812 may be parallel (or substantially parallel) to first spinning axis 112 and/or second spinning axis 132. Second driveshaft 814 may be connected to first wheel interface 110. Second driveshaft 814 may be parallel (or substantially parallel) to first spinning axis 112. First transmission subunit 816 may be connected to first driveshaft 812 and to second driveshaft 814 to transmit rotations of first driveshaft 812 to second driveshaft 814 to rotate first wheel interface 110 about first spinning axis 112.

In some embodiments, drivetrain unit 801 includes a third driveshaft 820 and a second transmission subunit 822. Third driveshaft 820 may be connected to second wheel interface 130. Third driveshaft 820 may be parallel (or substantially parallel) to second spinning axis 132. Second transmission subunit 822 may be connected to first driveshaft 812 and to third driveshaft 820 to transmit rotations of first driveshaft 812 to third driveshaft 820 to rotate second wheel interface 130 about second spinning axis 132.

In some embodiments, vehicle corner system 800 includes a controller 830. Controller 830 may control motor 810. For example, controller 830 may control rotational speed generated by motor 810. In some embodiments, controller 830 alternately couples and decouples first transmission subunit 816 to first driveshaft 812 and second driveshaft 814. In some embodiments, controller 830 alternately couples and decouples second transmission subunit 816 to first driveshaft 812 and third driveshaft 820. In some embodiments, controller 830 alternately activates and deactivates first transmission subunit 816. In some embodiments, controller 830 alternately activates and deactivates second transmission subunit 822.

Figure 9:
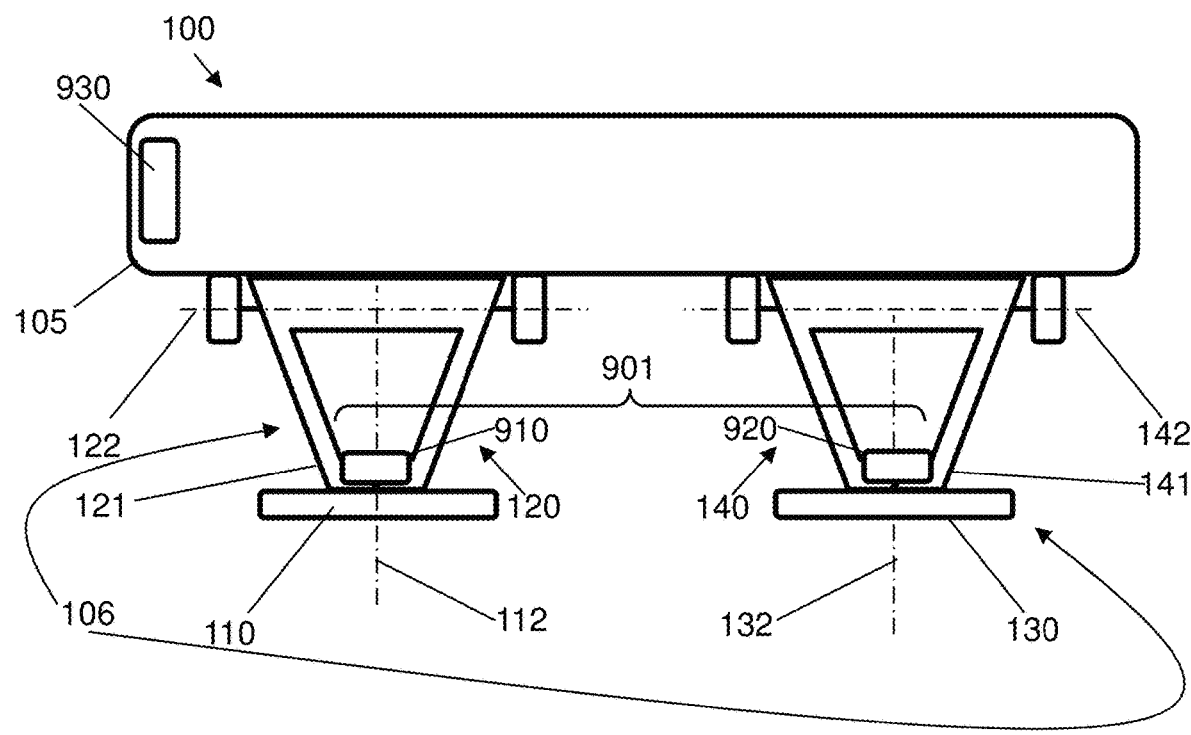
FIG. 9 is a schematic illustration of a vehicle corner system for a dual-axle wheels assembly including the suspension unit and a drivetrain unit including two in-wheel motors, according to some embodiments of the invention.

Reference is now made to FIG. 9, which is a schematic illustration of a vehicle corner system 900 for a dual-axle wheels assembly including suspension unit 106 and a drivetrain unit 901 including two in-wheel motors, according to some embodiments of the invention. FIG. 9 shows a schematic top view of vehicle corner system 900.

Drivetrain unit 901 may rotate first wheel interface 110 about first spinning axis 112 and/or rotate second wheel interface 130 about second spinning axis 132.

In some embodiments, drivetrain unit 901 includes a first in-wheel motor 910 connected first wheel interface 910 to rotate first wheel interface 110 about first spinning axis 112. In some embodiments, drivetrain unit 901 includes a second in-wheel motor 920 connected to second wheel interface 130 to rotate second wheel interface 130 about second spinning axis 132.

In some embodiments, vehicle corner system 900 includes a controller 930 to control operation of at least one of first in-wheel motor 910 and second in-wheel motor 920.

The above illustrations/description depict embodiments of vehicle corner systems for dual-axle wheels assemblies. Each of these embodiments may include features from other embodiments presented, and embodiments not specifically described may include various features described herein. For example, a vehicle corner system may include a suspension unit (e.g., suspension unit 106) and one of steering units (e.g., steering units 201, 301, 401, 501) described hereinabove. In another example, a vehicle corner system may include a suspension unit (e.g., suspension unit 106) and one of drivetrain units (e.g., drivetrain units 701, 801, 901) described hereinabove. In another example, a vehicle corner system may include a suspension unit (e.g., suspension unit 106), one of steering units (e.g., steering units 201, 301, 401, 501), and one of drivetrain units (e.g., drivetrain units 701, 801, 901) described hereinabove.

Figure 10:
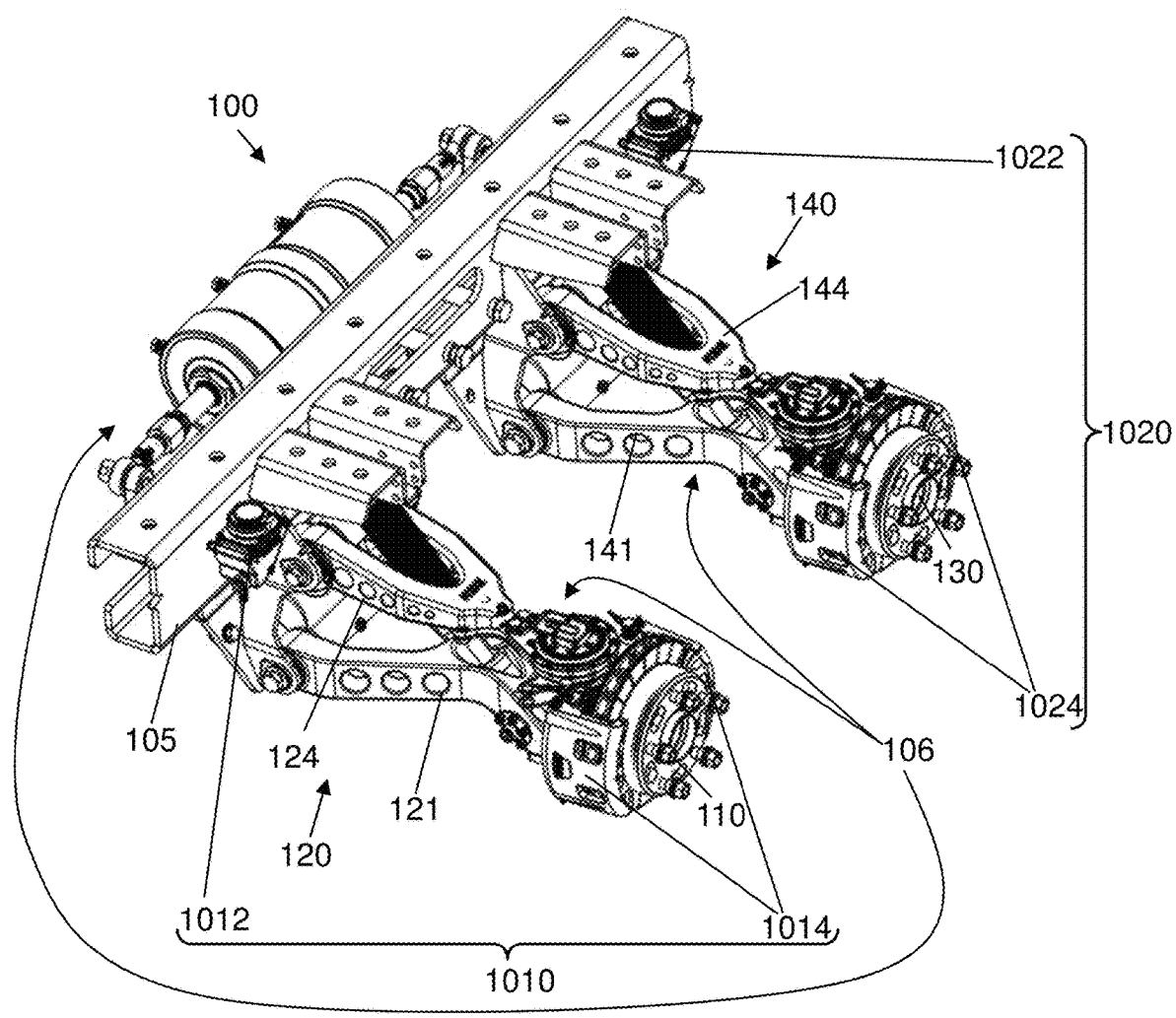
FIG. 10 is a 3D diagram of a vehicle corner system including for a dual-axle wheels assembly the suspension unit and two braking units, according to some embodiments of the invention.

Reference is now made to FIG. 10, which is a 3D diagram of a vehicle corner system 1000 for a dual-axle wheels assembly including suspension unit 106 and two braking units, according to some embodiments of the invention.

According to some embodiments of the invention, vehicle corner module 1000 includes a first braking unit 1010 and a second braking unit 1020.

In some embodiments, first braking unit 1010 includes a first braking actuator 1012 and at least one first braking caliper 1014 coupled to first wheel interface 110. For example, first braking unit 1010 may include two opposing braking calipers 1014 coupled to first wheel interface 110 (e.g., as shown in FIG. 10).

In some embodiments, second braking unit 1020 includes a second braking actuator 1022 and at least one second braking caliper 1024 coupled to second wheel interface 130. For example, second braking unit 1020 may include two opposing braking calipers 1024 coupled to second wheel interface 130 (e.g., as shown in FIG. 10).

In some embodiments, vehicle corner module 1000 includes a controller (not shown). The controller may control first braking actuator 1012 and second braking actuator 1022.

The following illustrations/description depict embodiments of the motion restrainer for suspension unit 106 (e.g. such as motion restrainer 150 described above). Each of embodiments of the motion restrainer may be included in suspension unit 106 in any combination with the steering units (e.g. steering units 201, 301, 401, 501, 601) and drivetrain units (e.g. drivetrain units 701, 801, 901) described above. Each of the embodiments of the motion restrainer may include features from other embodiments of the motion restrainer presented, and embodiments of the motion restrainer not specifically described may include various features described herein.

Figure 11A:
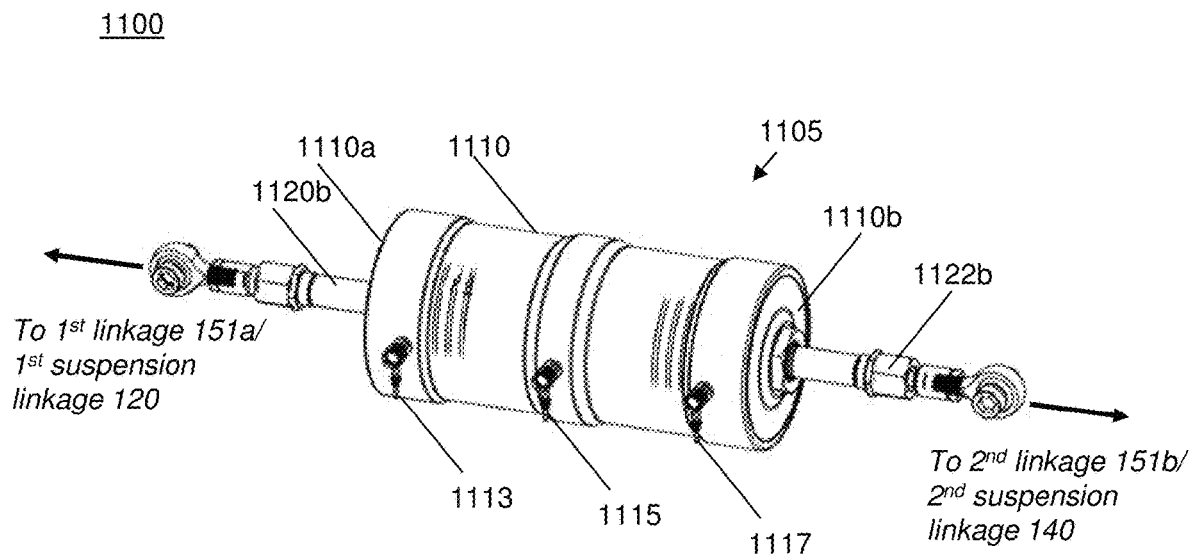
FIGS. 11A and 11B are 3D diagrams of a piston assembly of a motion restrainer motion restrainer for the suspension unit, according to some embodiments of the invention.
Figure 11B:
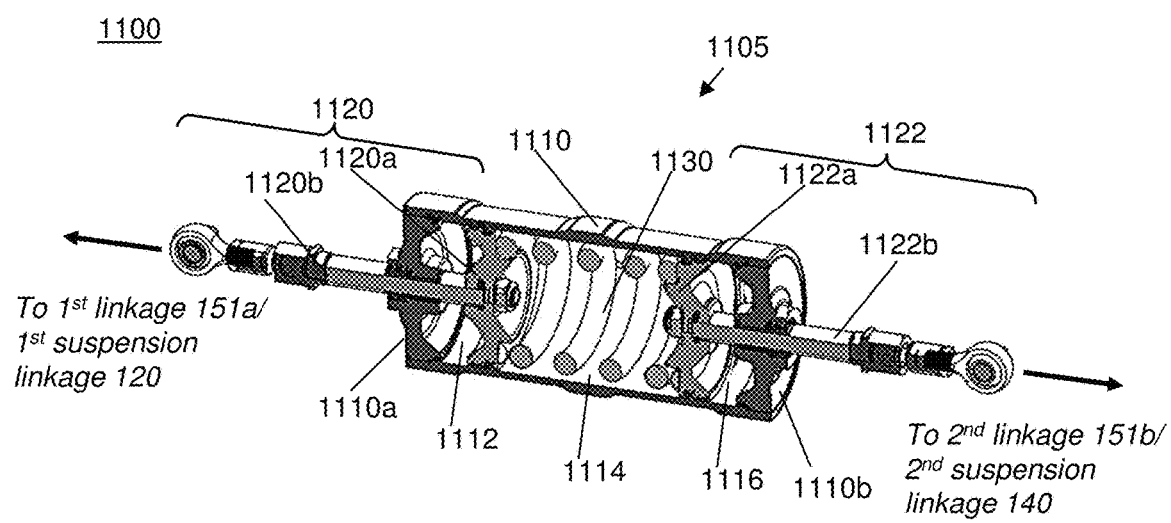

Reference is now made to FIGS. 11A and 11B, which are 3D diagrams of a piston assembly 1105 of a motion restrainer 1100 motion restrainer 1100 for suspension unit 106, according to some embodiments of the invention. FIG. 11A shows a perspective view of piston assembly 1105. FIG. 11B shows a partial section view of piston assembly 1105.

Figure 11C:
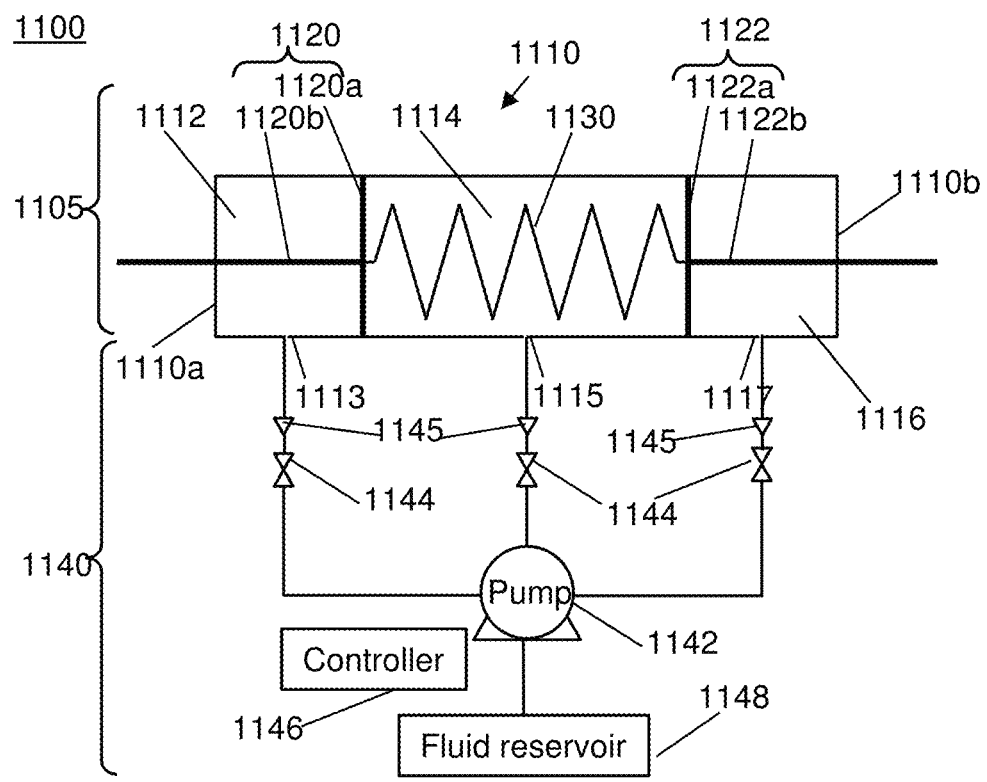
FIG. 11C is a schematic illustration of the piston assembly of FIGS. 11A-11B and a fluid supply subsystem, according to some embodiments of the invention.

Reference is also made to FIG. 11C, which is a schematic illustration of piston assembly 1105 of FIGS. 11A-11B and a fluid supply subsystem 1140, according to some embodiments of the invention.

Motion restrainer 1100 may be used as, for example, motion restrainer 150 in suspension unit 106 (e.g. as described above with respect to FIGS. 1A-1F).

Motion restrainer 1100 may include a piston assembly 1105. Piston assembly 1105 may include a housing 1110, a first piston 1120 positioned within housing 1110 and a second piston 1122 positioned within housing 1110 and forming a first fluid chamber 1112, a second fluid chamber 1114 and a third fluid chamber 1116 in housing 1110. First fluid chamber 1112 may be formed between a head 1120a of first piston 1120 and a first end 1110a of housing 1110, second fluid chamber 1114 may be formed between first piston head 1120a and a head 1122a of second piston 1122, and third fluid chamber 1116 may be formed between second piston head 1122a and a second end 1110b of housing 1110. First and second piston heads 1120a, 1120b may be sealed with respect to internal surface of housing 1110. First piston 1120, e.g. a shaft 1120b of first piston 1120 extending externally from housing 1110, may be connected to first suspension linkage 120, e.g. via first linkage 151a. Second piston 1122, e.g. a shaft 1122b of second piston 1122 extending externally from housing 1110, may be connected to second suspension linkage 140, e.g. via second linkage 151b (e.g. as described above with respect to FIGS. 1A-1F).

Motion restrainer 1100 may include a spring 1130 positioned within second fluid chamber 1114 of housing 1110 between first fluid chamber 1112 and third fluid chamber 1116, e.g. between first piston head 1120a and second piston head 1122a (e.g., as shown in FIGS. 11B and 11C).

Fluid chambers 1112, 1114, 1116 may each contain a fluid. A volume of each of first chamber 1112, second chamber 1114 and/or third chamber 1116 may be defined by relative positions of first piston 1120 and second piston 1122 in housing 1110. The volume of each of first chamber 1112, second chamber 1114 and/or third chamber 1116 may change based on the fluid pressure within the respective chamber and/or the fluid pressure within adjacent chambers. For example, at least one of first fluid chamber 1112, second fluid chamber 1114 and third fluid chamber 1116 may include a port to introduce and/or expel fluid from the respective chamber. In the example of FIGS. 11A and 11B, first fluid chamber 1112 includes a first fluid chamber port 1113, second fluid chamber 1114 includes a second fluid chamber port 1115, and third fluid chamber 1116 includes a third fluid chamber port 1117 to introduce and/or expel fluid from the respective chamber. In some embodiments, at least one of first fluid chamber 1112, second fluid chamber 1114 and third fluid chamber 1116 contains fluid that is different from fluids contained within at least one another fluid chamber. For example, first fluid chamber 1112 and third fluid chamber 1116 may contain a first fluid and second fluid chamber 1114 may contain a second fluid. The fluid(s) may be, for example, gas(s), e.g. an air. In another example, the fluid(s) may be uncompressible (or substantially uncompressible) liquid(s).

Motion restrainer 1100 may include a fluid supply subsystem 1140. Fluid supply subsystem 1140 may control introduction of fluid to and/or expulsion of the fluid from at least one of first fluid chamber 1112, second fluid chamber 1114 and third fluid chamber 1116 of housing 1110.

Fluid supply subsystem 1140 may include a fluid pump 1142, fluid valves 1144 and/or a controller 1146 to control inflow and/or outflow of the fluid to/from chambers 1112, 1114, 1116 of housing 1110. Controller 1146 may control fluid pump 1142 and/or fluid valves 1144 based on input signals from, for example, a central controller of the vehicle platform. Controller 1146 may control fluid pump 1142 to, for example, compress the fluid in at least one fluid chamber of first chamber 1112, second chamber 1114 and third chamber 1116. Controller 1146 may control fluid pump 1142 to, for example, release fluid in at least one fluid chamber of first chamber 1112, second chamber 1114 and third chamber 1116. Controller 1146 may control fluid pump 1142 to, for example, compress fluid in at least one fluid chamber of first chamber 1112, second chamber 1114 and third chamber 1116 and release fluid in at least one another fluid chamber of first chamber 1112, second chamber 1114 and third chamber 1116.

In some embodiments, fluid supply subsystem 1140 includes fluid release valves 1145 to release fluid from first chamber 1112, second chamber 1114 and third chamber 1116 external to fluid supply subsystem 1120.

In various embodiments, first chamber 1112, second chamber 1114 and/or third chamber 1116 includes a bypass port to provide direct access to the respective chamber (and not via fluid supply subsystem 1140). The bypass port(s) may be used in the case of, for example, a fault in fluid supply subsystem 1140.

In some embodiments, fluid supply subsystem 1140 includes a fluid reservoir 1148. In some embodiments, fluid supply subsystem 1140 includes two or more fluid pumps and two or more fluid reservoirs (e.g. if different fluids are used in different fluid chambers).

In operation, e.g. when motion restrainer 1100 is assembled within suspension unit 106, first and second pistons 1120 and 1122 may move with respect to housing 1110 of piston assembly 1105 to support and/or control relative motion of first and/or second suspension linkages 120, 140 with respect to each other and/or with respect to sub-frame 105 and/or control and/or distribute loads between first and second suspension linkages 120, 140 of suspension unit 106.

In operation, controller 1146 may control inflow and outflow of the fluid to and from fluid chambers 1112, 1114, 1116 of housing 1110 to control a spring rate of spring 1130. The spring rate of spring 1130 may, for example define suspension parameters or characteristics of motion restrainer 1100 (e.g. such as suspension stiffness or any other parameter known in the art). The desired spring rate of spring 1130 may be dictated by, for example, a desired height of the vehicle platform relative to the ground (e.g. kneeling), vehicle platform speed, vehicle platform load, desired suspension performance and stiffness, vehicle platform condition (e.g., parking, off road motion, high speed motion and/or low speed motion) or any other parameter known in the art. Accordingly, by controlling inflow and outflow of the fluid to and from fluid chambers 1112, 1114, 1116 of housing 1110, controller 1136 may control suspension parameters or characteristics of motion restrainer 1100.

In operation, controller 1146 may control inflow and outflow of the fluid to and from fluid chambers 1112, 1114, 1116 of housing 1110 to control a distance between the connection points of first and second pistons 1120, 1122 to first and second linkages 151a, 151b, respectively (e.g. the length of piston assembly 1105). The distance between the connection points of first and second pistons 1120, 1122 to first and second linkages 151a, 151b, respectively, may define the height of the vehicle platform relative to the ground (e.g. as described above with respect to FIGS. 1G-1H). Accordingly, by controlling inflow and outflow of the fluid from fluid chambers 1112, 1114, 1116 of housing 1110, controller 1136 may control the height of the vehicle platform relative to the ground.

Figure 12A:
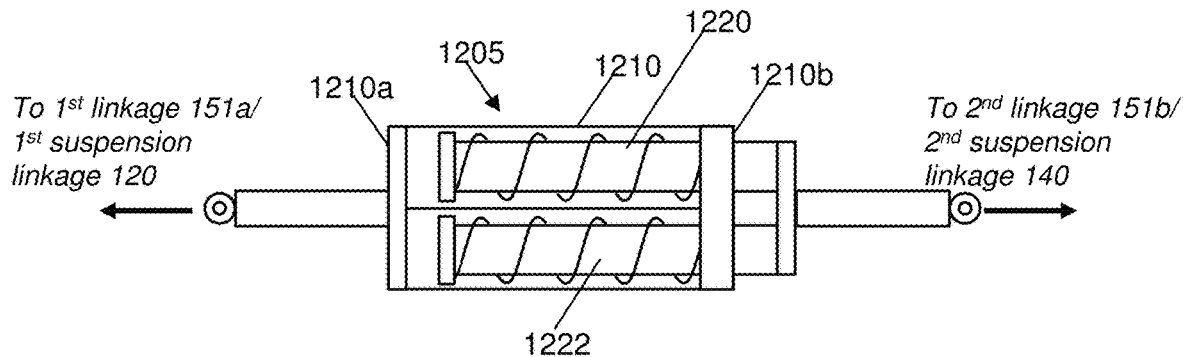
FIGS. 12A, 12B and 12C are schematic illustrations of a motion restrainer for the suspension unit, the motion restrainer including a housing 1210 accommodating two or more parallel spring-loaded members, according to some embodiments of the invention.
Figure 12B:
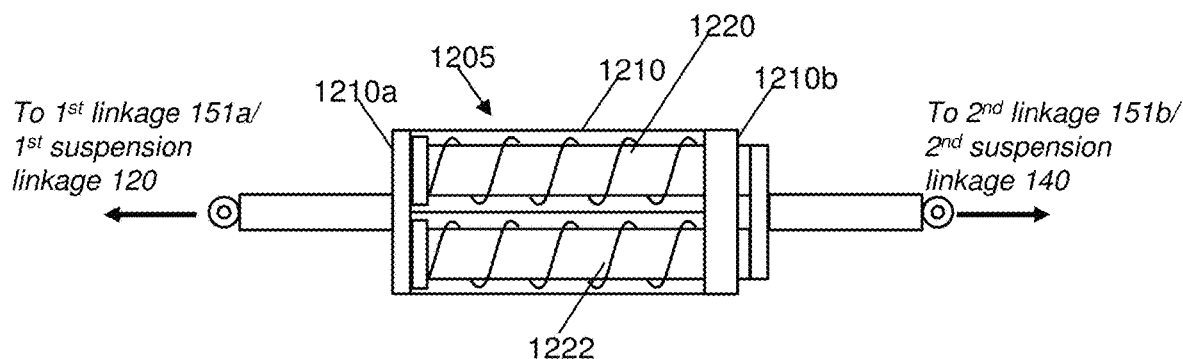
Figure 12C:
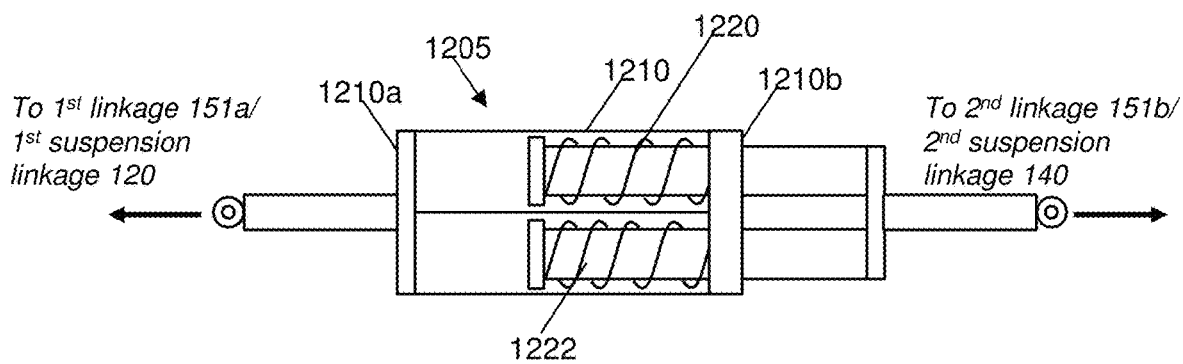

Reference is now made to FIGS. 12A, 12B and 12C, which are schematic illustrations of a motion restrainer 1200 for suspension unit 106, motion restrainer 1200 including a housing 1210 accommodating two or more parallel spring-loaded members 1220, 1222, according to some embodiments of the invention. FIGS. 12A, 12B and 12C show a schematic side view of motion restrainer 1200 at different positions of spring-loaded members 1220, 1222 within housing 1210. The different positions of spring-loaded members 1220, 1222 within housing 1210 may be caused by, e.g. motion of first and second suspension linkages 120, 140 during operation of suspension unit 106.

Motion restrainer 1200 may be used as, for example, motion restrainer 150 in suspension unit 106 (e.g. as described above with respect to FIGS. 1A-1F).

Motion restrainer 1200 may include a piston assembly 1205. Piston assembly 1205 may include a housing 1210. Housing 1210 may be connected at its first end 1210a to first suspension linkage 120, e.g. via first linkage 151a. Piston assembly 1205 may include a first spring-loaded member 1220 and a second spring-loaded member 1222 positioned within housing 1210 and extending externally from housing 1210 through a second end 1210b of housing 1210. First spring-loaded member 1220 and second spring-loaded member 1222 may be parallel to each other. First spring-loaded member 1220 and second spring-loaded member 1222 may be connected to second suspension linkage 140, e.g. via a second linkage 151b.

In various embodiments, each of first spring-loaded member 1220 and second spring-loaded member 1222 includes a shock absorber.

In some embodiments, the springs of first spring-loaded member 1220 and second spring-loaded member 1222 are preloaded to set a distance between the connection points of housing 1210 and spring-loaded members 1220, 1222 to first and second linkages 151a, 151b, respectively (e.g. the length of piston assembly 1205).

Figure 12D:
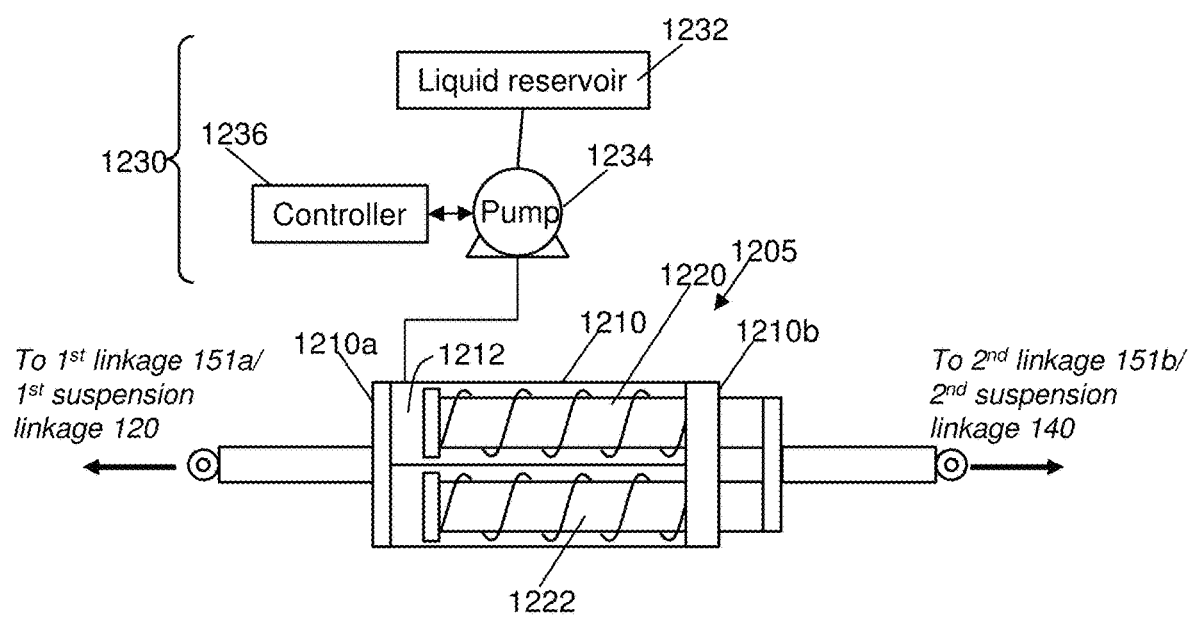
FIG. 12D is a schematic illustration of the motion restrainer of FIGS. 12A-12C including a hydraulic subsystem, according to some embodiments of the invention.

Reference is now made to FIG. 12D, which is a schematic illustration of motion restrainer 1200 of FIGS. 12A-12C including a hydraulic subsystem 1230, according to some embodiments of the invention.

First spring-loaded member 1220 and second spring-loaded member 1222 may be hydraulic pistons. Motion restrainer 1200 may include a hydraulic subsystem 1230 having a liquid reservoir 1232 and a liquid pump 1234. Liquid pump 1234 may be in fluid communication with liquid reservoir 1232 and with an interior 1212 of housing 1210. Liquid pump 1234 may circulate the liquid between liquid reservoir 1232 and interior 1212 of housing 1210. Hydraulic subsystem 1230 may include a controller 1236 to operate liquid pump 1234 to control inflow and outflow of the liquid to and from interior 1212 of housing 1210. Hydraulic subsystem 1230 may include any other components know in the art (e.g. such as valves, etc.).

In operation, e.g. when motion restrainer 1200 is assembled within suspension unit 106, first and second spring-loaded members 1220, 1222 may move with respect to housing 1210 to support and/or control relative motion of first and/or second suspension linkages 120, 140 with respect to each other and/or with respect to sub-frame 105 and/or control and/or distribute loads between first and second suspension linkages 120, 140 of suspension unit 106.

In operation, controller 1236 may control inflow and outflow of the liquid to and from housing 1210 to control suspension parameters or characteristics of motion restrainer 1200 (e.g. such suspension stiffness or any other parameter known in the art).

In operation, controller 1236 may control inflow and/or outflow of the liquid to and from housing 1210 to control the distance between the connection points of housing 1210 and spring-loaded members 1220, 1222 to first and second linkages 151a, 151b, respectively (e.g. the length of piston assembly 1205). The distance between the connection points of housing 1210 and spring-loaded members 1220, 1222 to first and second linkages 151a, 151b, respectively, may define the height of the vehicle platform relative to the ground. Accordingly, by controlling inflow and outflow of the liquid to and from housing 1210, controller 1236 may control the height of the vehicle platform relative to the ground.

Figure 13A:
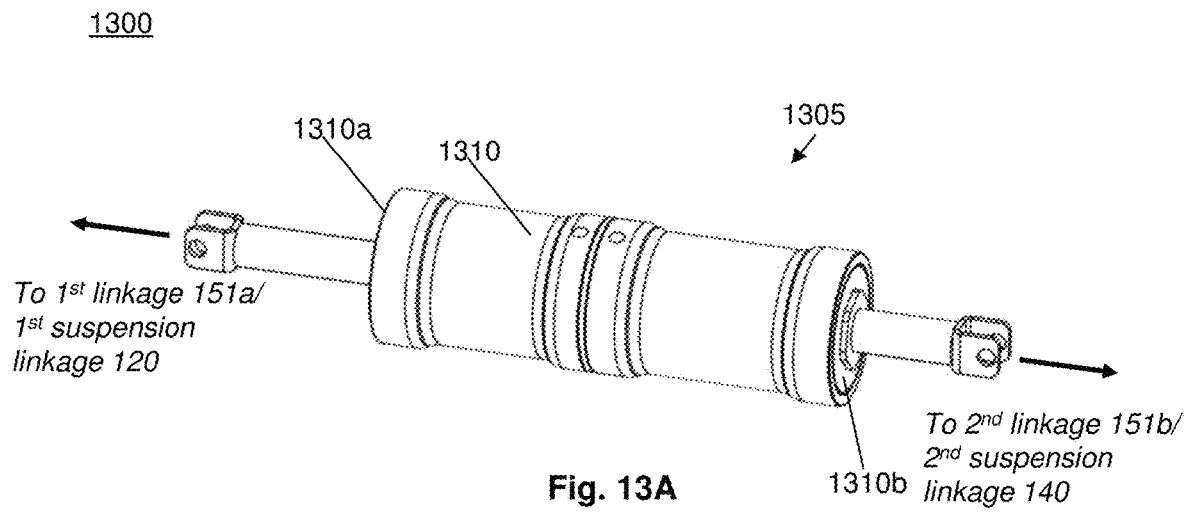
FIGS. 13A and 13B are 3D diagrams of a piston assembly of a motion restrainer for the suspension unit, according to some embodiments of the invention.
Figure 13B:
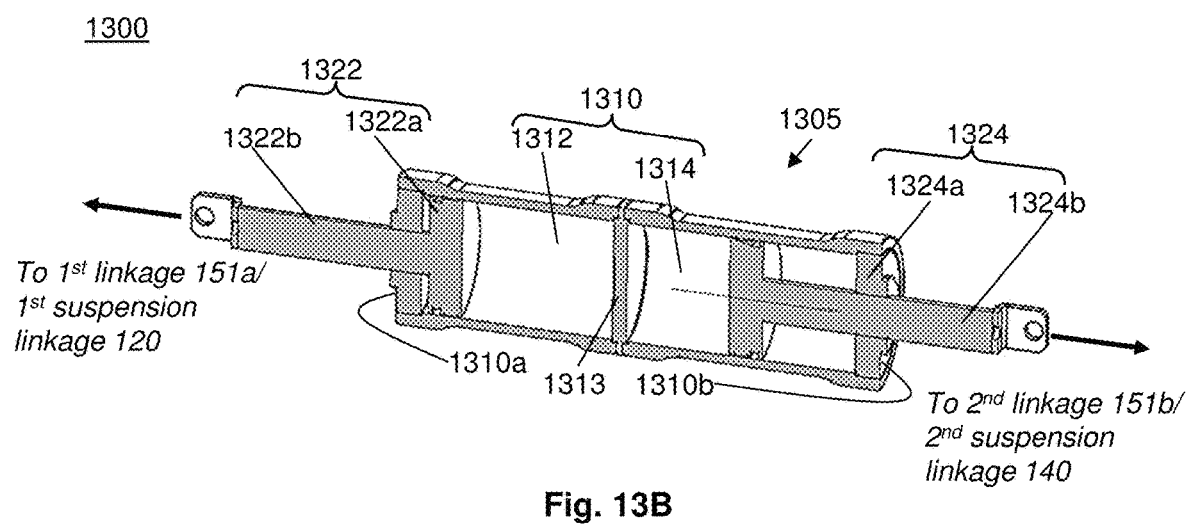

Reference is now made to FIGS. 13A and 13B, which are 3D diagrams of a piston assembly 1305 of a motion restrainer 1300 for suspension unit 106, according to some embodiments of the invention. FIG. 13A shows a perspective view of motion restrainer 1300. FIG. 13B shows a partial section view of motion restrainer 1300.

Figure 13C:
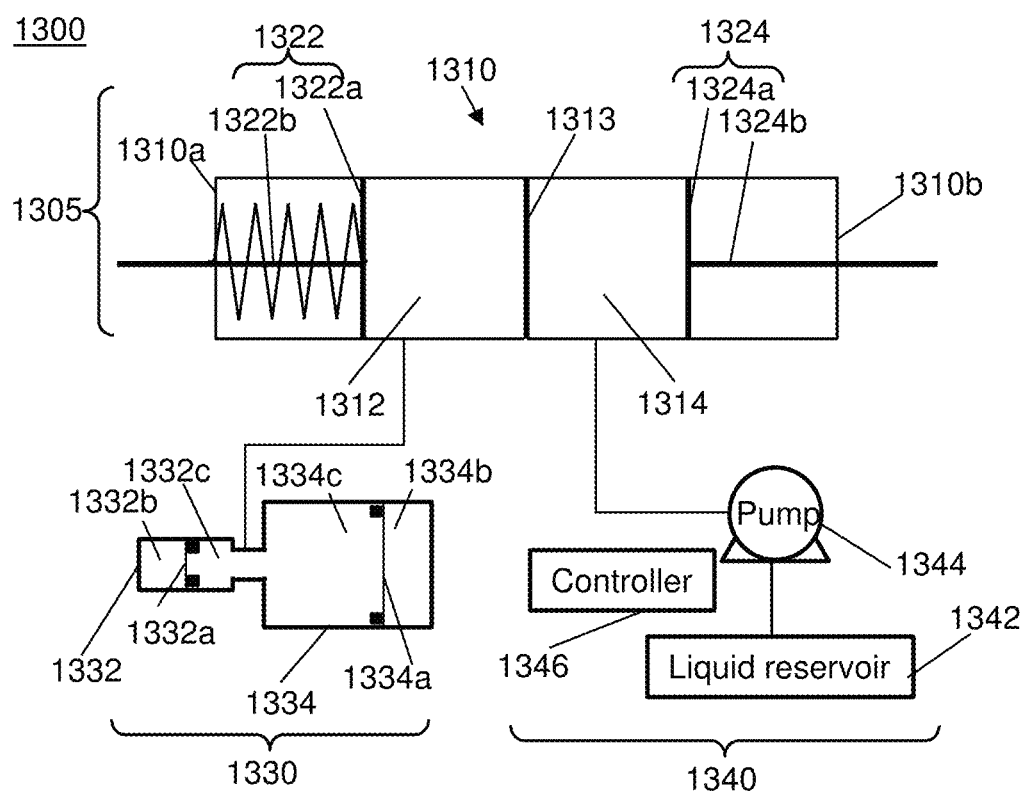
FIG. 13C is a schematic illustration of the piston assembly of FIGS. 13A-13B including a pressurizing subsystem and a hydraulic subsystem, according to some embodiments of the invention.

Reference is also made to FIG. 13C, which is a schematic illustration of piston assembly 1305 of FIGS. 13A-13B including a pressurizing subsystem 1330 and a hydraulic subsystem 1340, according to some embodiments of the invention.

Piston assembly 1305 may include a housing 1310. Housing 1310 may include a first chamber 1312 and a second chamber 1314. First and second chambers 1312, 1314 may be separated by, for example, an internal wall 1313. First piston 1322, e.g. a head 1322a of first piston 1322, may be positioned within first chamber 1312 of housing 1310. First piston 1322, e.g. a shaft 1322b of first piston 1322 extending externally from housing 1310 through a first end 1310a of housing 1310, may be connected to first suspension linkage 120, e.g. via first linkage 151a. First piston head 1322a may be sealed with respect to internal surface of housing 1310. In some embodiments, first piston 1322 is loaded with a spring 1322c (e.g., as schematically shown in FIG. 10C). Second piston 1324, e.g. a head 1324a of second piston 1322, may be positioned within second chamber 1314 of housing 1310. Second piston 1324, e.g. a shaft 1324b of second piston 1324 extending externally from housing 1310 through a second end 1310b of housing 1310, may be connected to second suspension linkage 140, e.g. via second linkage 151b. Second piston head 1324a may be sealed within housing 1310.

Motion restrainer 1300 may include a pressurizing subsystem 1330. Pressurizing subsystem 1330 may include one or more accumulators containing a pressurized gas. The one or more accumulators may be in fluid communication with first chamber 1312 of housing 1310. Each of first accumulator 1332 and second accumulator 1334 may contain a gas pressurized to a different pressure value than a gas pressure in another accumulator. For example, gas in first accumulator 1332 may be pressurized to a pressure of 1-3 Bar and gas in second accumulator 1334 may be pressurized to a pressure of 4-8 Bar. Other pressure values may be used.

First accumulator 1332 may include a piston 1332a that forms a first chamber 1332b and a second chamber 1332c at opposing sides of piston 1332a. Second accumulator 1334 may include a piston 1334a that forms a first chamber 1334b and a second chamber 1332c at opposing sides of piston 1334a. First chambers 1332b, 1334b of first and second accumulators 1332, 1334, respectively, may contain gas pre-pressurized to different pressure values with respect to each other (e.g. as described above). The gas in chambers 1332b, 1334b of first and second accumulators 1332, 1334, respectively, may be pre-pressurized to provide a desired spring or stiffness rate of first piston 1322 of piston assembly 1305 in operation (e.g. as described below). In some embodiments, first chamber 1312 of housing 1310 contains liquid. In some embodiments, a conduit interconnecting first chamber 1312 of housing 1310 and accumulators 1332, 1334 contains liquid. In some embodiments, second chambers 1332c, 1334c of first and second accumulators 1332, 1334, respectively, contain liquid.

Motion restrainer 1300 may include a hydraulic subsystem 1340. Hydraulic subsystem 1340 may include a liquid reservoir 1342 and a liquid pump 1344 in fluid communication with liquid reservoir 1342 and with second chamber 1314 of housing 1310. Liquid pump 1344 may introduce liquid to and expel liquid from second chamber 1314 of housing 1310. Hydraulic subsystem 1340 may include a controller 1346. Controller 1346 may control liquid pump 1344 to control inflow and outflow of the liquid to and from second chamber 1314 of housing 1310.

In operation, e.g. when motion restrainer 1300 is assembled within suspension unit 106, first piston 1322 may move with respect to housing 1310 of piston assembly 1305 and may act as a spring causing motion restrainer 1300 to support and control relative motion of first and second suspension linkages 120, 140 with respect to each other and/or with respect to sub-frame 105 and/or control and/or distribute loads between first and second suspension linkages 120, 140 of suspension unit 106. The spring rate (e.g. the spring stiffness) of first piston 1322 may be defined (or predefined) by pre-pressurized pressure values of gas contained within first chambers 1332b, 1334b of first and second accumulators 1332, 1334, respectively. The spring rate (e.g. stiffness) of first piston 1322 may be, for example, constant (or substantially constant) and may provide linear (or substantially linear at least along a portion of the piston displacement) force-displacement curve of motion restrainer 1300. In another example, the spring rate (e.g. stiffness) of first piston 1322 may vary as function of displacement of first piston 1322 with respect to housing 1310 of piston assembly 1305 and may provide a non-linear force-displacement curve of motion restrainer 1300. First and second accumulators 1332, 1334 may ensure continuous pressuring of first chamber 1312 accommodating first piston 1312. For example, if in operation piston 1332a of first accumulator 1332 has reached its maximal travel position or maximal pre-pressurized pressure value (e.g. when the pressure is equal to the pressure in another accumulator) and cannot move further, piston 1334a of second accumulator 1334 may still move and in second accumulator 1334 thus ensuring continuous pressuring of first chamber 1312 and providing first piston 1312 with the predefined spring rate or stiffness.

In operation, controller 1346 may control inflow and outflow of the liquid to and from second chamber 1314 of housing 1310 to control a position of second piston 1324 in second chamber 1314 of housing 1310 and thus control a distance between the connection points of first and second pistons 1322, 1324 with first and second linkages 151a, 151b, respectively (e.g. the length of piston assembly 1305). The distance between the connection points of first and second pistons 1322, 1324 to first and second linkages 151a, 151b, respectively, may define the height of the vehicle platform relative to the ground (e.g. kneeling), e.g. as described above with respect to FIGS. 1G-1H. Accordingly, by controlling inflow and/or outflow of the liquid to and from second chamber 1314 of housing 1310, controller 1346 may control the height of the vehicle platform relative to the ground (e.g. kneeling).

Figure 14A:
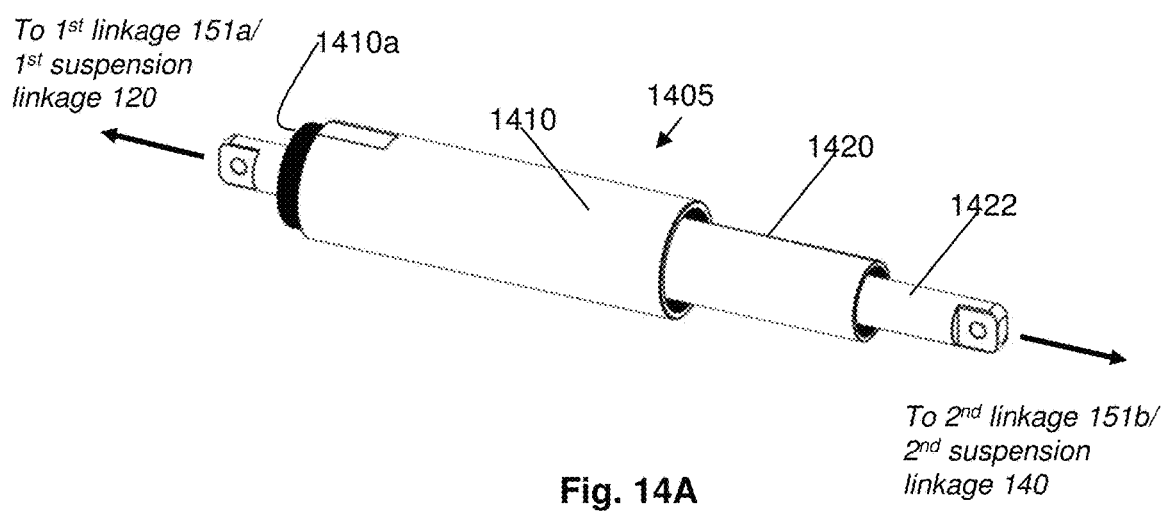
FIGS. 14A and 14B are 3D diagrams of a telescopic piston assembly of a motion restrainer for the suspension unit, according to some embodiments of the invention.
Figure 14B:
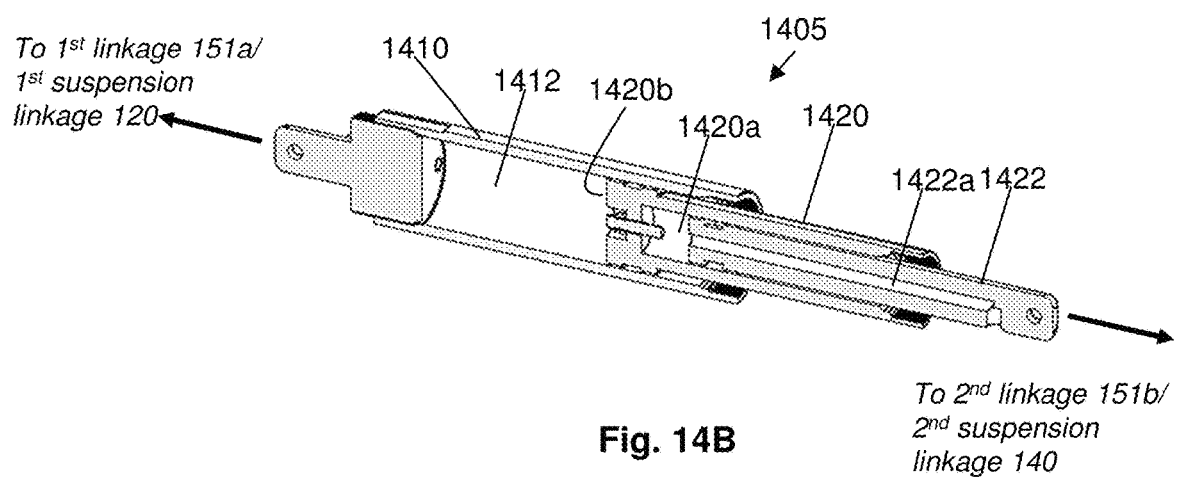

Reference is now made to FIGS. 14A and 14B, which are 3D diagrams of a telescopic piston assembly 1405 of a motion restrainer 1400 for suspension unit 106, according to some embodiments of the invention. FIG. 14A shows a perspective view of motion restrainer 1400. FIG. 14B shows a partial section view of motion restrainer 1400.

Figure 14C:
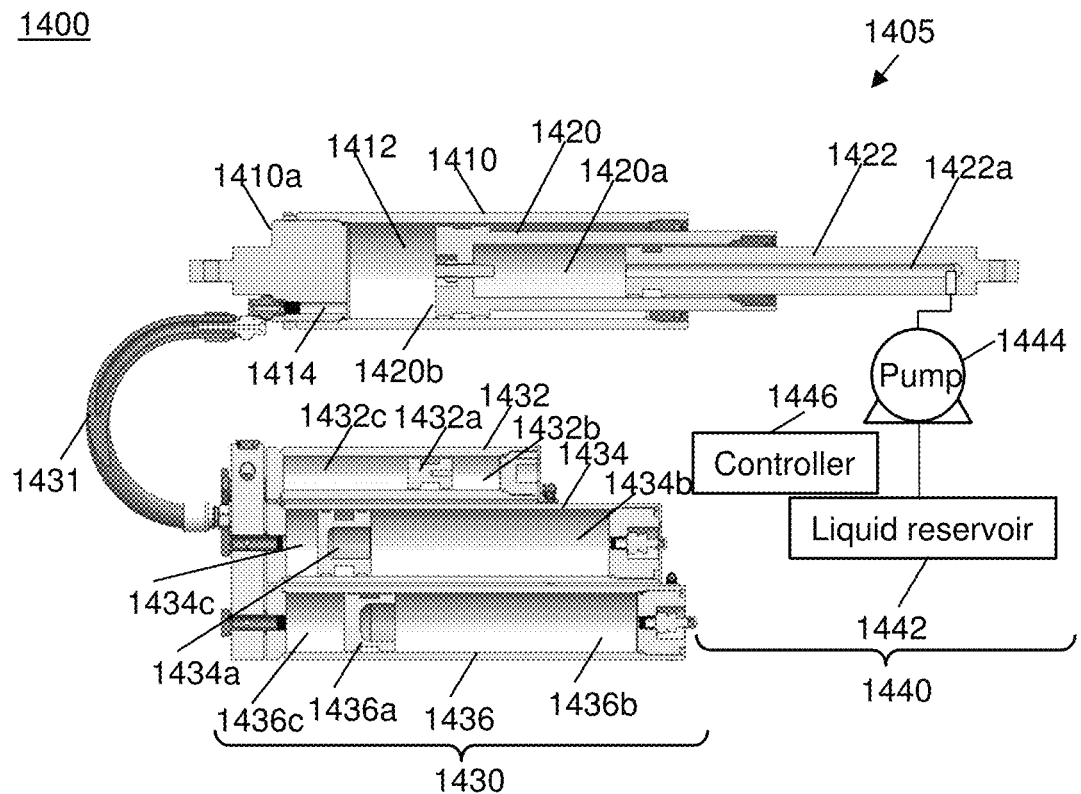
FIG. 14C is a 2D diagram of a partial sectional view of the telescopic piston assembly of FIGS. 14A-14B and of a pressurizing subsystem, and a schematic illustration of a hydraulic subsystem, according to some embodiments of the invention.

Reference is also made to FIG. 14C, which is a 2D diagram of a partial sectional view of telescopic piston assembly 1405 of FIGS. 14A-14B and of a pressurizing subsystem 1430, and a schematic illustration of a hydraulic subsystem 1440, according to some embodiments of the invention. FIG. 14C shows a partial section view of piston assembly 1405 and a pressurizing subsystem 1430 and a schematic view of hydraulic subsystem 1040 of motion restrainer 1400.

Figure 14D:
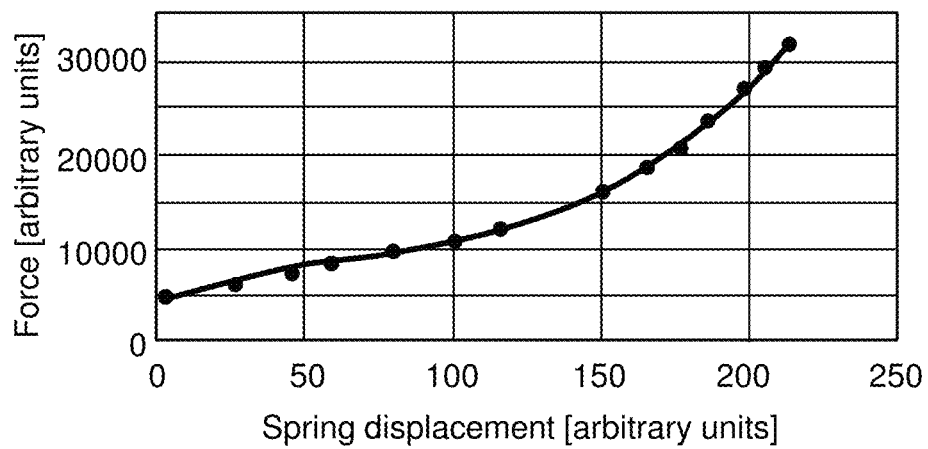
FIG. 14D is a graph showing an example of a force-displacement curve of the motion restrainer of FIG. 14C, according to some embodiments of the invention.

Reference is also made to FIG. 14D, which is a graph showing an example of a force-displacement curve of motion restrainer 1400 of FIG. 14C, according to some embodiments of the invention.

Telescopic piston assembly 1405 may include a housing 1410 having a housing cavity 1412. Housing 1410 may be connected, e.g. at its closed end 1410a, to first suspension linkage 120, e.g. via first linkage 151a. Telescopic piston assembly 1405 may include a first piston 1420 positioned in housing cavity 1412. First piston 1420 may be sealed with respect to the internal surface of housing cavity 1412. First piston 1420 may include a first piston cavity 1420a having a closed end 1420b. Telescopic piston assembly 1405 may include a second piston 1422a positioned within first piston cavity 1420a. Second piston 1422 may be sealed with respect to the internal surface of first piston cavity 1420a. Second piston 1422 may be connected, e.g. at its end extending externally from first position cavity 1420a, to second suspension linkage 140, e.g. via second linkage 151b.

Motion restrainer 1400 may include a pressurizing subsystem 1430. Pressurizing subsystem 1430 may include one or more accumulators containing a pressurized gas. The one or more accumulators may be in fluid communication with housing cavity 1412, e.g. via a port 1414 in closed end 1410a of housing 1410. For example, pressurizing subsystem 1430 may include a first accumulator 1432, a second accumulator 1434 and a third accumulator 1436 in fluid communication with housing cavity 1412 (e.g. as shown in FIG. 14C). Each of first accumulator 1432, second accumulator 1434 and third accumulator 1436 may contain a gas pressurized to different pressure value than a gas in another accumulator. Accumulators 1432, 1434, 1436 may be positioned adjacent to and parallel to each other (e.g. as shown in FIG. 14C) to, for example, provide compact pressurizing system assembly.

First accumulator 1432 may include a piston 1432a that forms a first chamber 1432b and a second chamber 1432c in first accumulator 1432 at opposing sides of piston 1432a. Second accumulator 1434 may include a piston 1434a that forms a first chamber 1434b and a second chamber 1434c in second accumulator 1434 at opposing sides of piston 1434a. Third accumulator 1436 may include a piston 1436a that forms a first chamber 1436b and a second chamber 1436c in third accumulator 1436 at opposing sides of piston 1436a. First chambers 1432b, 1434b, 1436b of first, second and third accumulators 1432, 1434, 1436, respectively, may contain gas pre-pressurized to different pressure values with respect to each other (e.g. as described above). The gas in chambers 1432b, 1434b, 1436b of first, second and third accumulators 1432, 1434, 1436, respectively, may be pre-pressurized to provide a desired spring or stiffness rate of first piston 1420 of piston assembly 1405 in operation (e.g. as described below). In some embodiments, housing cavity 1412 contains liquid. In some embodiments, a conduit 1431 interconnecting housing cavity 1412 and accumulators 1432, 1434, 1436 contains liquid. In some embodiments, second chambers 1432c, 1434c, 1436c of first, second and third accumulators 1432, 1434, 1436, respectively, contain liquid.

Motion restrainer 1400 may include a hydraulic subsystem 1440. Hydraulic subsystem 1440 may include a liquid reservoir 1442 and a liquid pump 1444 in fluid communication with liquid reservoir 1442 and with first piston cavity 1420a, e.g. via a channel 1422a made through the length of second piston 1422 (e.g. as shown in FIG. 14C). Liquid pump 1444 may introduce liquid to and/or expel liquid from first piston cavity 1420a. Hydraulic subsystem 1440 may include a controller 1446. Controller 1446 may control liquid pump 1444 to control inflow and/or outflow of the liquid to and from first piston cavity 1420a.

In operation, e.g. when motion restrainer 1400 is assembled within suspension unit 106, first piston 1420 may move with respect to housing 1410 of piston assembly 1405 and may act as a spring to support and control relative motion of first and second suspension linkages 120, 140 with respect to each other and with respect to sub-frame 105 and/or control and distribute loads between first and second suspension linkages 120, 140 of suspension unit 106. The spring rate (e.g. the spring stiffness) of first piston 1420 may be defined (or predefined) by pre-pressurized pressure values of gas contained within first chambers 1432b, 1434b, 1436b of first, second and third accumulators 1432, 1434, 1436 respectively. The spring rate (e.g. stiffness) of first piston 1420 may be, for example, constant (or substantially constant) and may provide linear (or substantially linear at least along a portion of the piston displacement) force-displacement curve of motion restrainer 1400. In another example, the spring rate (e.g. stiffness) of first piston 1420 may vary as function of displacement of first piston 1420 with respect to housing 1410 of piston assembly 1405 and may provide a non-linear force-displacement curve of motion restrainer 1400 (e.g. as shown in FIG. 14D). First, second and third accumulators 1432, 1434, 1436 may ensure continuous pressuring of first piston housing cavity 1412 accommodating first piston 1420 and provide first piston 1420 with the pre-determined spring rate or stiffness.

Utilization of fluid accumulators 1432, 1434, 1436 in motion restrainer 1400 may cause first piston 1420 to act as a spring, thus, in some embodiments, eliminating a need in having coil springs in piston assembly 1405. Piston assembly 1405 that has no coil springs therein may be smaller and/or less complex as compared to piston assemblies having coil springs therein. Furthermore, coils springs typically have constant spring rate or stiffness while accumulators 1432, 1434, 1436 may provide piston 1420 with variable spring rate or stiffness characteristics (e.g. as described above).

In operation, controller 1446 may control inflow and outflow of the liquid to and from first piston cavity 1420a to control a position of second piston 1422 in first piston cavity 1420a and thus control a distance between the connection points of housing 1410 and second piston 1422 with first and second linkages 151a, 151b, respectively (e.g. the length of piston assembly 1405). The distance between the connection points of housing 1410 and second piston 1422 with first and second linkages 151a, 151b, respectively, may define the height of the vehicle platform relative to the ground (e.g. kneeling; as described above with respect to FIGS. 1G-1H).

Accordingly, by controlling inflow and/or outflow of the liquid to and from first piston cavity 1420a, controller 1446 may control the height of the vehicle platform relative to the ground (e.g. kneeling).

Figure 14E:
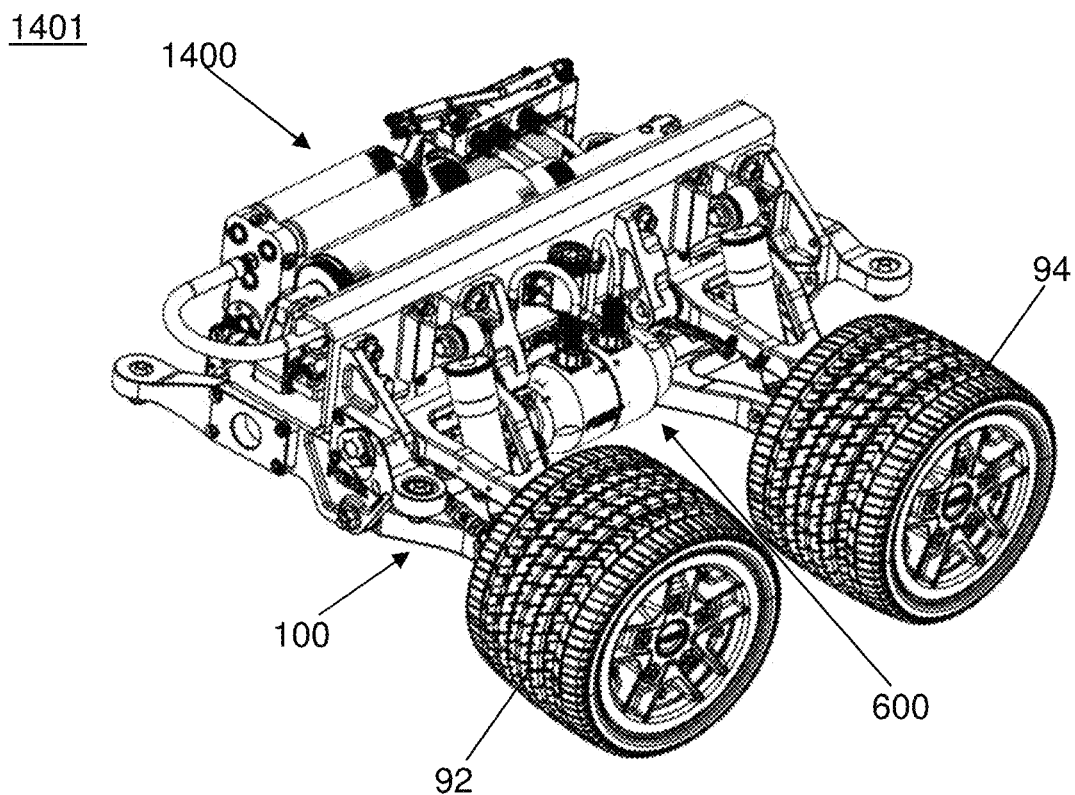
FIGS. 14E and 14F show 3D diagrams of a vehicle corner system for a dual-axle wheels assembly including the suspension unit, the steering unit and the motion restrainer of FIGS. 14A-14C, and of wheels connected to the vehicle corner system, according to some embodiments of the invention.
Figure 14F:
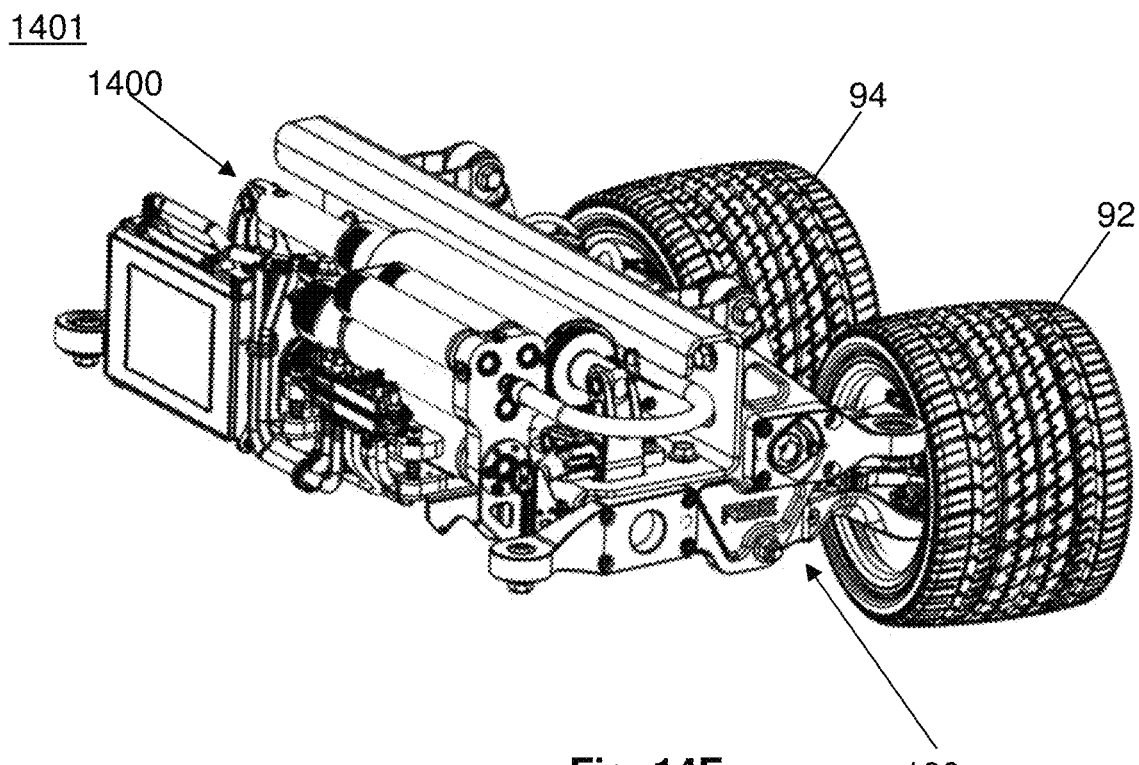

Reference is now made to FIGS. 14E and 14F show 3D diagrams of a vehicle corner system 1401 including suspension unit 106, steering unit 601 and motion restrainer 1400 of FIGS. 14A-14C, and of wheels 92, 94 connected to suspension unit 106, according to some embodiments of the invention. FIGS. 14E and 14F show different perspective views of motion restrainers 1400.

Vehicle corner systems according to some embodiments of the present invention may include any combination of motion restrainers 1400, steering units and/or drivetrain units described herein. For example, FIGS. 14E and 14F show 3D diagrams of vehicle corner system 1401 suspension unit 106 including steering unit 601 of FIGS. 6A-6B and motion restrainer 1400 of FIGS. 14A-14C, and of wheels 92, 94 connected to suspension unit 106.

Figure 15A:
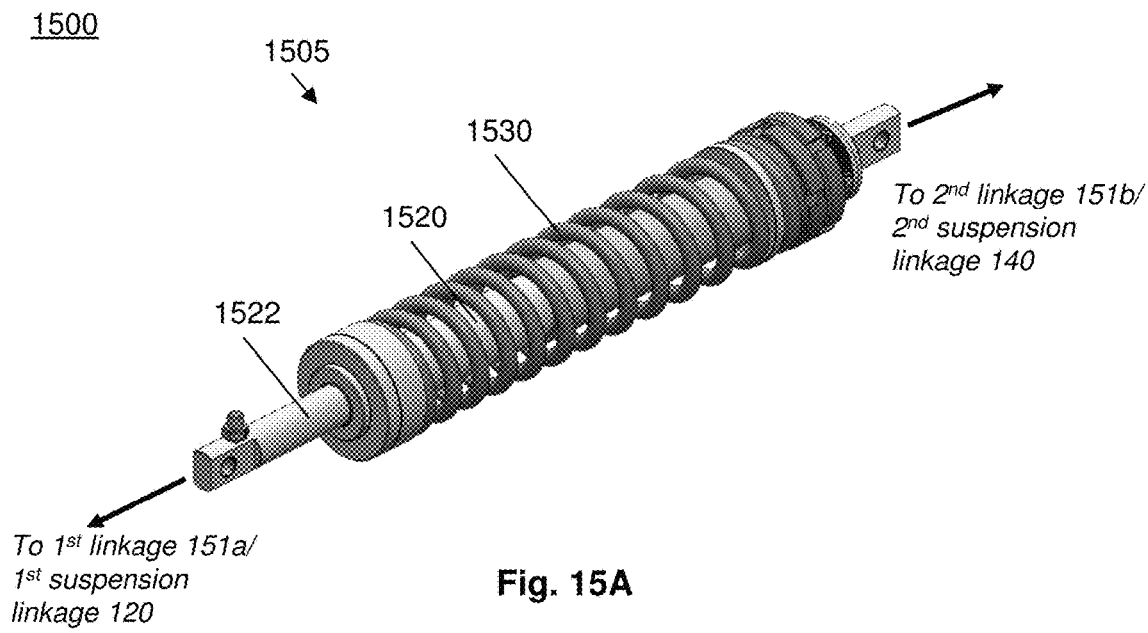
FIG. 15A is a 3D diagram of a piston assembly of a motion restrainer for the suspension unit, according to some embodiments of the invention.

Reference is now made to FIG. 15A, which is a 3D diagram of a piston assembly 1505 of a motion restrainer 1500 for suspension unit 106, according to some embodiments of the invention. FIG. 15A shows a perspective view of piston assembly 1505.

Figure 15B:
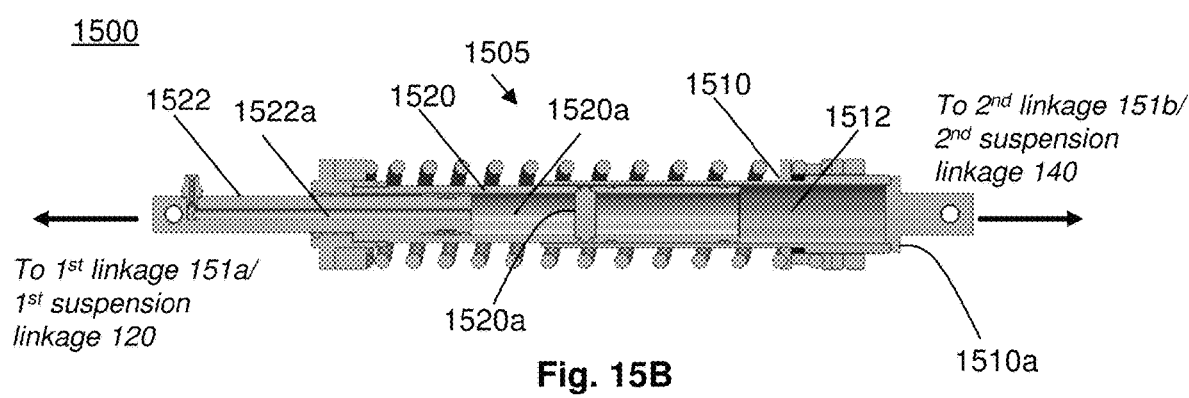
FIG. 15B is a 2D diagram of a partial sectional view of the piston assembly of FIG. 15A, according to some embodiments of the invention.

Reference is also made to FIG. 15B, which is a 2D diagram of a partial sectional view of piston assembly 1505 of FIG. 15A, according to some embodiments of the invention.

Figure 15C:
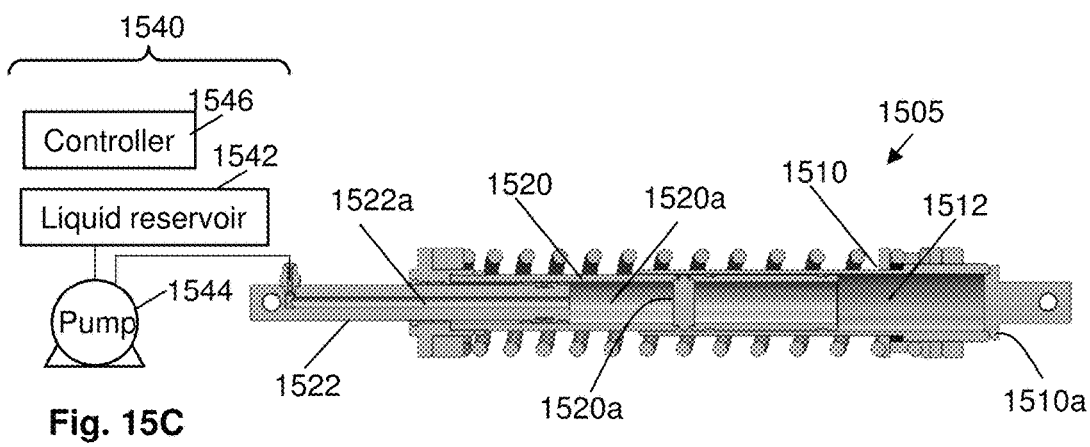
FIG. 15C is a 2D diagram of a partial sectional view of the piston assembly of FIGS. 15A-15B, and a schematic illustration of a hydraulic subsystem, according to some embodiments of the invention.

Reference is also made to FIG. 15C, which is a 2D diagram of a partial sectional view of piston assembly 1505 of FIGS. 15A-15B, and a schematic illustration of a hydraulic subsystem 1540, according to some embodiments of the invention.

Piston assembly 1505 may include a housing 1510 having a housing cavity 1512. Housing 1510 may be connected, e.g. at its closed end 1510a, to first suspension linkage 120, e.g. via first linkage 151a. Piston assembly 1505 may include a first piston 1520 positioned in housing cavity 1512. First piston 1520 may be sealed with respect to the internal surface of housing cavity 1512. First piston 1520 may include a first piston cavity 1520a having a closed end 1520b. Piston assembly 1505 may include a second piston 1522a positioned within first piston cavity 1520a. Second piston 1522 may be sealed with respect to the internal surface of first piston cavity 1520a. Second piston 1522 may be connected, e.g. at its end extending externally from first position cavity 1520a, to second suspension linkage 140, e.g. via second linkage 151b. Second piston 1522 may include a hollow channel 1522a made through the length of second piston 1522 to fluidically connect first piston cavity 1520a to hydraulic subsystem 1530. Piston assembly 1505 may include a spring 1530 positioned between and surrounding second piston 1520 and housing 1510.

Hydraulic subsystem 1540 may include a liquid reservoir 1542 and a liquid pump 1544 in fluid communication with liquid reservoir 1542 and with first piston cavity 1520a, e.g. via a hollow channel 1522a made through the length of second piston 1522 (e.g. as shown in FIG. 15C). Liquid pump 1544 may introduce liquid to and expel liquid from second chamber 1514 of housing 1510. Hydraulic subsystem 1540 may include a controller 1546. Controller 1546 may control liquid pump 1544 to control inflow and outflow of the liquid to and from first piston cavity 1520a.

In operation, e.g. when motion restrainer 1500 is assembled within suspension unit 106, first and second pistons 1520, 1522 may move with respect to housing 1510 and first piston 1520 of piston assembly 1505, respectively, to support and control relative motion of first and second suspension linkages 120, 140 with respect to each other and with respect to sub-frame 105 and/or control and distribute loads between first and second suspension linkages 120, 140 of suspension unit 106.

In operation, controller 1546 may control inflow and outflow of the liquid to and from first piston cavity 1520*a* to control a position of second piston 1522 in first piston cavity 1520*a* and thus control a distance between the connection points of housing 1510 and second piston 1522 with first and second linkages 151*a*, 151*b*, respectively (e.g. the length of piston assembly 1505). The distance between the connection points of housing 1510 and second piston 1522 with first and second linkages 151*a*, 151*b*, respectively, may define the height of the vehicle platform relative to the ground (e.g. as described above with respect to FIGS. 1G-1H). Accordingly, by controlling inflow and outflow of the liquid to and from first piston cavity 1520*a*, controller 1546 may control the height of the vehicle platform relative to the ground.

Figure 16A:
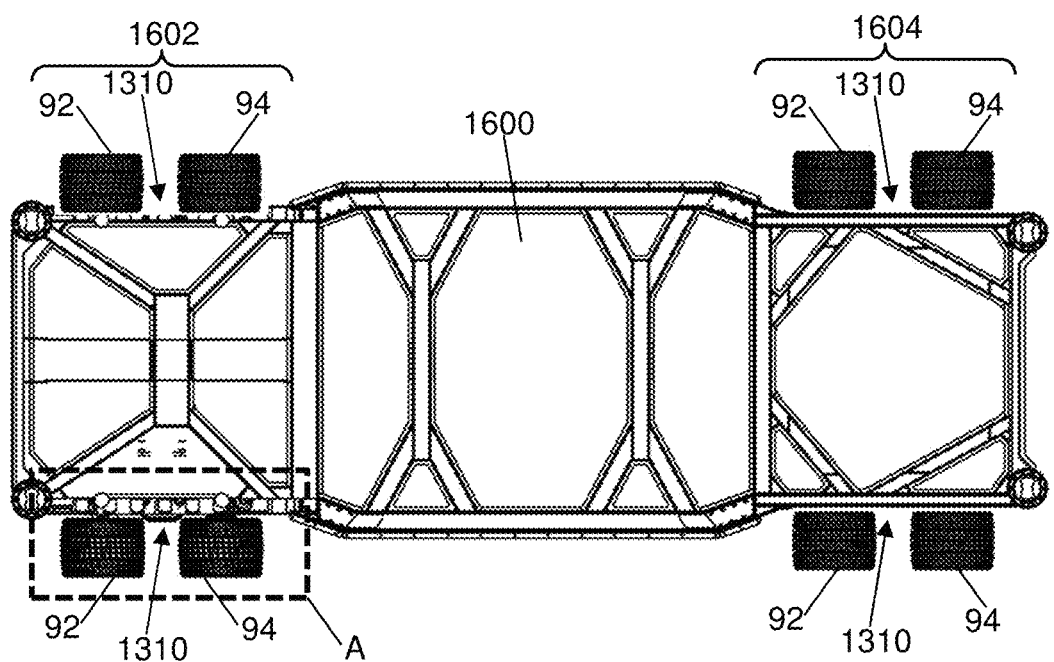
FIGS. 16A and 16B are 2D diagrams of a vehicle platform including vehicle corner systems 1610 for dual-axle wheels assemblies, according to some embodiments of the invention.
Figure 16B:
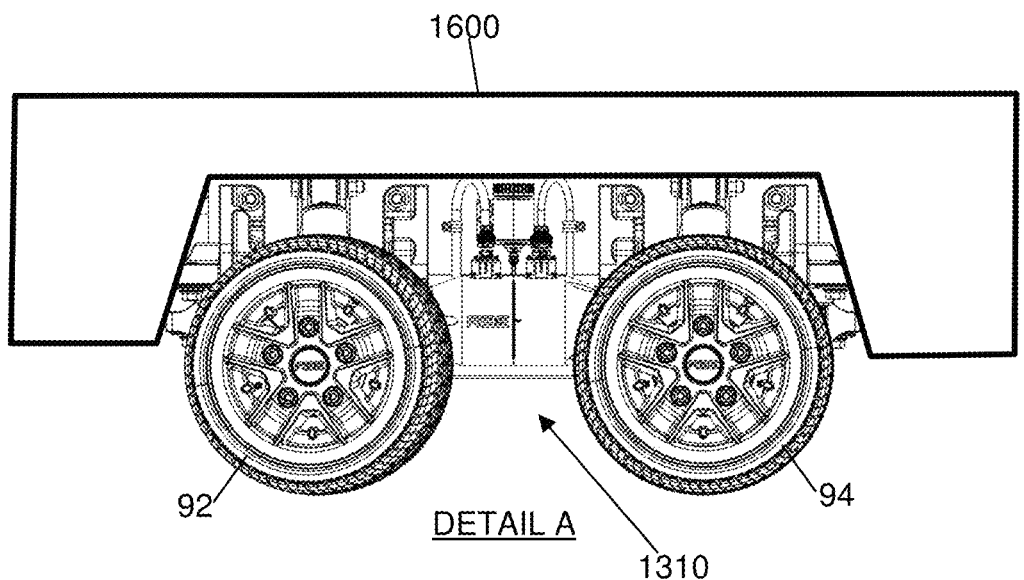

Reference is now made to FIGS. 16A and 16B, which are 2D diagrams of a vehicle platform 1600 including vehicle corner systems 1610 for dual-axle wheels assemblies, according to some embodiments of the invention. FIG. 16A shows a top view of vehicle platform 1600. FIG. 16B shows an enlarged side view of portion A of FIG. 16A.

Vehicle platform 1600 may include two or more pairs of vehicle corner systems 1610 for dual-axle wheels assemblies, wherein vehicle corner systems 1610 of each of the pairs may be connected to opposing sides of vehicle platform 1600 with respect to each other. In the example of FIG. 16A, vehicle platform 1600 includes two pairs of vehicle corner systems 1610—e.g. a front pair 1302 and a read pair 1304 of vehicle corner systems 1610. Each of vehicle corner systems 1610 may be similar to or may include components of vehicle corner systems 100, 200, 300, 400, 500, 600, 700, 800, 900, 1000 described above.

Each of vehicle corner systems 1610 may be connected to either side of the vehicle platform (e.g. vehicle corner systems 1610 may be non-handed) without a need in any mechanical or other adaptations of in neither vehicle corner systems 1610 nor the vehicle platform. Vehicle corner systems 1610 may be easily connected to vehicle platform 1600 using less connectors, using simpler connectors and in a manner that is less time consuming than conventional vehicle corner systems 1610. For example, the sub-frame (e.g. sub-frame 105 described herein) of each of vehicle corner systems 1610 may be connected to vehicle platform 1600 using screws, bolts, and other connectors known in the art. In some embodiments, vehicle corner systems 1610 are connected laterally to vehicle platform 1600. In some embodiments, vehicle corner systems 1610 are connected vertically to vehicle platform 1600. In various embodiments, at least one of the drivetrain system components, motion restrainer components, steering system components, and/or the brake system components of vehicle corner systems 1610 is not positioned in an area beneath vehicle platform 1600. In various embodiments, as shown for example in FIG. 16B, at least one of the drivetrain system components, motion restrainer components, steering system components, and/or the brake system components of vehicle corner systems 1610 is not positioned in an area above vehicle platform 1600.

Utilization of vehicle corner systems 1610 may provide wide design flexibility of vehicle platform 1600. Since vehicle corner systems 1610 may be connected to sides of vehicle platform 1600, e.g. such that none of components of vehicle corner systems 1610 is positioned in an area beneath vehicle platform 1600 and/or in an area above vehicle platform 1600 and between the opposing vehicle corner systems 1610, vehicle corner systems 1610 do not dictate the shape of vehicle platform 1600, which may be flat, or substantially flat, and may be entirely (or substantially entirely) used for installation of vehicle components.

Vehicle platform 1600 having vehicle corner systems 1610 according to embodiments of the invention may be substantially flat and/or may be significantly lower than vehicle platforms assembled with current typical dual-axle corner assemblies. The lower the vehicle platform, the lower its center of mass and thus such vehicle platform may, for example, have improved stability on the ground surface and/or may cause easier loading and unloading of goods, possibly without using a forklift or a loading ramp. Furthermore, the lower the vehicle platform, the greater the volume available for a cargo on the vehicle platform. For example, typical vehicles for city cargo delivery have a total height of 157 inches, wherein typical height of a vehicle chassis platform is 45 inches, providing a maximal height for a cargo volume of 112 inches. Vehicle platform 1600 assembled with vehicle corner systems 1610 according to embodiments of the invention may have a height of 16.5 inches, providing a maximal height for a cargo volume of 140.5 inches. Accordingly, a vehicle having vehicle platform 1600 assembled with vehicle corner systems 1610 according to embodiments of the invention may have 25% more volume for cargo as compared to vehicles having vehicle platforms assembled with typical vehicle corner systems for platforms having the same footprint.

Each of vehicle corner systems 1610 of first pair 1302 and/or second pair 1304 may include any combination of the motion restrainer (e.g. motion restrainer 150, 1100, 1200, 130, 1400 described above), the steering units (e.g. steering units 201, 301, 401, 501, 601 described above) and/or drivetrain unit (e.g. drivetrain units 701, 801, 901 described above). Each of vehicle corner systems 1610 of vehicle platform 1600 may provide a separate suspension for wheels connected thereto, independent of suspension of wheels connected to other vehicle corner systems 1610 of vehicle platform 1600. In some embodiments, each vehicle corner systems 1610 of vehicle platform 1600 may provide a separate steering of wheels connected thereto, independent of steering of wheels connected to other vehicle corner systems 1610 of vehicle platform 1600. In some embodiments, each vehicle corner systems 1610 of vehicle platform 1600 may provide a separate powering of wheels connected thereto, independent of powering of wheels connected to other vehicle corner systems 1610 of vehicle platform 1600. Vehicle platform 1600 assembled with vehicle corner systems 1610 according to embodiments of the invention and having independent suspension and/or independent steering and/or independent powering of vehicle corner systems 1610 may have an improved traction, improved stability, improved performance and improved steering as compared to vehicle platforms assembled with typical vehicle corner systems.

According to various embodiments, vehicle platform 1600 and/or vehicle corner systems 1610 includes a control system including one or more sensors and a controller. The one or more sensors may measure, for example, road conditions, loads applied on components of vehicle corner systems 1610 or any other parameters related to operation of vehicle platform 1600 or vehicle corner systems 1610. The controller of the control system may process the measured parameters and generate data and/or notifications related thereto. For example, the controller may generate data related to health of vehicle platform 1600 or vehicle corner systems 1610, maintenance data and/or predictive data based on the measured parameters.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A vehicle corner system for a dual-axle wheels assembly, the vehicle corner system comprising:
    a sub-frame;
    a first wheel interface having a first spinning axis about which a first wheel spins when connected to the first wheel interface;
    a first suspension linkage comprising a first arm connected to the sub-frame and to the first wheel interface, the first arm is rotatable with respect to the sub-frame about a first axis that is substantially perpendicular to the first spinning axis;
    a second wheel interface having a second spinning axis about which a second wheel spins when connected to the second wheel interface;
    a second suspension linkage comprising a second arm connected to the sub-frame and to the second wheel interface, the second arm is rotatable with respect to the sub-frame about a second axis that is substantially perpendicular to the second spinning axis; and
    a motion restrainer comprising a piston assembly interconnecting the first suspension linkage and the second suspension linkage, the motion restrainer is to controllably increase and decrease a length of the piston assembly;
    wherein the piston assembly is disposed between the first spinning axis and the second spinning axis.

2. The vehicle corner system of claim 1, further comprising a drivetrain unit comprising at least one motor to spin at least one of the first and second wheel interfaces about the first spinning axis and the second spinning axis, respectively.

3. A vehicle corner system for a dual-axle wheels assembly, the vehicle corner system comprising:
    a sub-frame;
    a first wheel interface having a first spinning axis about which a first wheel spins when connected to the first wheel interface;
    a first suspension linkage comprising a first arm connected to the sub-frame and to the first wheel interface, the first arm is rotatable with respect to the sub-frame about a first axis that is substantially perpendicular to the first spinning axis;
    a second wheel interface having a second spinning axis about which a second wheel spins when connected to the second wheel interface;
    a second suspension linkage comprising a second arm connected to the sub-frame and to the second wheel interface, the second arm is rotatable with respect to the sub-frame about a second axis that is substantially perpendicular to the second spinning axis; and
    a motion restrainer comprising a piston assembly interconnecting the first suspension linkage and the second suspension linkage, the motion restrainer is to controllably increase and decrease a length of the piston assembly;
    wherein the motion restrainer is to controllably increase and decrease the length of the piston assembly to control a height of the sub-frame relative to a ground surface when the vehicle corner system is assembled to a vehicle platform.

4. The vehicle corner system of claim 3, further comprising a drivetrain unit comprising at least one motor to spin at least one of the first and second wheel interfaces about the first spinning axis and the second spinning axis, respectively.

5. A vehicle corner system for a dual-axle wheels assembly, the vehicle corner system comprising:
    a sub-frame;
    a first wheel interface having a first spinning axis about which a first wheel spins when connected to the first wheel interface;
    a first suspension linkage comprising a first arm connected to the sub-frame and to the first wheel interface, the first arm is rotatable with respect to the sub-frame about a first axis that is substantially perpendicular to the first spinning axis;
    a second wheel interface having a second spinning axis about which a second wheel spins when connected to the second wheel interface;
    a second suspension linkage comprising a second arm connected to the sub-frame and to the second wheel interface, the second arm is rotatable with respect to the sub-frame about a second axis that is substantially perpendicular to the second spinning axis; and
    a motion restrainer comprising a piston assembly interconnecting the first suspension linkage and the second suspension linkage, the motion restrainer is to controllably increase and decrease a length of the piston assembly;
    wherein (i) the first wheel interface and the second wheel interface, and (ii) the piston assembly are at opposite sides of the sub-frame with respect to each other.

6. The vehicle corner system of claim 5, further comprising a drivetrain unit comprising at least one motor to spin at least one of the first and second wheel interfaces about the first spinning axis and the second spinning axis, respectively.

7. A vehicle corner system for a dual-axle wheels assembly, the vehicle corner system comprising:
 a sub-frame;
 a first wheel interface having a first spinning axis about which a first wheel spins when connected to the first wheel interface;
 a first suspension linkage comprising a first arm connected to the sub-frame and to the first wheel interface, the first arm is rotatable with respect to the sub-frame about a first axis that is substantially perpendicular to the first spinning axis;
 a second wheel interface having a second spinning axis about which a second wheel spins when connected to the second wheel interface;
 a second suspension linkage comprising a second arm connected to the sub-frame and to the second wheel interface, the second arm is rotatable with respect to the sub-frame about a second axis that is substantially perpendicular to the second spinning axis; and
 a motion restrainer comprising a piston assembly interconnecting the first suspension linkage and the second suspension linkage, the motion restrainer is to controllably increase and decrease a length of the piston assembly; and
 a first shock absorber connected to the first suspension linkage and to the sub-frame; and
 a second shock absorber connected to the second suspension linkage and to the sub-frame.

8. The vehicle corner system of claim 7, further comprising a drivetrain unit comprising at least one motor to spin at least one of the first and second wheel interfaces about the first spinning axis and the second spinning axis, respectively.

9. A vehicle corner system for a dual-axle wheels assembly, the vehicle corner system comprising:
 a sub-frame;
 a first wheel interface having a first spinning axis about which a first wheel spins when connected to the first wheel interface;
 a first suspension linkage comprising a first arm connected to the sub-frame and to the first wheel interface, the first arm is rotatable with respect to the sub-frame about a first axis that is substantially perpendicular to the first spinning axis;
 a second wheel interface having a second spinning axis about which a second wheel spins when connected to the second wheel interface;
 a second suspension linkage comprising a second arm connected to the sub-frame and to the second wheel interface, the second arm is rotatable with respect to the sub-frame about a second axis that is substantially perpendicular to the second spinning axis; and
 a motion restrainer comprising a piston assembly interconnecting the first suspension linkage and the second suspension linkage, the motion restrainer is to controllably increase and decrease a length of the piston assembly;
 wherein the first suspension linkage comprises a third arm connected to the first wheel interface and the sub-frame, the third arm is rotatable with respect to the sub-frame about a third axis that is substantially perpendicular to the first spinning axis; and
 wherein the second suspension linkage comprises a fourth arm connected to the second wheel interface and the sub-frame, the fourth arm is rotatable with respect to the sub-frame about a fourth axis that is substantially perpendicular to the second spinning axis;
 wherein the third arm comprises a third arm aperture through which a first shock absorber extends between the first arm and the sub-frame, and
 wherein the fourth arm comprises a fourth arm aperture through which a second shock absorber extends between the second arm and the sub-frame.

10. The vehicle corner system of claim 9, further comprising a drivetrain unit comprising at least one motor to spin at least one of the first and second wheel interfaces about the first spinning axis and the second spinning axis, respectively.

11. A vehicle corner system comprising:
 a sub-frame;
 a first wheel interface having a first spinning axis about which a first wheel spins when connected to the first wheel interface;
 a first suspension linkage connected to and being transverse to the sub-frame and to the first wheel interface;
 a second wheel interface having a second spinning axis about which a second wheel spins when connected to the second wheel interface;
 a second suspension linkage connected to and being transverse to the sub-frame and to the second wheel interface;
 wherein at least one of:
 the first wheel interface is rotatable about a first steering axis; and
 the second wheel interface is rotatable about a second steering axis; and
 wherein the vehicle corner system further comprises:
 a steering actuator connected to the sub-frame and having a steering actuator rod that is transverse to the first and second spinning axes and to the first and second steering axes, and
 a steering linkage connected to the steering actuator rod and to: the first wheel interface to rotate the first wheel interface about the first steering axis, and the second wheel interface to rotate the second wheel interface about the second steering axis.

12. The vehicle corner system of claim 11, wherein at least one of:
 the first steering axis extends through the first suspension linkage; and
 the second steering axis extends through the second suspension linkage.

13. The vehicle corner system of claim 11, wherein the first wheel interface and the second wheel interface are simultaneously rotatable about the first and second steering axes, respectively.

14. The vehicle corner system of claim 11, wherein the first wheel interface and the second wheel interface are simultaneously rotatable about the first and second steering axes, respectively, in the same direction.

15. The vehicle corner system of claim 11, wherein the first wheel interface and the second wheel interface are simultaneously rotatable about the first and second steering axes, respectively, in the same direction, and wherein the first wheel interface is rotatable to a first steering angle and the second wheel interface is rotatable to a second steering angle that is different from the first steering angle.

16. The vehicle corner system of claim 11, wherein the steering actuator rod is substantially parallel to the first axis and the second axis.

17. The vehicle corner system of claim 11, wherein the steering linkage comprises:

a first link connected to the sub-frame or to the first suspension linkage, the first link is rotatable about an axis that is substantially parallel to the first steering axis, and a first steering rod that is transverse to the steering actuator rod and connected to the first link and to the first wheel interface to rotate the first wheel interface about the first steering axis, a second link connected to the sub-frame or to the second suspension linkage, the second link is rotatable about an axis that is substantially parallel to the second steering axis, and a second steering rod that is transverse to the second steering actuator rod and connected to the second link and to the second wheel interface to rotate the second wheel interface about the second steering axis.

18. The vehicle corner system of claim 17, wherein the steering linkage comprises a first coupler connecting the steering actuator rod and the first link and a second coupler connecting the steering actuator rod and the second link.

19. The vehicle corner system of claim 11, further comprising a drivetrain unit comprising at least one motor to spin at least one of the first and second wheel interfaces about the first spinning axis and the second spinning axis, respectively.

* * * * *